United States Patent
McCulloh et al.

(10) Patent No.: US 11,481,540 B2
(45) Date of Patent: Oct. 25, 2022

(54) DISCREPANCY RESOLUTION PROCESSOR AND METHODS FOR IMPLEMENTING THE SAME

(71) Applicant: salesforce.com, Inc., San Francisco, CA (US)

(72) Inventors: Christopher Daniel McCulloh, Brownsburg, IN (US); Christopher Shawn Corwin, Indianapolis, IN (US); Isaac James Heyveld, Mooresville, IN (US)

(73) Assignee: salesforce.com, inc., San Francisco, CA (US)

( * ) Notice: Subject to any disclaimer, the term of this patent is extended or adjusted under 35 U.S.C. 154(b) by 58 days.

(21) Appl. No.: 15/929,904

(22) Filed: May 28, 2020

(65) Prior Publication Data
US 2021/0150126 A1  May 20, 2021

Related U.S. Application Data

(60) Provisional application No. 62/937,658, filed on Nov. 19, 2019.

(51) Int. Cl.
*G06F 40/143* (2020.01)
*G06F 16/16* (2019.01)
(Continued)

(52) U.S. Cl.
CPC ..........  *G06F 40/143* (2020.01); *G06F 3/0481* (2013.01); *G06F 3/0484* (2013.01);
(Continued)

(58) Field of Classification Search
CPC ...... G06F 16/116; G06F 16/148; G06F 16/16; G06F 3/0481; G06F 3/0484; G06F 40/14; G06F 40/143; G06F 40/166; G06F 40/186; G06F 8/20; G06F 8/24; G06F 8/38; G06F 9/451; G06K 9/40; G06K 9/6253; G06K 9/6256; G06N 20/10; G06N 20/20;
(Continued)

(56) References Cited

U.S. PATENT DOCUMENTS

| 5,577,188 A | 11/1996 | Zhu |
| 5,608,872 A | 3/1997 | Schwartz et al. |

(Continued)

OTHER PUBLICATIONS del.w3.org, "UserManual. html—Introduction", 2016, retrieved from https://web.archive.org/web/20160105024625/http://dev.w3.org/ SVG/ tools/svgweb/docs/UserManual.html, 20 pages (Year: 2016).
(Continued)

*Primary Examiner* — Beau D Spratt
*Assistant Examiner* — Reji Kartholy
(74) *Attorney, Agent, or Firm* — LKGlobal | Lorenz & Kopf, LLP

(57) ABSTRACT

A system is provided that can execute one or more scripts to cause a discrepancy resolution processor to be executed on a first exported image file (having a raster-based image format such as PNG), and a second exported image file (having a vector-based image format such as SVG) to programmatically compare, fix, and flag discrepancies or differences between the first exported image file and the second exported image file.

20 Claims, 35 Drawing Sheets

(51) Int. Cl.

| | |
|---|---|
| *G06F 40/186* | (2020.01) |
| *G06F 9/451* | (2018.01) |
| *G06F 8/20* | (2018.01) |
| *G06F 16/14* | (2019.01) |
| *G06F 16/11* | (2019.01) |
| *G06F 3/0484* | (2022.01) |
| *G06F 8/38* | (2018.01) |
| *G06F 40/166* | (2020.01) |
| *G06F 40/14* | (2020.01) |
| *G06F 3/0481* | (2022.01) |
| *G06K 9/62* | (2022.01) |
| *G06N 3/04* | (2006.01) |
| *G06N 3/08* | (2006.01) |
| *G06V 10/30* | (2022.01) |

(52) U.S. Cl.
CPC ............... *G06F 8/20* (2013.01); *G06F 8/24* (2013.01); *G06F 8/38* (2013.01); *G06F 9/451* (2018.02); *G06F 16/116* (2019.01); *G06F 16/148* (2019.01); *G06F 16/16* (2019.01); *G06F 40/14* (2020.01); *G06F 40/166* (2020.01); *G06F 40/186* (2020.01); *G06K 9/6253* (2013.01); *G06K 9/6256* (2013.01); *G06N 3/0454* (2013.01); *G06N 3/08* (2013.01); *G06V 10/30* (2022.01)

(58) Field of Classification Search
CPC ...... G06N 3/0445; G06N 3/0454; G06N 3/08; G06N 5/003; G06N 7/005
See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,598,057 B1 | 7/2003 | Synnestvedt et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,353,456 B2 | 4/2008 | Arend et al. |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,680,546 B2 | 3/2010 | Gilbert et al. |
| 7,698,160 B2 | 4/2010 | Beaven et al. |
| 7,730,478 B2 | 6/2010 | Weissman |
| 7,779,475 B2 | 8/2010 | Jakobson et al. |
| 7,873,946 B2 | 1/2011 | Lathrop et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,060,834 B2 | 11/2011 | Lucas et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,094,576 B1 | 7/2015 | Karakotsios |
| 9,880,540 B2 | 1/2018 | Nixon et al. |
| 10,635,713 B2 | 4/2020 | Feng et al. |
| 11,003,835 B2 | 5/2021 | Gadgil et al. |
| 11,144,275 B1 | 10/2021 | Hinckley et al. |
| 11,409,640 B2 | 8/2022 | Thangam |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0014442 A1 | 1/2003 | Shiigi et al. |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |

(56) References Cited

U.S. PATENT DOCUMENTS

| | | |
|---|---|---|
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0148318 A1 | 7/2004 | Taylor et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268235 A1 | 12/2004 | Wason |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2007/0198922 A1 | 8/2007 | Ludmann |
| 2007/0226241 A1 | 9/2007 | Ng et al. |
| 2007/0299806 A1 | 12/2007 | Bardsley et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2010/0114857 A1* | 5/2010 | Edwards .............. G06F 16/743 707/709 |
| 2010/0146488 A1* | 6/2010 | Chen ................... G06F 11/3688 717/128 |
| 2011/0231823 A1* | 9/2011 | Frye .................... G06F 11/3688 717/125 |
| 2011/0247051 A1 | 10/2011 | Bulumulla et al. |
| 2012/0016808 A1 | 1/2012 | Ramani et al. |
| 2012/0042218 A1 | 2/2012 | Cinarkaya et al. |
| 2012/0177304 A1 | 7/2012 | Taber |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0025636 A1 | 1/2014 | Branton et al. |
| 2014/0105491 A1* | 4/2014 | Hayek .................. G06K 9/6202 382/165 |
| 2014/0310591 A1 | 10/2014 | Nguyen et al. |
| 2016/0283460 A1 | 9/2016 | Weald et al. |
| 2016/0291814 A1* | 10/2016 | Pigat .................... G06F 40/169 |
| 2017/0300966 A1* | 10/2017 | Dereszynski ....... G06F 9/45504 |
| 2018/0131579 A1 | 5/2018 | Jacobs et al. |
| 2018/0137244 A1 | 5/2018 | Sorenson et al. |
| 2018/0174330 A1* | 6/2018 | Chen ...................... G06T 11/60 |
| 2018/0225265 A1 | 8/2018 | Fitzpatrick |
| 2019/0012579 A1 | 1/2019 | Namiki |
| 2019/0036887 A1 | 1/2019 | Miller |
| 2019/0197670 A1 | 6/2019 | Ferrer et al. |
| 2019/0244020 A1 | 8/2019 | Yoshino et al. |
| 2019/0251723 A1 | 8/2019 | Coppersmith et al. |
| 2019/0324890 A1* | 10/2019 | Li ............................. G06F 8/38 |
| 2019/0340812 A1* | 11/2019 | Fuetterling ........... G06T 15/005 |
| 2020/0034874 A1 | 1/2020 | Narayan et al. |
| 2020/0134834 A1 | 4/2020 | Pao et al. |
| 2020/0160497 A1 | 5/2020 | Shah et al. |
| 2020/0302640 A1 | 9/2020 | De Villers-Sidani et al. |
| 2021/0027071 A1 | 1/2021 | Gong |
| 2021/0064934 A1 | 3/2021 | Swaminathan et al. |
| 2021/0097644 A1 | 4/2021 | Sommerlade et al. |
| 2021/0141652 A1 | 5/2021 | Magureanu et al. |
| 2021/0168408 A1 | 6/2021 | Malakhov et al. |
| 2021/0279469 A1 | 9/2021 | Holland |
| 2022/0083807 A1 | 3/2022 | Zhang et al. |

OTHER PUBLICATIONS

Dane Groves, "Comm 328: Responsive WebDesign—Creating SVG Files", 2018, retrieved from https://web.archive.org/web/20181230060803/http://web.simmons.edu/-grovesd/comm328/modules/svg/creating-svgs, 8 pages (Year: 2018).

Andersson et al., "Scalable Vector Graphics (SVG) Tiny 1.2 Specification", 2008, W3C, 443 pages (Year: 2008).

Concolato et al., "Design of an Efficient Scalable Vector Graphics Player for Constrained Devices", 2008, IEEE, pp. 895-903 (Year: 2008).

Krottmaier et al., "Using SVG for an User-Interface to a Digital Library", 2006, Proceedings ELPUB2006 Conference on Electronic Publishing—Bansko, Bulgaria, 8 pages (Year: 2006).

* cited by examiner

```
<text id="dyn-datenow" font-family="Helvetica" font-size="12" font-weight="normal" line-spacing="18" fall="#3E3E3C">
  <tspan x="593" y="30" >As of Oct 24, 2019 12:17:56 PM</tspan>
</text>
```

DISCREPANCY RESOLUTION PROCESSOR AND METHODS FOR IMPLEMENTING THE SAME

CROSS-REFERENCE TO RELATED APPLICATION

This application claims the benefit of U.S. Provisional Application No. 62/937,658, filed Nov. 19, 2019, which is incorporated herein by reference in its entirety.

TECHNICAL FIELD

Embodiments of the subject matter described herein relate generally to generating presentations, and more particularly, embodiments of the subject matter relate to a discrepancy resolution processor that programmatically compares, fixes, and flags discrepancies or differences between a first exported image file (having a raster-based image format such as PNG), and a second exported image file (having a vector-based image format such as SVG).

BACKGROUND

User Interface (UI) design is the discipline of designing software interfaces for devices, ideally with a focus on maximizing efficiency, responsiveness and aesthetics to foster a good user experience. UI design is typically employed for products or services that require interaction for the user to get what they need from the experience. The interface should allow a user to perform any required tasks to complete the function of the product or service. An interface is a point of interaction between the user and the hardware and/or software they are using. A UI designer is someone who creates the user interface based on a functional requirement and planned user experience using design standards and aesthetics to craft a certain experience. UI design can be done using computer visualization software or by building directly in code.

A design tool can be used for creating the UI of a software application. A design tool is a software-based system (e.g., computer program such as a web-based plugin, an application, or a service) that executes at one or more hardware-based processors. A design tool provides features that help in the prototyping of a software application, and can be used for example, to create, the user interface of a software application. It helps in visualizing the look and feel of an application and is used by designers to determine requirements and obtain feedback from users. A design tool can be used, for example, by a UI designer to create a user interface (UI) layout, graphics design, sketches and mockups using components of a design system. A design tool is used to coordinate, create and build design artifacts with the goal of producing mockups, concepts and layouts that influence the perception of design ideas. A design artifact can be any sort of deliverable needed in the design process, such as, a mockup of a UI, an interaction, a prototype, a pattern, a defined layout and more. Some interface design tools are also capable of generating code from the UI design that has been created. Common examples of commercially available design tools can include Adobe Photoshop®, Sketch®, Invision®, Illustrator®, etc.

A UI design system can refer to a complete set of design standards, documentation, and principles along with the toolkit (UI patterns and code components) to achieve those standards. A design system can include many reusable components that can be assembled together to build any number of applications. In general terms, design system components and their definitions can include many different types of standardized components, assets, utilities, tokens (e.g., fonts, colors), icons, buttons, input controls, navigation elements, variations, etc. User interface design patterns are descriptions of best practices within user interface design. They are general, reusable solutions to commonly occurring problems. Common examples of commercially available design systems can include Salesforce.com's Lightning Design System® (SLDS), Microsoft Fluent®, Google Material®, etc. For example, Salesforce.com's Lightning Design System® reflects the patterns and components that underpin the Salesforce product. It includes brand and product design guidelines, design patterns and component blueprints for creating unified UI in the Salesforce ecosystem. Design systems help teams by giving them a more structured and guided way to build solutions for their product problems, which helps translate a consistent experience and visual language across a product when working on different touch-points. Once a design system is created, a designer will use the design tool and predefined design system components to build a layout and assets.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. The discussion above is merely provided for general background information and is not intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIGS. 6A-6C are a series of GUI screenshots that collectively show a dynamic SVG method in accordance with the disclosed embodiments;

DETAILED DESCRIPTION

Figure 1:
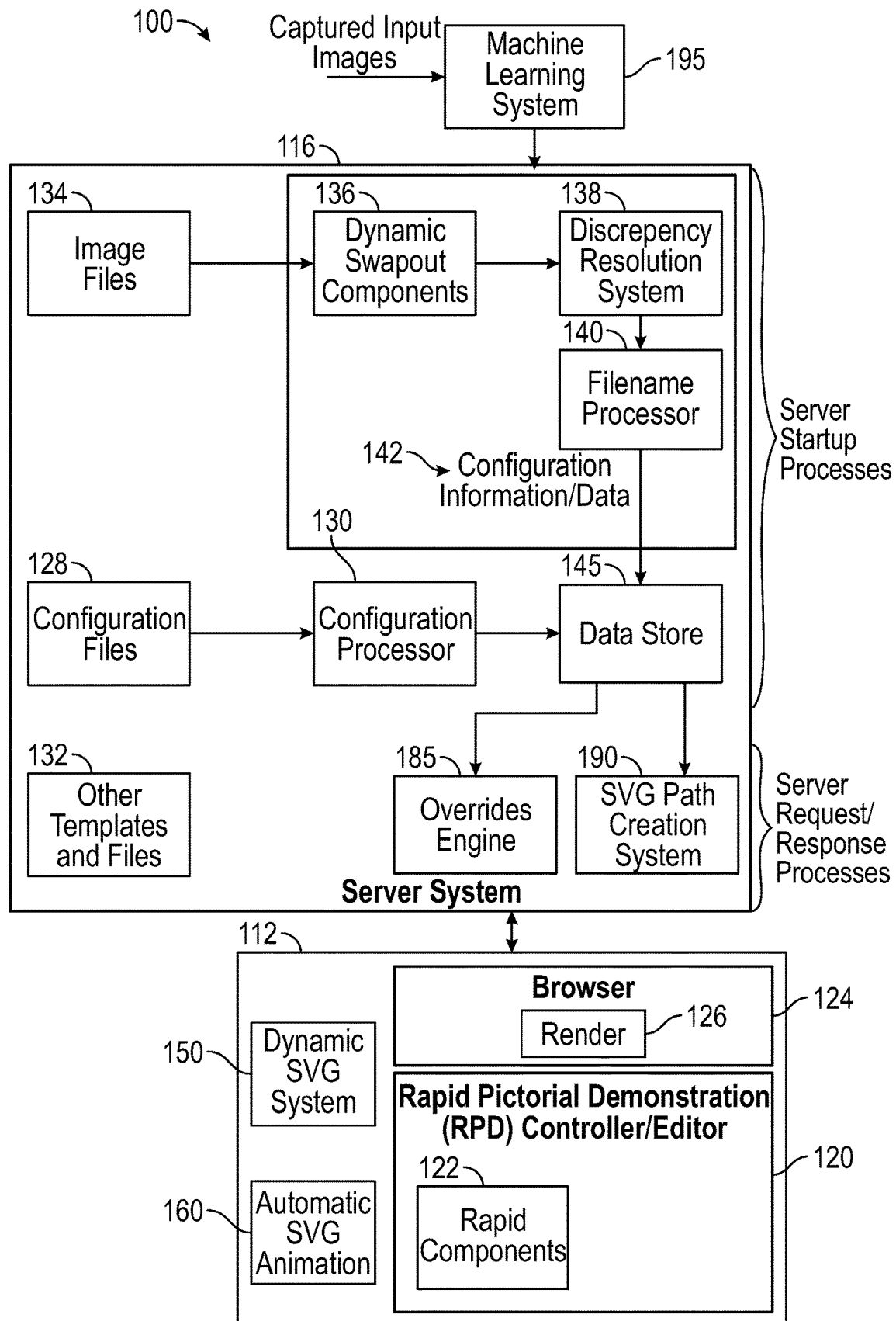
FIG. 1 is a block diagram of a demonstration serving system in accordance with the disclosed embodiments.

A software product demonstration presentation or "demo" can refer to a digital artifact that is presented during a presentation by a demonstration presenter to present and demonstrate features of a software product and how it will likely operate in response to user interaction. In some cases, the presenter may be presenting a demo of how an actual, operational software product functions. This typically involves the presenter interacting with a graphical user interface (GUI) of the software product to demonstrate or "demo" how various features of the software product will likely operate in response to user interaction with the GUI. However, in many cases the software product does not exist yet and the presentation is made to demonstrate how an envisioned software product would likely operate once it is fully developed. This typically involves the presenter interacting with a GUI of the envisioned software product to demonstrate or "demo" GUI layouts, graphics design, sketches and mockups, while also demonstrating how various features of the envisioned software product might or would likely operate in response to user interaction with the GUI once the envisioned software product is fully developed. This can be done to gain feedback from viewers (engineers, developers, potential end users, etc.) regarding how the envisioned software product might be improved so that developers have a better idea of how the envisioned software product should be designed before they start their actual development efforts. Ideally, a demonstration presentation for the envisioned software product can be created that mimics the features, look, and feel of the envisioned software product, but without investing the time, effort and other resources needed to create and develop the actual, envisioned software product. The viewers of the presentation should not easily be able to tell that they are not looking at production screens.

When creating an interactive demonstration presentation for an envisioned software product, designers of need a way to quickly modify existing production screens for design iteration and testing, without writing code, but in as high fidelity as possible, so that the demonstration presentation for the envisioned software product mimics the features, look, and feel of the envisioned software product. This allows designers to gain feedback regarding their proposed software product without putting in the effort to develop it.

To address this need, the disclosed embodiments can provide methods and systems for creating interactive, demonstration presentations for an envisioned software product. These methods and systems will be described below with reference to FIGS. 1-33. Prior to describing these methods and systems, some terminology will be described that is used throughout the remainder of this Detailed Description.

Definitions

As used herein, the term "demonstration" or "demo" can refer to a software product demonstration presentation. The software product demonstration presentation or "demo" can refer to a digital artifact that is presented during a presentation by a demonstration presenter to present and demonstrate features of a software product and how it will operate or likely operate in response to user interaction. In some cases, the presenter may be presenting a demo of how an actual, operational software product functions. This typically involves the presenter interacting with a graphical user interface (GUI) of the software product to demonstrate or "demo" how various features of the software product will likely operate in response to user interaction with the GUI.

As used herein, an "envisioned software product" can refer to a software product that does not exist yet. A demonstration presentation or "demo" of an envisioned software product can refer to a digital artifact that is presented during a presentation by a demonstration presenter to present and demonstrate features of the envisioned software product and how it will likely operate in response to user interaction once it is fully developed. A demonstration presentation of an envisioned software product can involve a presenter interacting with a GUI of the envisioned software product to demonstrate or "demo" GUI layouts, graphics design, sketches and mockups, while also demonstrating how various features of the envisioned software product might or would likely operate in response to user interaction with the GUI once the envisioned software product is fully developed.

As used herein, a "Graphical User Interface (GUI)" is a form of user interface that allows users to interact with electronic devices, and can refer to a system of interactive visual components for computer software. A GUI can use windows, icons, and menus to carry out commands. A GUI displays objects that convey information, and represent actions that can be taken by the user. The objects change color, size, or visibility when the user interacts with them. Common GUI objects include, for example, icons, cursors, and buttons. A few non-limiting examples of interface elements that define the structure for a user interface include but are not limited to: input controls (e.g., buttons, text fields, checkboxes, radio buttons, dropdown lists, list boxes, toggles, date field); navigational components (e.g., breadcrumb, slider, search field, pagination, slider, tags, icons); informational components (e.g., tooltips, icons, progress bar, notifications, message boxes, modal windows); containers (e.g., accordion), etc. As used herein, the term "asset" when used in conjunction with the term "design document file" refers to a resource or components that developers need in order to implement an artifact used in a UI and UX. A few non-limiting examples of UI design assets are color, palettes(codes), styles, icons, fonts, images, animation, audio, video and each and every other element that is used in visual design techniques.

As used herein, the term "image file" can refer to a file that contains graphics data (e.g., a GIF or PNG file). Image file formats are standardized means of organizing and storing digital images. An image file format may store data in an uncompressed format, a compressed format (which may be lossless or lossy), or a vector format. In general, image file formats can fall under a bitmapped category (e.g., BMP, GIF, JPG, PNG, TIF, etc.) or a vector category (e.g., AI, DFX, PS, SVG, WMF, etc.). Image files are usually composed of digital data in one of these formats; however, some formats fall within both categories because they can hold both raster and vector images. For example, Portable Network Graphics (PNG) is a raster-graphics file-format that supports lossless data compression. PNG was developed as an improvement for Graphics Interchange Format (GIF). PNG supports palette-based images, grayscale images, and full-color non-palette-based RGB or RGBA images, whereas a Scalable Vector Graphics (SVG) file format is a graphics file format that uses a two-dimensional vector graphic format created by the World Wide Web Consortium (W3C). In particular, SVG is an Extensible Markup Language (XML)-based vector image format for two-dimensional graphics with support for interactivity and animation. It describes images using a text format that is based on XML. Scalable Vector Graphics (SVG) files are developed as a standard format for displaying vector graphics on the web. There are a wide variety of formats in use today that are expressed by extension name.

Demonstration Serving System

FIG. 1 is a block diagram of a demonstration serving system 100 in accordance with the disclosed embodiments. The demonstration serving system 100 includes a user system 112, a server system 116 and a machine learning system 195. As will be explained in greater detail below, the demonstration serving system can take an image file named in a very specific way and utilize the filename of that image file to indicate how the image should be displayed, as well as what other images should be used to create the final presentation on the screen. For example, a filename contains an ID and also instructions that indicate that there are other images that should be sought out and overlaid on top of this one in order to create the final visual representation for the user. The system can look at this filename and determine that another location should be inspected for other image(s) that should be displayed over the image (e.g., other image(s) that can constitute a header that should be displayed and/or that will function as a drawer that will slide in on the page overtop of this image).

The user system 112 includes various processors, processing systems and processing modules that are utilized by a browser (not shown) of the user system 112, for example, of a user/presenter who is presenting a software product demonstration. The various processors, processing systems and processing modules implemented by the user system 112 can include: a Rapid Pictorial Demonstration (RPD)

Controller/Editor 120, a browser 124 having a rendering engine 126, a dynamic Scalable Vector Graphics (SVG) system 150, and an automatic SVG animation system 160. The various processors, processing systems and processing modules can include computer hardware and computer-executable code that is configurable to be executed by the computer hardware.

The server system 116 includes a data store 145 and various processors, processing systems and processing modules including: a configuration processor 130, a dynamic component swapout processor 136, a discrepancy resolution processor 138, a filename processor 140, an overrides engine 185, and an SVG path creation system 190. The various processors, processing systems and processing modules can include computer hardware and computer-executable code that is configurable to be executed by the computer hardware. The configuration processor 130, the dynamic component swapout processor 136, the discrepancy resolution processor 138, and the filename processor 140 are used during startup processes of the demonstration serving system 100 (e.g., when the demonstration serving system 100 starts up). By contrast, the overrides engine 185 and the SVG path creation system 190 are used during server request-response processes (e.g., every time a request is received by the demonstration serving system 100 that the demonstration serving system 100 then generates a response to the request that was received) for example to generate HTML, generate SVG images, and retrieve various images, JavaScript® (JS) and CSS assets.

Server Startup Processes

The configuration processor 130 can process configuration files 128 to generate output information that can be stored at the data store 145. This output information can then be used (along with other configuration information/data provided by the filename processor 140) to allow for programmatic creation of a software product demonstration presentation. The software product demonstration presentation or "demo" can refer to a digital artifact that is presented, for example, on stage during a presentation, for instance, by a demonstration presenter (e.g., the person or people presenting the software product demonstration). Provided image files, CSS files, in-memory configuration information and/or JavaScript templates 822 can be utilized to render an HTML document that, when presented in a browser via the demonstration serving system, sufficiently mimics the features, look, and feel of the envisioned software product, so as to be indistinguishable from said "real" product to an average observer, when presented by a practiced demonstration presenter. This can be done automatically without requiring an engineer/developer to create custom-made HTML, JavaScript, or CSS, while avoiding the need to actually create the envisioned software product. Various features of the configuration processor 130 will be described below with reference to FIG. 16.

The dynamic component swapout processor 136 can process a set of one or more image files 134, and dynamically swap out components for SVG components. To explain further, from within an image editing software, an element can be named in a certain way so that when it is exported as an SVG element, a script can pass over it and when the script processes that element, the contents of that element can be replaced with contents from another location. For example, an image can be named in a certain way such that instead of displaying that image, the system places an actual HTML/JS/CSS element in that spot.

For instance, an element of an image file can be named in a certain way (before it is exported) so that it can be replaced with another element when the image file is exported. For instance, a script can process an exported SVG file and create another file (e.g., an EJS file) so that, when it is served to and displayed by a browser, content of certain element(s) of the exported SVG file are replaced with other content specified by the other file (e.g., an EJS file). Various features of the dynamic component swapout processor 136 will be described below with reference to FIG. 12.

The discrepancy resolution processor 138 can programmatically compare, fix, and flag discrepancies between exported PNG and SVG files. When an image that was created in image editing software, such as Sketch®, is exported as a PNG file and an SVG file, the discrepancy resolution processor 138 can execute a script (or alternatively one or more scripts on each file). The script duplicates and resizes the PNG file to be the same dimensions as the SVG file so that the resized PNG file is the same size as the SVG file. The script can then clean up the SVG file by, for example, renaming all IDs to ensure they are unique and do not collide with other SVG images that may be on page, cleaning IDs so they are valid for HTML, and performing other SVG cleanup and optimizations. The script loads the SVG file as a Document Object Model (DOM) so that it can interact with it as if it were inside of a browser, and then looks for common problems with SVG file when exported from this image editing software (e.g., common problems with SVG exports from Sketch®). For example, if an element has a line-spacing specified on it, the script mathematically calculates where the element ought to be (based on font-size and line-spacing) and places it there instead of where the image editing software put it. As another example, the script can adjust an element's font-size and letter-spacing based on a formula, and/or adjust an element's font-weight based on a formula, etc. The script also places the SVG file within an HTML shell that mimics the final context the SVG will be loaded into. The script renders the SVG file in the browser and takes a screenshot.

The script then passes the resized PNG file and the screenshot of the SVG file to a diff program that determines all of the differences between the resized PNG file and the screenshot of the SVG file and generates a difference file (of diff). A difference file can refer to a file with a DIFF file extension that records all the ways that two files are different. The script determines whether the images of the resized PNG file and the screenshot of the SVG file are similar enough to be considered to "match" and places diff files and GIFs of "matching" images into a "success" folder, and places all remaining (non-matching) images in a "failure" folder.

The script highlights all differences (between the resized PNG file and the screenshot of the SVG file) so that they are clearly visible to a user. For example, in one implementation, the script highlights all differences between the resized PNG file and the screenshot of the SVG file, for instance, in red font so that they are clearly visible to a user. In addition, the script can also create a GIF that cycles back and forth between the resized PNG file and the screenshot of the SVG file so that a human being can view the GIF and see the differences between the resized PNG file and the screenshot of the SVG file. This way, the script can notify the user of failures and display them, for example, as an animated GIF of failures. Various features of the discrepancy resolution processor 138 will be described below with reference to FIGS. 13-15.

The filename processor 140 can be used (in conjunction with various other features of the server system 116) to create a software product demonstration presentation using filenames as configuration information. The filename processor 140 can discover configuration information about a software product demonstration that is meaningful to the demonstration serving system 100 (e.g., derive meaning from patterns of strings in filename(s) so that these derived meanings can be used to make "fake" or "faux" software that mimics features of an envisioned software product without writing the code necessary to implement that software product). In general terms, the filename processor 140 can iteratively process filenames from one or more image file(s) to determine certain configuration information specified by filenames; this configuration information can then be used to determine which images should be selected and used by the demonstration serving system 100 to create a final visual representation.

In one embodiment, the filename processor 140 can analyze a filename of an image file for patterns of strings by breaking the filename into parts, each part providing a different type of configuration information about the image file. For example, the filename processor 140 can sort the filenames to determine an order that images are to be presented and record that order; identify a part of each filename that can allow the system to uniquely identify individual images as well as discover and expose groups of related images can be determined and recorded; determine traits for the filenames that will allow the system to present and conceal the image, or groups of related images, in specific places, at specific times, optionally animating the presentation and concealing, in such a way that will be meaningful to the specific software product demonstration in the context of the demonstration serving system; and determine those parts of each of the filenames that will allow the demonstration serving system to present information specific to the software product demonstration.

As a result, each filename that is analyzed is broken into different parts that each provide a different type of configuration information about each image file. The demonstration serving system can access the configuration information and use it to present an array of provided images, in the browser, in the right order, such that when prompted by the demonstration presenter, the currently shown image or set of related images is replaced with another image in such a way so as to mimic the features, look, and feel of an envisioned software product. The filename processor 140 can employ a filenames convention that can be utilized in accordance with the disclosed embodiments. Various features of the filename processor 140 will be described below with reference to FIGS. 17-20.

Server Request Response Processes

The overrides engine 185 provides a custom architecture (e.g., for a node express application) that allows for cascading layered overrides of assets. The overrides engine can allow a server to understand a request being made and serve up the right assets in response. Various features of the overrides engine 185 will be described below with reference to FIGS. 21-24.

The SVG path creation system 190 can create SVG paths (e.g., a grid of 2-dimensional points, including column labels and row labels, and paths between multiple points and other points of the grid). In one embodiment, a user inputs various types of information into the system 190 during a configuration step to define a grid. For example, the user can define one or more paths by specifying only path style (forward or backwards), a start point and an endpoint; can define column and row label aliases; and can define how many columns the grid will have, how many rows the grid will have, the distance between columns of the grid, the distance between rows of the grid, and the location of column and row labels. Based on the path definition, the system 190 can calculate a route by determining where a starting point (point A) and an endpoint (point B) are on the grid; finding path segments that will lead from Point A to Point B by following a formula dictated by the specified style (forward or backwards). How the system can calculate the path segments is different depending on whether the specified style is forward or backward. Once created, route definitions can be stored for each route that was calculated for the path. Notably, the calculation does not rely on specific dimensions, but instead only records the direction to move and the number of rows/columns to move by.

The route definitions can then be processed to create an SVG path object based on recorded route definitions. In one embodiment, this can be done by determining class definitions, creating SVG path representations, and calculating SVG animations for each path to generate a final SVG path object. For example, in one implementation, an SVG creation block (not illustrated in FIG. 1) can create an SVG path object by: creating SVG elements that represent grid points and labels as defined by at least some of the input information 1514, 1516, and then creating SVG elements to represent each path to place on grid. For instance, the SVG creation block can create SVG elements to represent each path to place on grid by: determining where path should be placed on screen; determining CSS class definitions, which define color, animation appearance, and hover/interaction behaviors; calculate the length of path by examining how many steps there are in the path and how far must be traveled during steps and between them based on a formula; calculate animation properties (delay, length of line to draw, etc.) based on length of path; and create an SVG path object by passing recorded route representations through a formula, translating instructions into a machine readable value; and determining how to connect each point to the next point.

Various features of the SVG path creation system 190 will be described below with reference to FIGS. 25-29.

Server Sketch-to-Demo Translation Processes

The machine learning system 195 can translate a sketch into an interactive demonstration using machine learning technologies. For instance, in one implementation, the machine learning system 195 can be trained (using machine learning) to automatically recognize components within hand-drawn sketches (e.g., whiteboard sketches). The machine learning system 195 can then work in conjunction with the demonstration serving system to automatically replace those components from a sketch or time-series of sketches (e.g., screenshots of a sketch take over time as the sketch is being drawn), for example, with SVG images and/or HTML/JS/CSS components to transform them into interactive demonstration(s) without the user having to write any code. The machine learning system 195 will be described below with reference to FIGS. 30A-30D.

Browser Processes

The RPD Controller/Editor 120 can be used for building interactive demonstrations. The RPD Controller/Editor 120 can be used for editing interface mock-ups, in-browser, using HTML/JS/CSS/images. The RPD Controller/Editor 120 allows a designer to place arbitrary images (also referred to herein as "rapid components") in a browser window alongside normal HTML/JS/CSS. The RPD Controller/Editor 120 can allow the designer to define interactivity and functionality for these rapid components without writing code. Using the RPD Controller/Editor 120 can be used, the designer can move the rapid components around and resize them as needed and define behaviors for user mouse events, including page navigation on click, swapping the interacted with rapid component for another rapid component, swapping a different rapid component or groups of rapid components for a different rapid component or group of rapid components on click of a rapid component. Rapid components can also swap out their own defined images when interacted with. A single rapid component can have multiple, configurable image states defined for it (e.g., default, hover, hovered, dragging, dropped, dragged, clicked, active, etc.). Supplying these images informs the rapid component that supports this functionality, which it automatically handles without any further intervention from the designer. Drop and hover targets can also be specified by supplying an ID of the targetable rapid component (or arbitrary HTML element), or else a classname (CSS class name) of valid targets (whether rapid components or HTML elements). HTML classnames can be added to rapid components to grant them functionality without having to define any further interactivity. For example, if an image of a button is assigned to a rapid component and called "button.svg", and the designer specifies specific class names (such as "hoverable"), but do not define a hover image for the rapid component, it will automatically seek out a "button_hoverable.svg" image and use that if one is found.

An end user can interact with the rapid components through all normal mouse and keyboard events such as hover, drag/drop, click all, etc. without the end user knowing that they are interacting with images instead of production ready HTML code. Since metadata is stored at HTML nodes themselves in this system, the need for a data store to store metadata can be eliminated.

In one embodiment, the RPD Controller/Editor 120 allows for the manipulation (including addition/removal) of rapid components that will be described below. Examples of such rapid components can include, for example, rapid divs. A rapid div can refer to a discrete point of interactivity layered on top of the page. In some cases, a rapid div can be layered on top of an image in order to make the image seem interactive, or could be placed on top of a fake screenshotted element on an otherwise built-out page in order to make that element dynamic. At the most basic level, a rapid div is an invisible trigger on the page that causes images on the page to be swapped out (or shown/hidden). Various other features of the RPD Controller/Editor 120 will be described below with reference to FIGS. 2 and 3.

The dynamic SVG system 150 allows for identifiers (IDs) to be named on SVG components so that a JavaScript® (JS) engine (not illustrated) can replace components within an SVG with text specified in JSON files. For instance, when an object (e.g., text or image object) is created and/or selected using a user interface design tool, the object can be named/labeled using image editing software, and a specific key (having a desired value associated with that specific key) can be passed to the object to result in an SVG object (e.g., text or image object). The value is a value that the system has been instructed to understand and compute.

Later, when the dynamic SVG system 150 loads and processes the SVG object, the dynamic SVG system 150 can inspect the SVG code (e.g., search for a specific key and/or value), and find a labeled object. The dynamic SVG system 150 can read the contents of the labeled object and use the key to find another value associated with it (e.g., in a data store of such keys and values), and thus determine a format that a creator would like an image to appear in. The system will then replace the contents of the labeled object with the contents that were found in the data store (e.g., text or image specified by the user). Various features of the dynamic SVG system 150 will be described below with reference to FIGS. 4A-8.

The automatic SVG animation system 160 allows for automatic animation of SVG components. In one embodiment, identifiers are named on SVG components that can be used to automatically animate the SVG components using, for example, JavaScript (JS) and Cascading Style Sheets (CSS). For instance, in one implementation, a user can name a component in a graphics editor or design tool used for user interface design. The component can then be exported with an ID that matches the component. The automatic SVG animation system 160 can then display the SVG by inserting/embedding it into an HTML page (not linking to it as a separate image). This allows JS and CSS to interact with the contents of the SVG. The automatic SVG animation system 160 can cause the element to be placed at a starting location and animated into final position following style definitions, such as, whether the animation should be paused on display or animate immediately, if the animation should be triggered based on scroll, the duration of the animation, and the appearance/behavior of the animation, etc. In one embodiment, user behavior can then trigger animations. For instance, pressing certain keys can pause/start animations; pressing certain keys can reset animations; pressing certain keys can restart animations from the beginning; taking certain actions can cause animations to begin (e.g., scrolling can trigger animations which are defined as being "on-scroll" animations), etc. Various features of the automatic SVG animation system 160 will be described below with reference to FIGS. 9-11.

Rapid Pictorial Demonstration (RPD) Controller/Editor

When building interactive demonstrations, designers need a way to quickly modify existing production screens for design iteration and testing, without writing code, but in as high fidelity as possible. The end user should not easily be able to tell that they are not looking at production screens.

In some embodiments, systems and methods are provided for Rapid Pictorial Demonstration (RPD). The systems and methods include a rapid pictorial demonstration (RPD) controller/editor for building interactive demonstration presentations. In some embodiments, when executed by a hardware-based processor, processor-executable instructions are configurable to execute a Rapid Pictorial Demonstration (RPD) system that causes placing images on a webpage of an interactive demonstration presentation to cover portions of a webpage so that new functionality is displayable on that webpage. In some embodiments, an RPD controller can inject one or more rapid components into the webpage and define the one or more rapid components within the webpage. Each rapid component corresponds to a unique area of concern to be modified within the webpage and stores data required to edit and display that rapid component on the webpage. For example, each rapid component can correspond to a discrete area of concern on the webpage that is configurable to define features of the interactive demonstration presentation including content and interactivity of the interactive demonstration presentation (e.g., to modify the presentation or allow for interactivity and intra-activity with the interactive demonstration presentation to be defined).

In some embodiments, the one or more rapid components can be defined within the webpage by adding the one or more rapid components to the webpage; editing the one or more rapid components within the webpage; removing the one or more rapid components from the webpage; and/or defining one or more of: stylistic appearance, interaction, and behavior of the one or more rapid components. In some embodiments, the content of the rapid components can include, for example, visual content such as images representing functionality to be demonstrated. The content can also include transparent areas which a rapid component is intended to now allow a user to click on (e.g., a previously non-clickable area), or changing what happens when a user clicks on a previously click-able area.

In some embodiments, each rapid component is capable of being interacted with by a first found page, other rapid components, and/or a user. Each rapid component is configurable to trigger further changes to, for example, applicable portions of a webpage, and/or other rapid components. Each rapid component is configurable to contain one or more other rapid components nested within that rapid component; and/or overlap with one or more other rapid components; and/or layer over-top of one or more other rapid components.

In some embodiments, each rapid component can be implemented as a self-contained document object model (DOM) element having a plurality of definable states. For example, each rapid component can contains first found information relevant to display and functionality of that rapid component, and contains second found information relevant to the display and the functionality of that rapid component when that rapid component is displayed and interacted with, and wherein interactions with that rapid component modify a state of that rapid component or other rapid components associated with that rapid component. For instance, this could include JS, CSS and HTML or any "in-line" components. Each rapid component includes logic so that it knows how it should look/behave, and how it should look/behave when interacted with and when it is no longer being interacted with. Each rapid component includes logic so that it knows how it should make other related things look and behave in any of those three circumstances (if applicable).

In some embodiments, interactions with each rapid component include any valid event for the interactive demonstration presentation (e.g., including: obtaining focus; losing focus; activation, not yet focusing on or interacted with a state, etc.). Obtaining focus could be caused by (but is not limited to) any of the following: in a traditional web browser, moving the mouse over a rapid component ("hover"); pressing the Tab key when the rapid component is interpreted as the browser as the next thing that should receive focus if the Tab key is pressed; causing a JavaScript® event message which has been triggered that the rapid component's JavaScript® code is listening for (such as with 'window.addEventListener') to discover that an event has occurred that the rapid component shall interpret as indicating that the rapid component has received focus, etc. Losing focus could be caused by (but is not limited to) any of the following in a traditional web browser, moving the mouse off of a rapid component ("blur") or pressing the Tab key while the rapid component has focus, etc. Being Activated could be caused by (but is not limited to) any of the following in a traditional web browser: pressing a mouse button while the rapid component has focus; clicking with a mouse while the rapid component has focus ("mousedown" followed immediately by "mouseup"); double clicking with a mouse while the rapid component has focus; pressing the Return or Enter key while the rapid component has focus.

The definable states of each rapid component are editable and comprise at least one of: display associated with that rapid component; styling associated with that rapid component; behavior associated with that rapid component; interactions associated with that rapid component; intra-actions associated with that rapid component; and contents associated with that rapid component, etc. In some embodiments, the definable states of each rapid component comprise at least one of: a default state, a hover state, a hovered state, a dragging state, a dropped state, a dragged state, a clicked state, and an active state.

When a rapid component is informed that it has received or lost focus, or been activated, it is given other contextual information as well, such as by what mechanism it became active (in order to determine things like "was the Shift key being pressed when the rapid component was activated"). It will also have access to the state of the user's input and the rest of the Presentation, in order to query the state of other elements in the presentation, including but not limited to other rapid components. For example, if the rapid component being activated is intended to mimic a button that toggles an image of a door to be either opened or closed, the rapid component mimicking a button may inspect that image to determine whether the door appears to be open or closed. However, in some cases the rapid component may prefer to track whether it wants to the door to appear open or closed regardless of how the image appears upon the rapid component becoming activated, meaning, "This time when I am clicked, I will merely ensure that the image displays an open door, whether it displayed that open door prior to my having been clicked or not".)

A rapid component may inform other elements of the presentation how they should now appear, whether those other elements might be other rapid components or native elements to the presentation layer (in a browser, these would be any native DOM Elements, such as <div>, <p>, <img>, <audio>, etc., or custom Web Components, or rapid components. Anything that the browser is capable of displaying that can be targeted with JavaScript or CSS can be subject to control by the acting rapid component).

A rapid component may listen for information from other elements of the Presentation layer on how it should now appear. This could include the rapid component being assigned specific CSS classes that the rapid component changes the rapid component's behavior or presentation based on the rapid component having or not having these CSS Classes.

These behaviors can be installed into the rapid component with the user merely selecting them or activating them from the Rapid Controller and not having to write the code for them, but also can allow the user having the ability to define, in a finely-granular way, these behaviors.

As noted above, interactivity and intra-activity with the interactive demonstration presentation can be defined to modify the presentation. In this context, "interactivity" can be defined as a user interacting with a rapid component, triggering changes to that rapid component and optionally changes through that interaction to other rapid components or native portions of the web page. For example, dragging a product into a cart and dropping it on the cart, where the product is represented by a rapid component, but the cart is represented by a native portion of the web-page. The act of dropping the product on the cart should affect the expected functionality to occur (the item is added to the cart). In contrast, "intra-activity" can be defined as a rapid component interacting with any other portion of a webpage, including but not limited to other rapid components as well as "native" portions of the webpage. For example, an asynchronous process which runs on the page inserting/removing/editing portions of the web-page, such as a status-feed. The rapid component(s) could listen for those asynchronous events and insert/remove/update themselves based on the information passed through these asynchronous events.

In some implementations, a rapid component can refer to arbitrary images in a browser window alongside normal Hypertext Markup Language (HTML), JavaScript (JS) and Cascading Style Sheets (CSS). Cascading Style Sheets (CSS) is a stylesheet language used to describe the presentation of a document written in HTML or XML (including XML dialects such as SVG, MathML or XHTML). CSS describes how elements should be rendered on screen, on paper, in speech, or on other media. Interactivity and functionality for rapid components can be defined without writing code. Rapid components can be moved around and resized needed. Behaviors can be defined for user mouse events, including page navigation on click, swapping the interacted with rapid component for another rapid component, swapping a different rapid component or groups of rapid components for a different rapid component or group of rapid components on click of a rapid component. Rapid components can also swap out their own defined images when interacted with. A rapid component can have multiple image states defined for it (e.g., default, hover, hovered, dragging, dropped, dragged, clicked, active, etc.).

Any valid HTML element nested within the 'body' of an HTML document serving as the basis for the RPD Controller can be a rapid component. Examples of these types of HTML elements can include "span," "section," "article," "aside," "paragraph," "menu," etc.

A "div" is one of the basic elements of the HTML document model, it carries with it no semantic meaning, it is just a "wrapper" that can optionally have attributes (examples, "ID", "STYLE", "DATA"), which the RPD system uses as hooks to aid in targeting areas in its scope for manipulation. Because 'div' is semantically meaningless and is styled as block by default in common browsers, it is the "go-to" element for most purposes. A div is a quintessential "generic HTML element." An HTML document is a file containing Hypertext Markup Language, and its filename most often ends in the .html extension. An HTML document is a text document read in by a Web browser and then rendered on the screen. A div tag is used in HTML to make divisions of content in the web page (like text, images, header, footer, navigation bar, etc.). A div tag has both open (<div>) and closing (</div>) tag and it is mandatory to close the tag. A div tag is one of the most usable tags in web development because it helps separate out data in the web page and can be used to create a particular section for particular data or function in the web pages. A div tag is often used as a container for other HTML elements to style them with CSS or to perform certain tasks with JavaScript.

A rapid div is one type of rapid component. As used herein, the term "div" (or division tag) can refer to a <div> tag that defines a division or a section in a Hypertext Markup Language (HTML) document (also referred to herein as an HTML file). As used herein, the term "rapid div" can refer to a specific type of div tag that is used to provide a discrete point of interactivity layered on top of a page (e.g., layered on top of, or inside of, an image in order to make the image seem interactive, or placed on top of a "fake" screenshotted element on an otherwise built-out page in order to make that element dynamic). In one implementation, a rapid div can be an invisible trigger on a page that causes images on the page to be swapped out, shown, hidden etc. For instance, a rapid div can serve as an invisible trigger layered on top of the webpage to provide a discrete point of interactivity that causes images on that webpage to be swapped out in response to at least one trigger event (e.g., a mouseover method trigger, a mouseout method trigger, a click method trigger). For instance, a rapid component could be layered above a non-interactive bitmap or vector representation of a software UI so that a "faux interface" is presented in the software demonstration in order to allow interacting with the demonstration as if the "faux interface" were itself dynamic.

In one embodiment, a method and system are provided for building interactive demonstrations. The system includes a rapid controller (also referred to herein as an RPD controller or RPD design tool) for editing interface mock-ups, in-browser, using HTML/JS/CSS/images. In one embodiment, the rapid controller that allows a designer to place arbitrary images (also referred to herein as "RPD components" or "rapid components") in a browser window alongside normal HTML/JS/CSS. This tool also allows the designer to define interactivity and functionality for these rapid components without writing code. Using the rapid controller, the designer can move the rapid components around and resize them as needed and define behaviors for user mouse events, including page navigation on click, swapping the interacted with rapid component for another rapid component, swapping a different rapid component or groups of rapid components for a different rapid component or group of rapid components on click of a rapid component. Rapid components can also swap out their own defined images when interacted with. A single rapid component can have multiple image states defined for it (e.g., default, hover, hovered, dragging, dropped, dragged, clicked, active, etc.). Supplying these images informs the rapid component that it must support this functionality, which it automatically handles without any further intervention from the designer. Drop and hover targets can also be specified by supplying an ID of the targetable rapid component (or arbitrary HTML element), or else a classname (CSS class name) of valid targets (whether rapid components or HTML elements). HTML class names can be added to rapid components to grant them functionality without having to define any further interactivity. For example, if an image of a button is assigned to a rapid component and called "button.svg", and the designer specifies specific class names (such as "hoverable"), but do not define a hover image for the rapid component, it will automatically seek out a "button_hoverable.svg" image and use that if one is found.

An end user can interact with the rapid components through all normal mouse and keyboard events such as hover, drag/drop, click all, etc. without the end user knowing that they are interacting with images instead of production ready HTML code. Since metadata is stored at HTML nodes themselves in this system, the need for a data store to store metadata can be eliminated.

Preliminarily, it is noted that in the description that follows, FIGS. 2-4, 7-10, 12, 16-19, 21-24, 30A and 30C are flowcharts that illustrate examples of methods in accordance with the disclosed embodiments. With respect to FIGS. 2-4, 7-10, 12, 16-19, 21-24, 30A and 30C, the steps of each method shown are not necessarily limiting. Steps can be added, omitted, and/or performed simultaneously without departing from the scope of the appended claims. Each method may include any number of additional or alternative tasks, and the tasks shown need not be performed in the illustrated order. Each method may be incorporated into a more comprehensive procedure or process having additional functionality not described in detail herein. Moreover, one or more of the tasks shown could potentially be omitted from an embodiment of each method as long as the intended overall functionality remains intact. Further, each method is computer-implemented in that various tasks or steps that are performed in connection with each method may be performed by software, hardware, firmware, or any combination thereof. For illustrative purposes, the following description of each method may refer to elements mentioned above in connection with FIG. 1. In certain embodiments, some or all steps of this process, and/or substantially equivalent steps, are performed by execution of processor-readable instructions stored or included on a computer-readable or processor-readable medium. For instance, in the description of FIGS. 2-4, 7-10, 12, 16-19, 21-24, 30A and 30C that follows, various elements or entities of FIG. 1 can be described as performing various acts, tasks or steps, but it should be appreciated that this refers to processing system(s) of these elements or entities executing instructions to perform those various acts, tasks or steps. For instance, in one embodiment, these elements or entities can include: a user system 112 (including a Rapid Pictorial Demonstration (RPD) Controller/Editor 120, a dynamic Scalable Vector Graphics (SVG) system 150, and an automatic SVG animation system 160), a server system 116 (including a data store 145, a configuration processor 130, a dynamic component swapout processor 136, a discrepancy resolution processor 138, a filename processor 140, an overrides engine 185, and an SVG path creation system 190), and a machine learning system 195. Depending on the implementation, some of the processing system(s) of these elements or entities can be centrally located, or distributed among a number of server systems that work together. Furthermore, in the description of FIGS. 2-4, 7-10, 12, 16-19, 21-24, 30A and 30C, particular examples are described in which various elements perform certain actions by interacting with other elements of the system(s).

Figure 2:
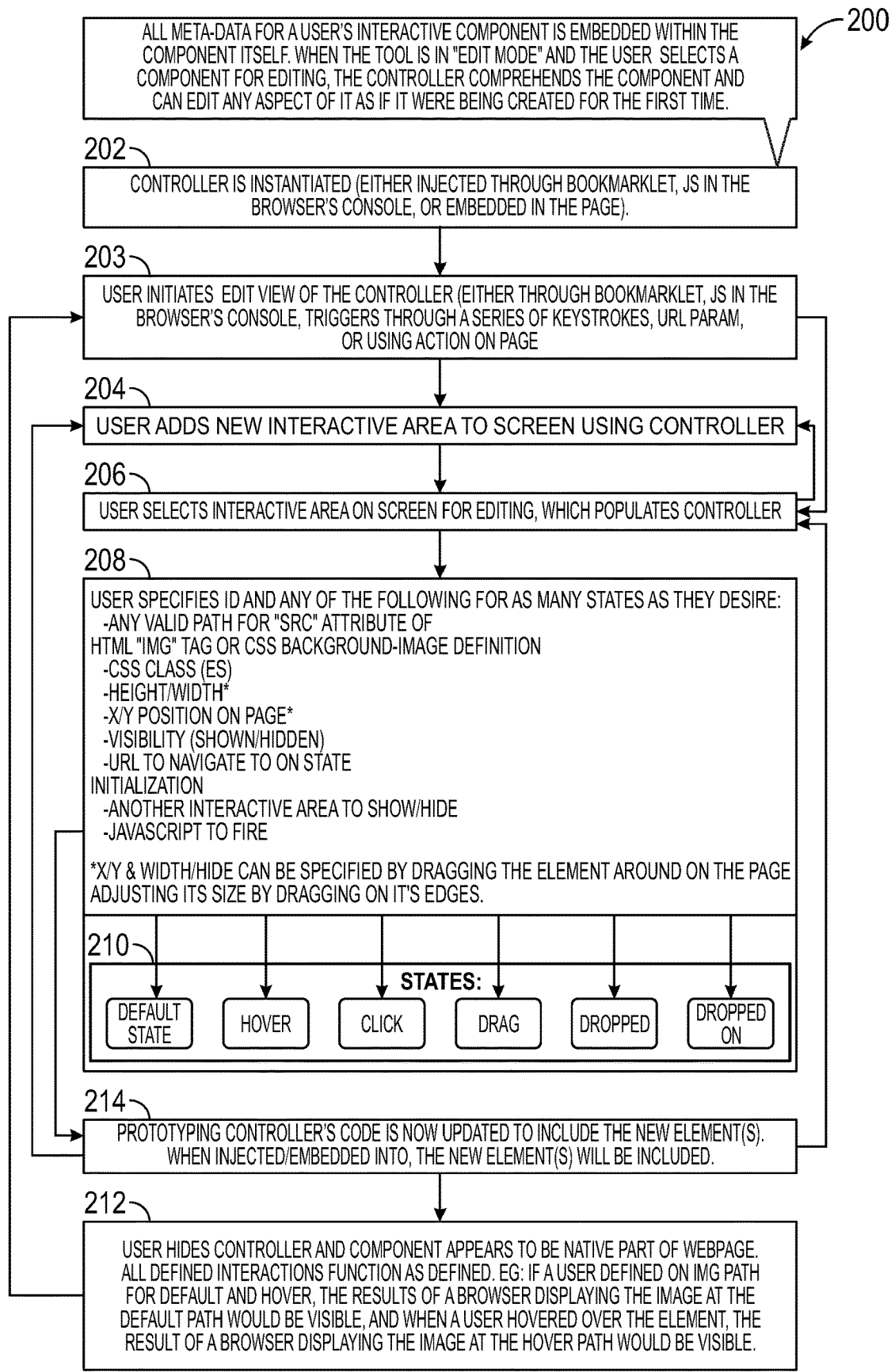
FIG. 2 is a flowchart that illustrates a method for editing interface mock-ups when creating interactive software product demonstration presentations in accordance with the disclosed embodiments.

FIG. 2 is a flowchart that illustrates a method 200 for editing interface mock-ups when creating interactive software product demonstration presentations in accordance with the disclosed embodiments. At 202, a controller can be instantiated, for example, by injecting through a bookmarklet, injecting it through JavaScript in a browser's console, or by embedded code for a webpage. At 203, a user can initiate an edit view of the controller, for example, through a bookmarklet, through JavaScript in a browser's console, or triggers through a series of keystrokes, URL parameters, or other user actions on the page. Notably, all the metadata for the zero or more rapid components is embedded within each of the rapid components themselves. When the tool is in edit mode and the user selects a rapid component for editing, the controller comprehends a rapid component and can edit any aspect of it as if it were being created for the first time. Following 203 the method 200 can proceed to 204 or 206.

At 204, the user adds a rapid component (e.g., a new interactive area) to the GUI (e.g., screen) using the controller. At 206, the user selects an interactive area on the GUI for editing, which populates the controller with an interface for editing and managing the rapid component. At this point the method 200 can loop back to 204 or proceed to 208.

At 208, the user specifies an identifier and states or features of the rapid component for as many states as the user desires. Each time a user clicks on a different rapid component its properties are displayed in the editor. As shown at 208, examples of these states or features can include: any valid definition of a background-image style (e.g., a valid path for a "SRC" attribute of an HTML image tag or CSS background-image definition). A background-image style can be used to specify the location (URL) of an external resource. Definition values can contain a single value URL which specifies the URL (or link) of a media resource such as a link to a source image. For example, a CSS <div> background-image URL is used to specify a URL of the source image. Supported tags can include, for example: <audio>; <embed>; <iframe>; <img>; <input>; <script>; <source>; <track>; <video>, etc. A source element can be used, for example, as a child element of an <audio> and <video> element. Two types of URL links are absolute and relative URLs. An absolute URL points to another webpage. A relative URL points to other files of the same web page. A valid attribute of an HTML tag corresponding to the rapid component can include: one or more CSS classes for that element; height and/or width of that element (e.g., by dragging the element around on the webpage and adjusting its size by dragging on edges of that element); vertical or horizontal position of that element on the webpage (e.g., X and/or Y position on the webpage by dragging the element around on the webpage and adjusting its size by dragging on of that element); visibility attributes of that element (e.g., shown or hidden); a URL to navigate to on state initialization of that element; another interactive area to show and/or hide with respect to that element; JavaScript to execute or "fire" with respect to that element, etc. Parameters such as the horizontal (X) and/or vertical (Y) position of the element on the page and the height and/or width of the element can be specified, for example, by dragging the element around on the webpage and adjusting its size by dragging on its edges of that element.

Within block 208, sub-block 210 shows examples of states which are manipulated/edited/defined during 208 for each rapid component including: a default state, however, click, drag, dropped, dropped on, etc. Following 208 the method 200 can proceed to 214.

At 214, following step 208, the rapid controller's instantiation code is updated to include the new elements, and the method 200 loops to 202. When the rapid controller code is injected and/or embedded into the page during instantiation, the new elements will be included in the page. Following 214 the method 200 can loop back to 204 or 206, or can proceed to 212.

As shown at 212, when a user hides the controller, the rapid component appears to be a native part of the webpage. All interactions defined by the editing process through the controller on the rapid component function as defined. For example, if a rapid component is click-able and when it is clicked on it should navigate the page to a new URL, then at this point those interactions would function according to that definition. As another example, if a user defined an image path for default and hover, the results of a browser displaying the image at the default path would be visible, and when a user hovered over the element, the results of a browser displaying the image at the hover path would be visible. By contrast, during edit mode, interactions defined through the controller on the rapid component do not function as defined. Following 212 the method 200 can loop back to 203.

Implementation of Rapid Controller

In one embodiment, the rapid controller allows for the manipulation (including addition/removal) of rapid divs. A rapid div is a discrete point of interactivity layered on top of the page. A rapid div can be, for example, layered on top of an image in order to make the image seem interactive, or placed on top of a fake screenshotted element on an otherwise built-out page in order to make that element dynamic. At the most basic level, a rapid div is an invisible trigger on the page that causes images on the page to be swapped out (or shown/hidden). Rapid divs can save time in the midst of time-crunches; however, in some implementations the rapid controller can include fuller functionality as will be explained below.

The rapid controller exists on page and can be visible/hidden based on query parameter(s). An invisible rapid div of definable width/height and top/left/bottom/right. There is a mouseover method trigger, mouseout method trigger, and a click method trigger. A rapid div can have an ID and custom CSS classes defined for it. In some embodiments, rapid divs themselves may contain the images (rather than the images to exist within the flow of the page itself). Instances of this could be for things like modals and tooltips or other special interactive page elements. This allows for that. For example, a rapid div can have an image background that can be swapped out in response to mouseover/mouseout/click method triggers. For instance, the rapid div can start hidden and then be swapped out in response to mouseover/mouseout/click method triggers. In some embodiments, where it is desirable to have a special element on the page to be able to be dragged/dropped/resized, a rapid div can allow for that behavior. For example, a rapid div can have drag/drop capabilities, can be a drop-target, and/or can be resizable.

In some embodiments, rapid divs are added to the root of a document, which can make it difficult to show/hide/move groups of them. However, in other embodiments, rapid div groupings can be provided such as, but not limited to, background image, background image size (actual/cover/contain), ID, class(es), background color, hidden, etc.

Figure 3A:
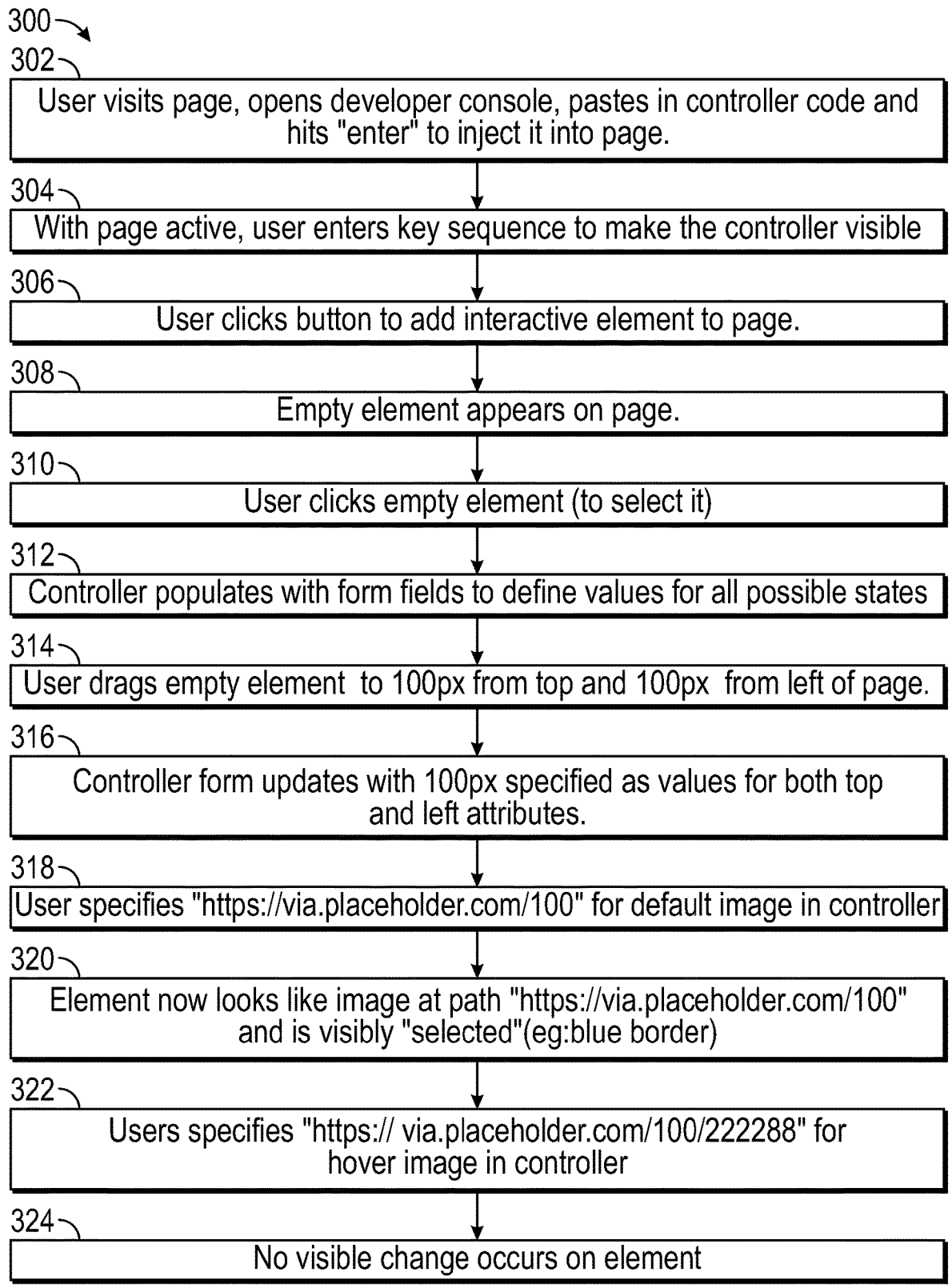
FIGS. 3A and 3B are a flowchart that collectively illustrates a method for editing interface mock-ups when creating interactive software product demonstration presentations in accordance with the disclosed embodiments.
Figure 3B:
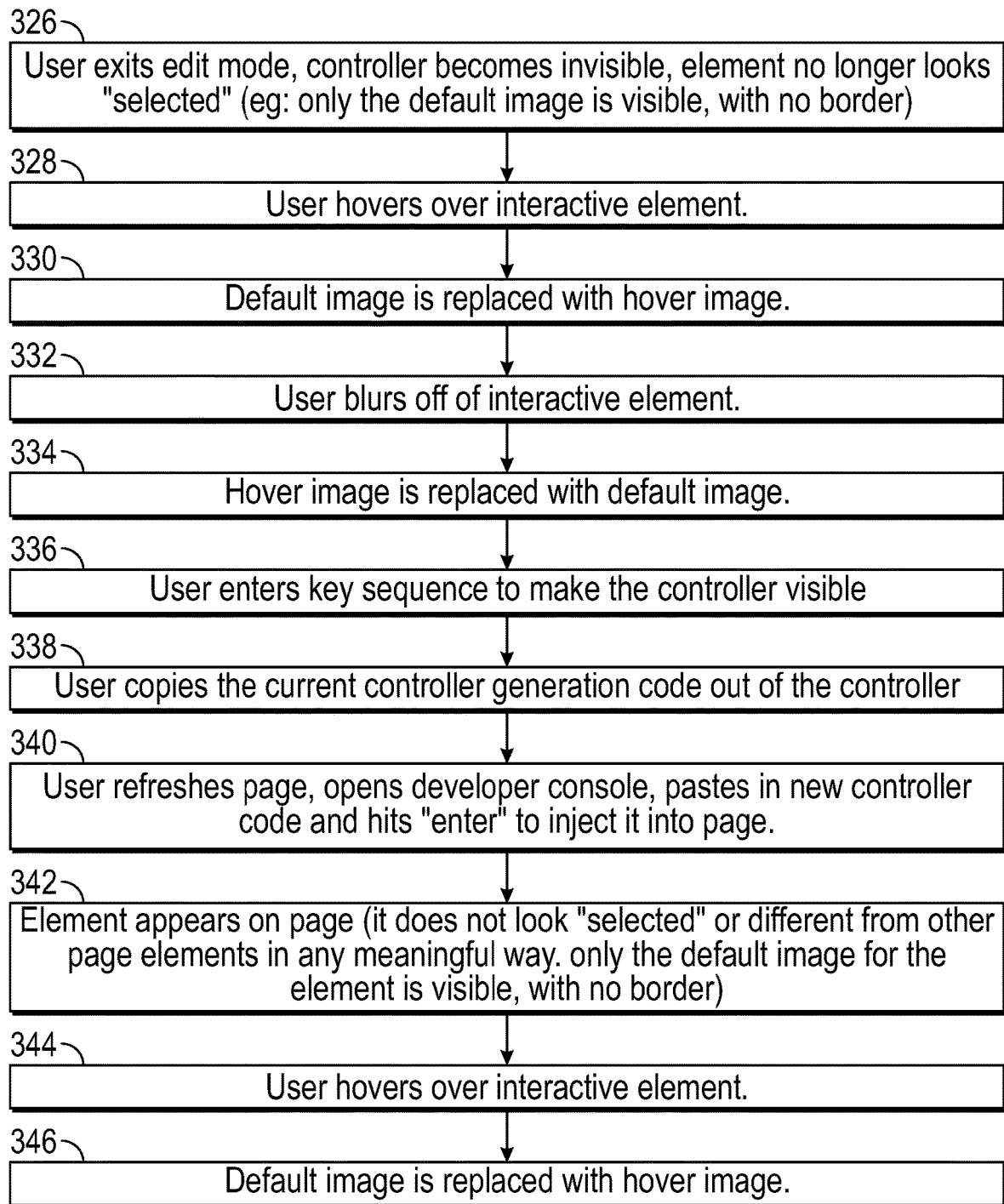

FIGS. 3A and 3B are a flowchart that collectively illustrates a method 300 for configuring a rapid component in accordance with the disclosed embodiments. At 302, a user visits the webpage and opens the developer console. The user can then paste code for the RPD controller into the developer console and from there inject the RPD controller code into the webpage. In one embodiment, the developer could use a method of their choice of inserting the HTML, CSS, and JavaScript code for the RPD Controller into the webpage, in another embodiment the RPD Controller could have a defined methodology for inserting itself into the webpage when the code for itself is pasted into the browser console.

At 304, the user enters a key sequence to make the RPD controller visible, and then at 306, the user adds an empty rapid component to the webpage, for example, by clicking a button. At 308, an empty rapid component appears in the webpage, and at 310, the user selects the empty rapid component by clicking on it. At 312, the RPD controller populates the empty rapid component with form fields that are used to define values for all possible states of the rapid component. At 314, the user can move (e.g., drag) the populated rapid component to an area of the webpage where the user desires it to be located. For instance, in one non-limiting example, the user can drag the rapid component to 100 pixels from the top of the webpage and 100 pixels from the left of the webpage. At 316, the RPD controller can automatically update the rapid component with 100 pixels specified as values for both the top and left attributes.

At 318, the user specifies a URL for a default image in the RPD controller. At 320, the rapid component appears as the default image at the path specified by the URL and can be visibly selected, for example, via the blue border. In other words, the rapid component now looks like the default image at the path specified by the URL. At 322, the user specifies another URL for a hover image in the RPD controller. At 324, no visible change occurs on the rapid component.

At 326, the user exits edit mode. The RPD controller becomes invisible, and the rapid component no longer looks selected. For example, only the default images visible with no border. At 328, the user hovers over the rapid component, and at 330, a default image is replaced with a hover image. At 332, the user blurs off of the rapid component (e.g., when the user stops hovering over the rapid component), and at 334, the hover image is replaced with a default image.

At 336, the user enters a key sequence to make the RPD controller visible, and at 338, the user copies the current or new code for the RPD controller out of the RPD controller. At 340, the user refreshes the webpage, opens a developer console, pastes in the new RPD controller code, and injects into the webpage, for example by hitting enter.

At 342, the rapid component then appears on the webpage. It does not appear as selected or different from other rapid components of the webpage in any meaningful way. Only the default image for the rapid component is visible with no border. At 344, the user hovers over the rapid component, and at 346, the default image is replaced with the hover image.

Dynamic Scalable Vector Graphics (SVG) System and Method

Scalable Vector Graphics (SVG) is an Extensible Markup Language (XML)-based vector image format for two-dimensional graphics with support for interactivity and animation. The SVG specification is an open standard developed by the World Wide Web Consortium (W3C) since 1999. An SVG file is a graphics file that uses a two-dimensional vector graphic format created by the World Wide Web Consortium (W3C). It describes images using a text format that is based on XML. SVG files are developed as a standard format for displaying vector graphics on the web. SVG images and their behaviors are defined in XML text files. This means that they can be searched, indexed, scripted, and compressed. As XML files, SVG images can be created and edited with any text editor, as well as with drawing software. SVG allows three types of graphic objects: vector graphic shapes such as paths and outlines consisting of straight lines and curves, bitmap images, and text. Graphical objects can be grouped, styled, transformed and composited into previously rendered objects. The feature set includes nested transformations, clipping paths, alpha masks, filter effects and template objects. SVG drawings can be interactive and can include animation, defined in the SVG XML elements or via scripting that accesses the SVG Document Object Model (DOM). SVG uses CSS for styling and JavaScript for scripting.

In one embodiment, a dynamic SVG system and associated methods are provided. The dynamic SVG system can be implemented, for example, at a server system or at a browser application of a user system. Regardless of the implementation, the dynamic SVG system can include at least one first hardware-based processor and memory. The memory comprises processor-executable instructions encoded on a non-transient processor-readable media, that when executed by the first hardware-based processor as part of a request-response process can render an interactive software-product demonstration presentation for an envisioned software product within a webpage including causing an SVG file (exported from a graphics software of a UI design tool) to be loaded, and causing a script to digest the exported SVG file. The SVG file can include objects with attributes (e.g., ID) named in a particular way. When executed, the script can digest the exported SVG file by querying for any target objects within the exported SVG file having at least one of: particular attributes named in a target format (e.g., <attribute="value">), and particular tag names (e.g., <tagname>), or both (e.g., <tagname attribute>). For each of the target objects, one or more methods can be called to modify that target object based on at least one of: a first found tag name, a first found attribute, and contents of the first found attribute. The called methods can be used to manipulate one or more of attributes and contents of that target object to modify that target object and generate a manipulated object. Each manipulated object can include outputs of each called method, where the outputs of each called method comprise: appropriate contents to be inserted into the SVG file to generate a final SVG file by inserting the manipulated objects with the appropriate contents into the SVG file.

In some embodiments, the final SVG file can be generated by one or more of: replacing a first found target object in the SVG file to generate the final SVG file (where replacing could include replacing with nothing, e.g., removing the object); replacing a second found target object in the SVG file to generate the final SVG file (where replacing could include replacing with nothing, e.g., removing the object); and adding a newly created object to the SVG file to generate the final SVG file.

In some embodiments, the appropriate contents of the object and the values of the attributes are the outputs of the called methods, or alternatively, are based on the outputs of the called methods. In some embodiments, the attributes can include one or more of: any valid SVG attribute name, and any valid SVG tag name. Stated differently, named attributes of SVG objects may comprise any valid SVG attribute name, for example: id, data-arbitrary-string, class, dx, style, height, etc. Named attributes and contents of SVG objects may comprise things such as: id="dyn-datenow"; id="dyn-datenow--formatMMMddYY"; id="dyn-brandlogo"; id="dyn-brandlogo--formatjpg"; data-brand="salesforce"; data-brand="salesforce--formatdark", etc.

In some embodiments, the contents of each attribute comprise any combination of keys or values which are used in a calculation of the output. For example, the keys or values used in the calculation of the output may comprise any combination of: a key wherein the key is used to specify a function; a key and at least one value, wherein the key is used to specify a function which the at least one value is provided as at least one parameter to; a key and a value which is used to specify a lookup table, wherein the value functions as the key to access another value or a method therein; and a key and values which are used to specify a lookup table, wherein a first value functions as the key to access a method therein and wherein subsequent values are provided as parameters to the found method; and a key and values which are used to specify other objects within the SVG file. The other objects comprise any combination of: keys matching other tag names; values matching other tag names; keys matching other attribute names; values matching other attribute names; keys matching other attribute values; and values matching other attribute values. Here, a lookup table can be a JSON Object, SQL Database, NoSQL Database, XML Dataset, or anything wherein "key" and "value(s)" have meaningful value.

In some embodiments, the processor-executable instructions, when executed by the first hardware-based processor, are configurable to cause: a final result to be displayed via a graphical user interface when the SVG file is interacted with during the interactive demonstration presentation for the envisioned software product. The final result can illustrate how a feature of the envisioned software product will operate in response to user interaction with the graphical user interface once the envisioned software product is fully developed. The final result can be based on: a first found image; and variations of the first found image that are based upon processes that: modify the first found image according to tag names, attributes, tag contents, and processes to which those tag names, attributes, and tag contents are relevant; add to the first found image according to tag names, attributes, tag contents, and processes to which those tag names, attributes, and tag contents are relevant; and subtract from the first found image according to tag names, attributes, tag contents, and processes to which those tag names, attributes, and tag contents are relevant.

Figure 4:
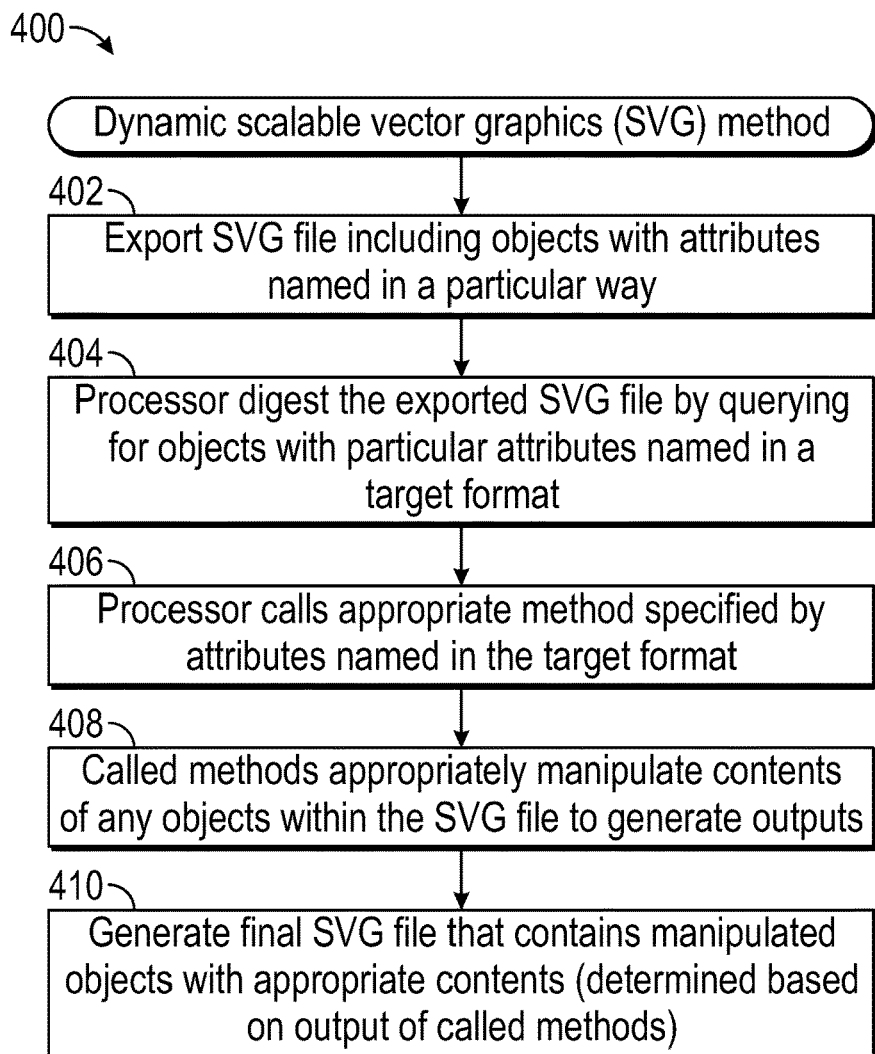
FIG. 4 is a flowchart that illustrates a method for generating an SVG file in accordance with the disclosed embodiments.
Figure 5:
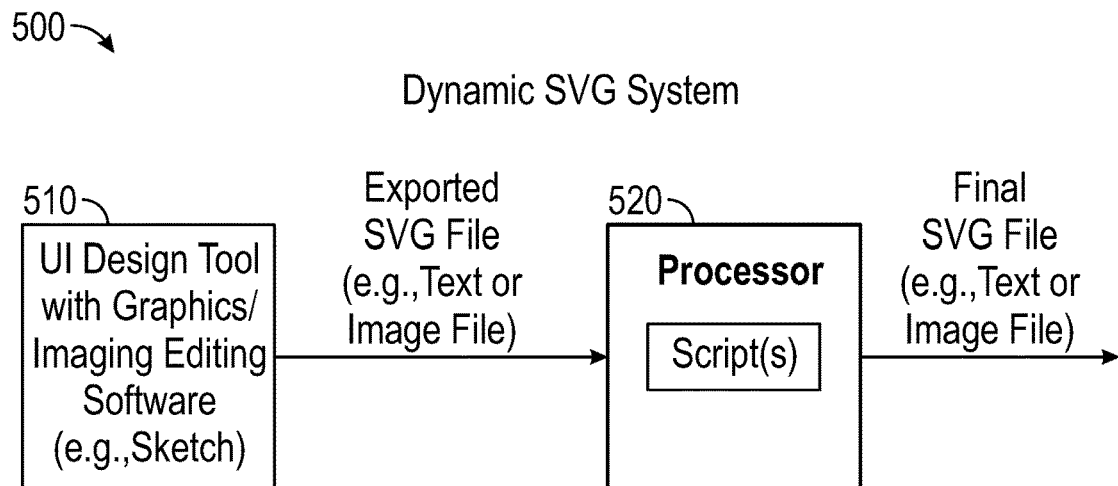
FIG. 5 is a block diagram of a dynamic SVG system in accordance with the disclosed embodiments.

Non-limiting embodiments will now be described with reference to FIGS. 4 through 8. FIG. 4 is a flowchart that illustrates a method 400 for generating an SVG file in accordance with the disclosed embodiments. FIG. 5 is a block diagram of a dynamic SVG system 500 in accordance with the disclosed embodiments. FIG. 4 will be described with reference to FIG. 5. The dynamic SVG system 500 can implement method 400 as part of a request-response process to render an interactive software-product demonstration presentation for an envisioned software product within a webpage.

Method 400 can include causing an SVG file (exported at 402 from a graphics software of a UI design tool) to be loaded, and causing (at 404) a script to digest the exported SVG file. The SVG file can include objects with attributes (e.g., ID) named in a particular way.

When executed, the script can digest (at 404) the exported SVG file by querying for any target objects within the exported SVG file having at least one of: particular attributes named in a target format (e.g., <attribute="value">), and particular tag names (e.g., <tagname>), or both (e.g., <tagname attribute>).

At 406, for each of the target objects, one or more methods can be called to modify that target object based on at least one of: a first found tag name, a first found attribute, and contents of the first found attribute.

At 408, the called methods can be used to manipulate one or more of attributes and contents of that target object to modify that target object and generate a manipulated object.

At 410, each manipulated object can include outputs of each called method. The outputs of each called method can include appropriate contents to be inserted into the SVG file to generate a final SVG file by inserting the manipulated objects with the appropriate contents into the SVG file. In some embodiments, the final SVG file can be generated by one or more of: replacing a first found target object in the SVG file to generate the final SVG file (where replacing could include replacing with nothing, e.g., removing the object); replacing a second found target object in the SVG file to generate the final SVG file (where replacing could include replacing with nothing, e.g., removing the object); and adding a newly created object to the SVG file to generate the final SVG file.

In some embodiments, the appropriate contents of the object and the values of the attributes are the outputs of the called methods, or alternatively, are based on the outputs of the called methods. In some embodiments, the attributes can include one or more of: any valid SVG attribute name, and any valid SVG tag name. Stated differently, named attributes of SVG objects may comprise any valid SVG attribute name, for example: id, data-arbitrary-string, class, dx, style, height, etc. Named attributes and contents of SVG objects may comprise things, that will be described in two non-limiting embodiments below with reference to FIGS. 7 and 8, such as: id="dyn-datenow"; id="dyn-datenow--formatMMMddYY"; id="dyn-brandlogo"; id="dyn-brandlogo--formatjpg"; data-brand="salesforce"; data-brand="salesforce--formatdark", etc.

The contents of each attribute are not limited to the examples above, but more generally can include or comprise: any combination of keys or values which are used in a calculation of the output. For example, the keys or values used in the calculation of the output may comprise any combination of: a key wherein the key is used to specify a function; a key and at least one value, wherein the key is used to specify a function which the at least one value is provided as at least one parameter to; a key and a value which is used to specify a lookup table, wherein the value functions as the key to access another value or a method therein; and a key and values which are used to specify a lookup table, wherein a first value functions as the key to access a method therein and wherein subsequent values are provided as parameters to the found method; and a key and values which are used to specify other objects within the SVG file. The other objects comprise any combination of: keys matching other tag names; values matching other tag names; keys matching other attribute names; values matching other attribute names; keys matching other attribute values; and values matching other attribute values. Here, a lookup table can be a JSON Object, SQL Database, NoSQL Database, XML Dataset, or anything wherein "key" and "value(s)" have meaningful value. Two non-limiting examples of components that can be part of the dynamic SVG system and method include: dyn-date, and dyn-brand.

Dyn-Date

Figure 6A:
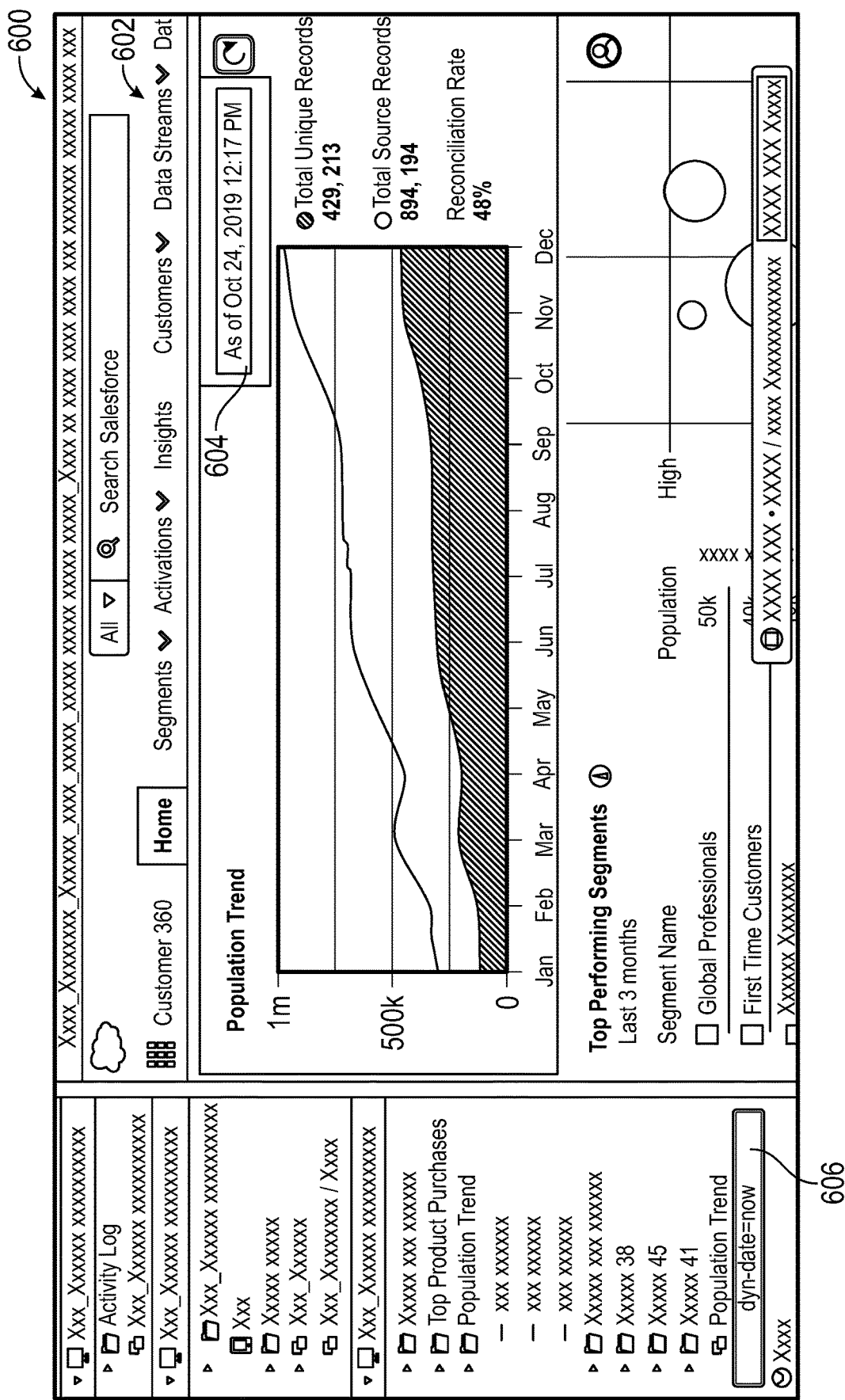
Figure 6C:
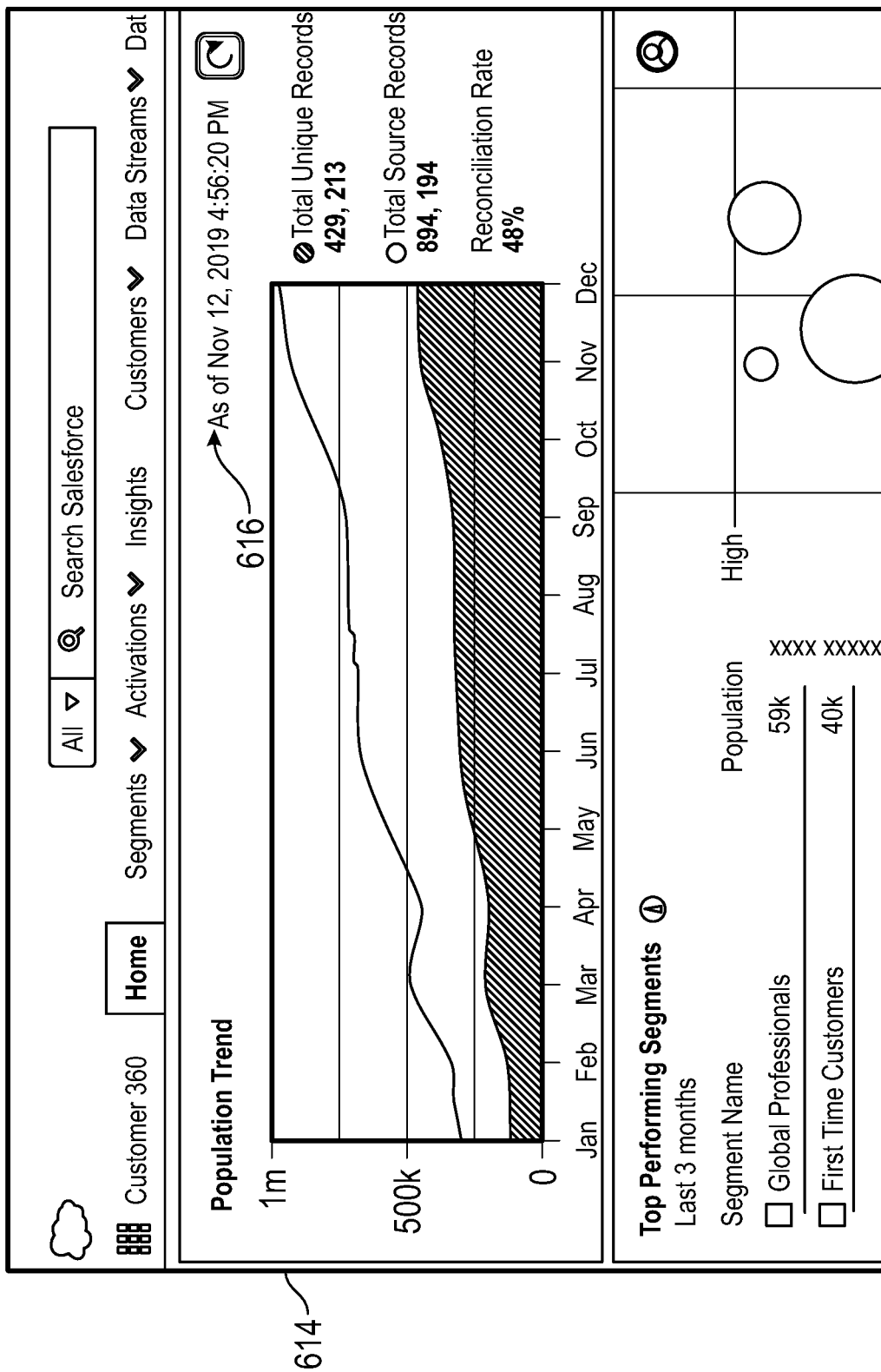
Figure 7:
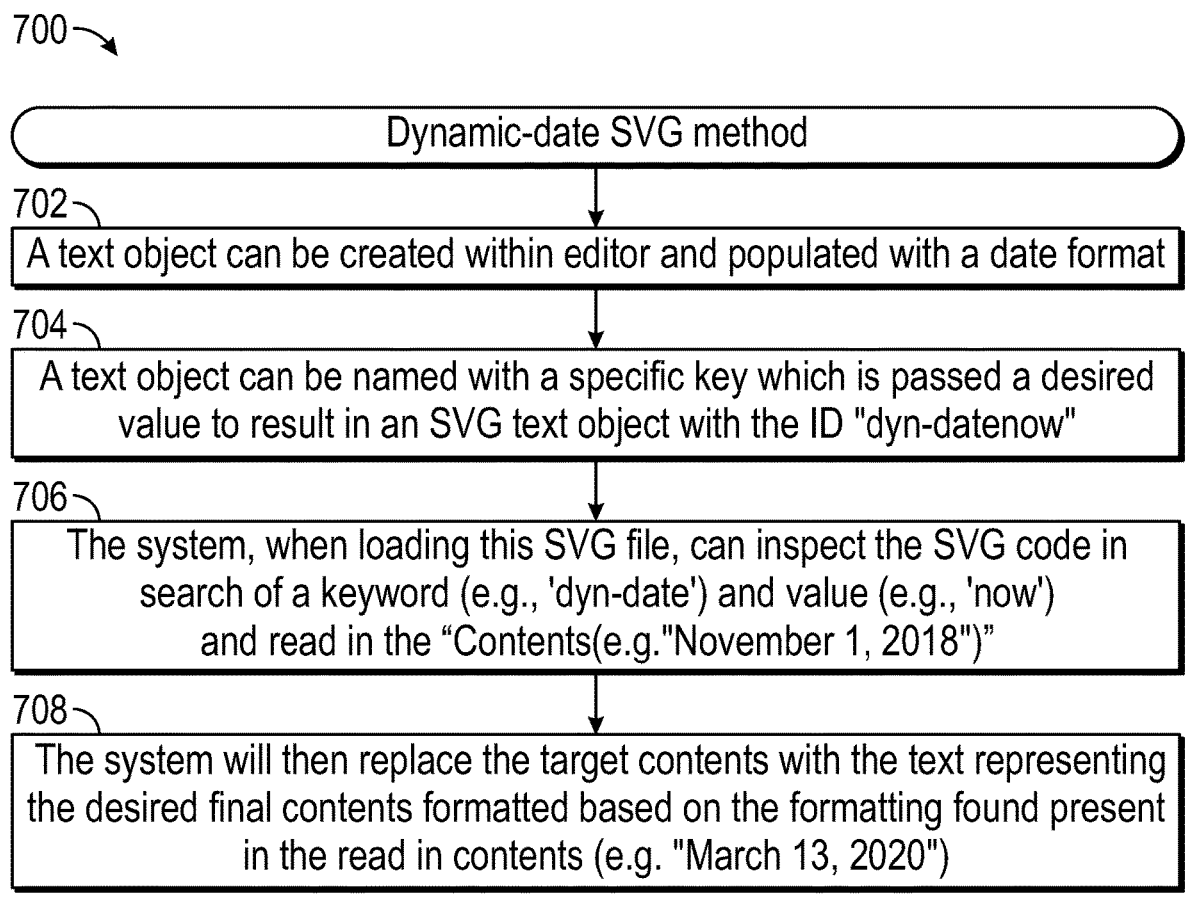
FIG. 7 is a flowchart that illustrates the dynamic SVG method in accordance with the disclosed embodiments.

FIGS. 6A-6C are a series of screenshots 602, 608, 614 that collectively show a dynamic SVG method 400 (referred to herein as dyn-date) in accordance with the disclosed embodiments. FIG. 7 is a flowchart that illustrates the dynamic SVG method 700 in accordance with the disclosed embodiments, and will be described with reference to FIGS. 6A-6C.

In this non-limiting example, viewers would be viewing the file in a browser. As will be explained below, the dynamic SVG method 700 allows for naming identifiers (IDs) on SVG components so that a JavaScript (JS) engine can replace components within an SVG with text specified in JSON files. As shown at 602 of FIG. 6A and at 702 of FIG. 7, a text object can be created within an interface design tool (e.g., image or graphics editor software such as Sketch®) and populated with a date format (as shown by rectangle 604 of FIG. 6A). Thereafter, at 704 of FIG. 7, the text object can be named with a specific key (e.g., 'dyn-date' 606 in FIG. 6A) which is passed a desired value (e.g., "'now'" 606 in FIG. 6A) to result in an SVG text object with the ID "dyn-date=now" (as shown by 610 of FIG. 6B). The value "now" is a value the system has been instructed to understand and calculate to mean "this very moment." There are many other such keys (or keywords) one using this system could select, such as "yesterday", "1 week ago", "2 weeks ago", "1 month ago", etc. as well as some fuzzy dates, such as "about a month ago" or "about two months ago."

At 706 of FIG. 7, the dynamic SVG system, when loading this SVG object, can inspect the SVG code in search of a keyword (e.g., 'dyn-date') and value (e.g., 'now') and read in the contents (e.g., "Nov. 1, 2018"), which it will then use to determine the date format the creator would like the date to appear in (e.g., format that a text component or an image component is to appear in when rendered).

As shown in FIG. 6C and at 708 of FIG. 7, the system will then replace the target contents with the text representing the desired final contents formatted based on the formatting found present in the read in contents. (e.g. "Mar. 13, 2020").

Dyn-Brand

Figure 8:
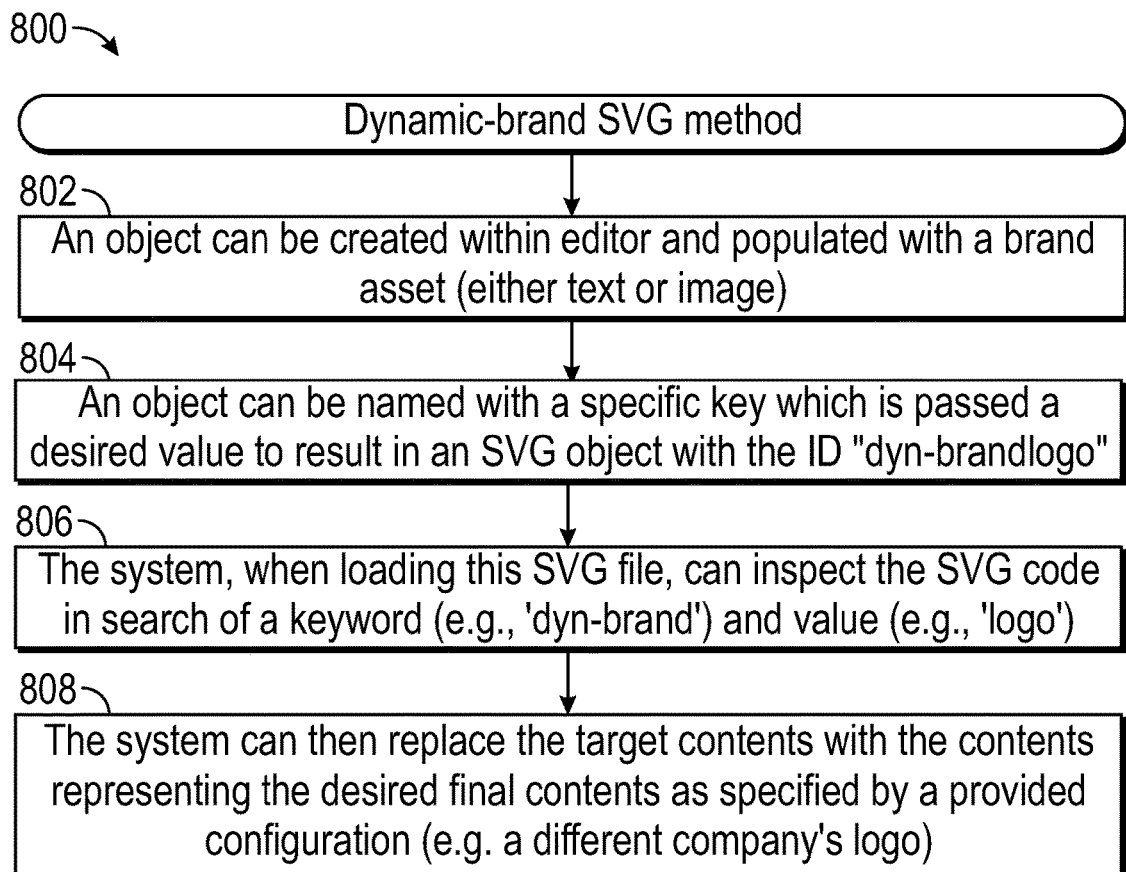
FIG. 8 is a flowchart that illustrates another dynamic SVG method in accordance with the disclosed embodiments.

FIG. 8 is a flowchart that illustrates another dynamic SVG method 800 (referred to herein as dyn-brand) in accordance with the disclosed embodiments. Dyn-brand works in a similar manner as dyn-date. As in FIG. 7, prior to the start of method 800, a user can use editing software of a user interface design tool to associate an identifier (ID) with an object (e.g., a text component or an image component).

At 802, an object can be created within an interface design tool (e.g., image or graphics editor software such as Sketch®) and populated with a brand asset (either text or image). At 804, an object can be named with a specific key which is passed a desired value to result in an SVG object with the ID "dyn-brand=logo".

At 806, the dynamic SVG system, when loading this SVG file, can inspect the SVG code in search of a keyword (e.g., 'dyn-brand') and value (e.g., 'logo' which can be, for instance, a company's logo).

At 808, the system can then replace the target contents with the contents representing the desired final contents as specified by a provided configuration (e.g. a different company's logo). For example, a JavaScript (JS) engine of the browser application can then automatically replace the contents of the labeled object with contents of a portion of a JSON file that it found in the data store to define a format that the image is to appear in when rendered.

Automatic SVG Animation

Various systems and methods are disclosed for automatic animation of SVG components. These systems and methods will be described with reference to FIGS. 9-11. Additional implementation details for one non-limiting implementation are described in U.S. Provisional Application No. 62/937, 658, which is incorporated herein by reference in its entirety.

Figure 9:
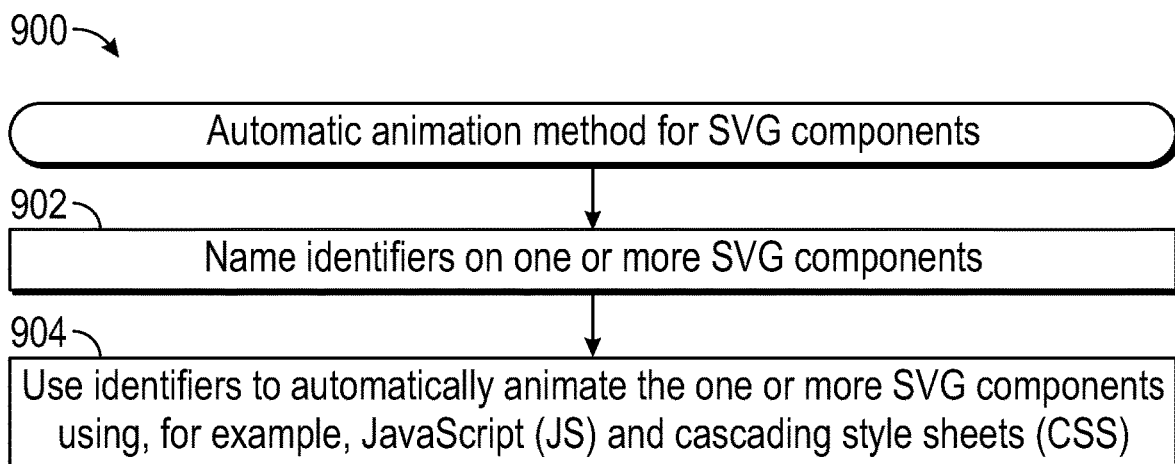
FIG. 9 is a flowchart that illustrates a method for automatic animation of SVG components in accordance with the disclosed embodiments.

FIG. 9 is a flowchart that illustrates a method 900 for automatic animation of SVG components in accordance with the disclosed embodiments. The method 900 begins at 902, where identifiers are named on SVG components. At 904, the identifiers (IDs) can be used to automatically animate the SVG components using, for example, JavaScript (JS) and Cascading Style Sheets (CSS). CSS is a stylesheet language used to describe the presentation of a document written in HTML or XML (including XML dialects such as SVG, MathML or XHTML). CSS describes how elements should be rendered on screen, on paper, in speech, or on other media.

Figure 10:
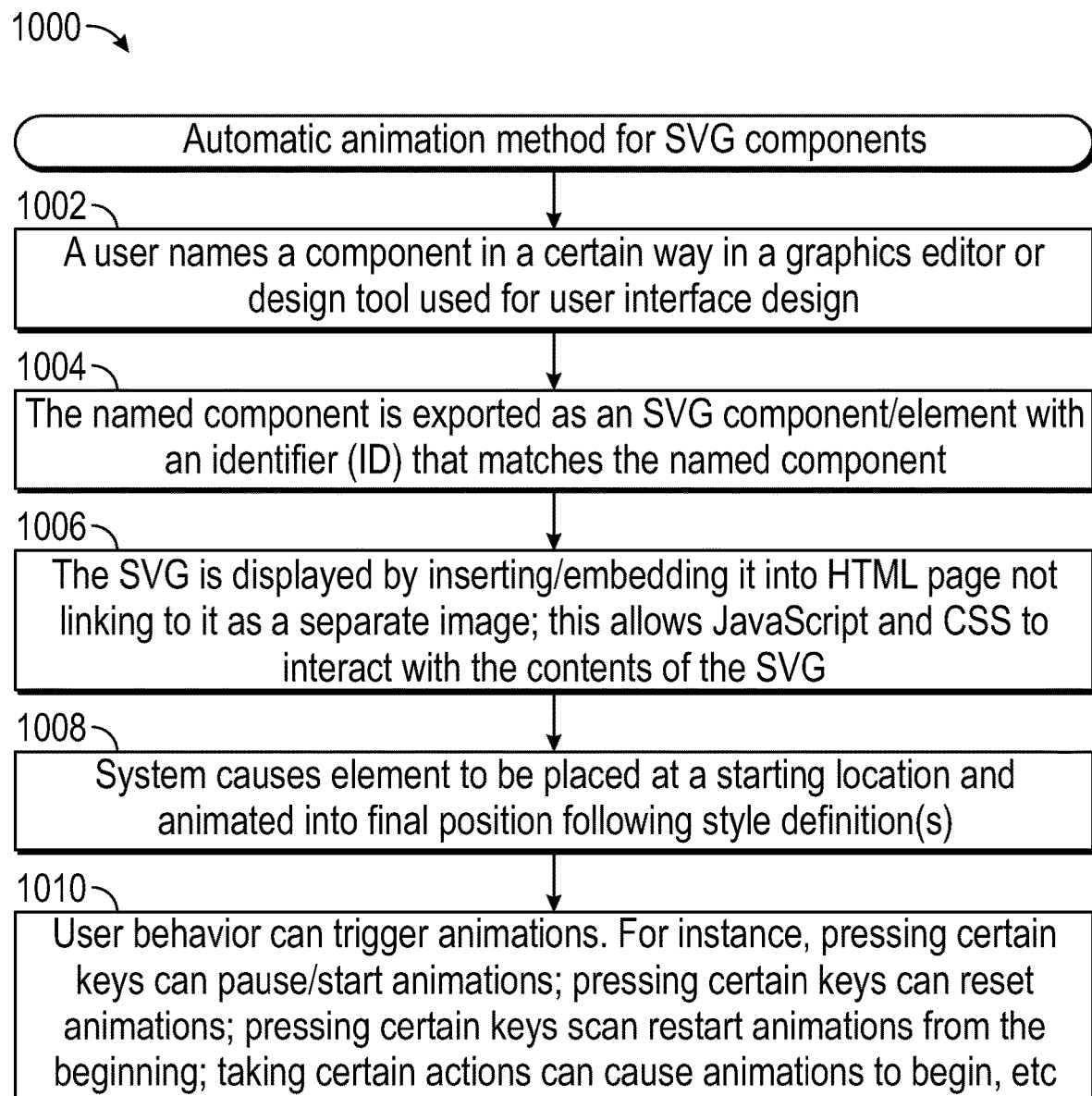
FIG. 10 is a flowchart that illustrates another method for automatic animation of SVG components in accordance with the disclosed embodiments.
Figure 11:
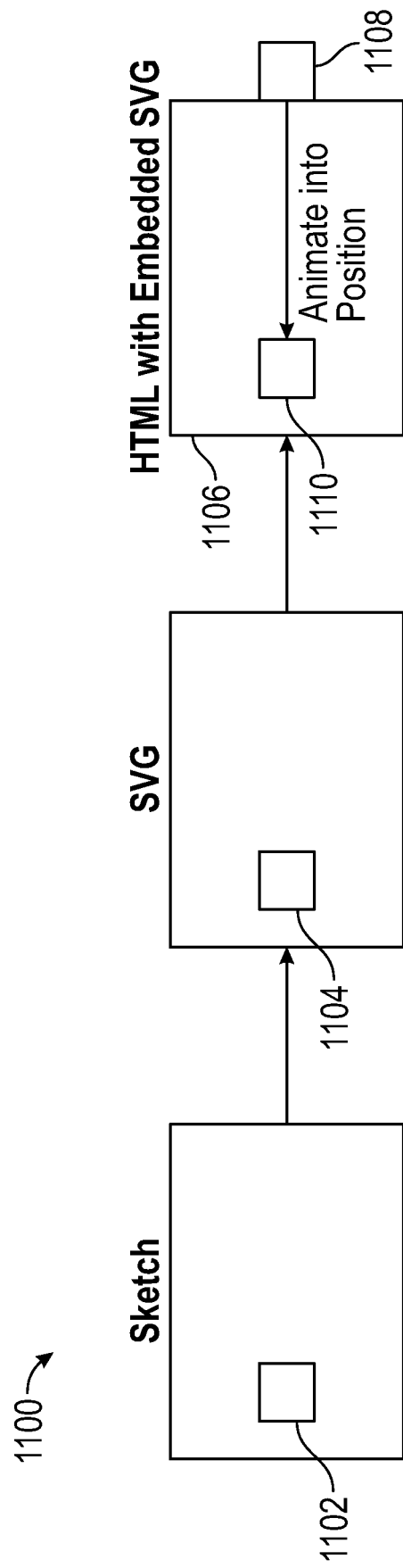
FIG. 11 is a flow diagram that illustrates automatic animation of SVG components in accordance with the disclosed embodiments.

FIG. 10 is a flowchart that illustrates another method 1000 for automatic animation of SVG components in accordance with the disclosed embodiments. The method 1000 of FIG. 10 will be described below with reference to FIG. 11, which is a flow diagram 1100 that illustrates automatic animation of SVG components in accordance with the disclosed embodiments. As will be explained below, the method 1000 can allow for IDs to be named on SVG components so that the system can cause them to be animated using, for example, JS and CSS. The method 1000 begins at 1002, where a user names a component 1102 (FIG. 11) in a certain way, for example, in Sketch®. Sketch® is a graphics editor or design tool used for user interface design. Sketch® is entirely vector-based and is used primarily for designing UI and UX of mobile apps and web. In accordance with one non-limiting implementation, the designs can also be saved in PNG, JPG, TIFF, WebP, etc., formats. The designs created in Sketch® are utilized by application engineers to design mobile applications and by website developers who convert designs into websites. At 1004, Sketch® exports the component 1102 as an SVG component/element 1104 (FIG. 11) with an ID that matches the component 1102 (FIG. 11). At 1006, the system displays the SVG by inserting/embedding it into the HTML page (at 1106 of FIG. 11), not linking to it as a separate image. This allows JS and CSS to interact with the contents of the SVG. At 1008, the system can cause element to be placed at a starting location 1108 (FIG. 11) and animated into final position 1110 (FIG. 11) following style definitions, such as, whether the animation should be paused on display or animate immediately, if the animation should be triggered based on scroll, the duration of the animation, and the appearance/behavior of the animation, etc. At 1010, user behavior can trigger animations. For instance, pressing certain keys can pause/start animations; pressing certain keys can reset animations; pressing certain keys can restart animations from the beginning; taking certain actions can cause animations to begin (e.g., scrolling can trigger animations which are defined as being "on-scroll" animations), etc.

Dynamically Swapping Out Components for SVG Components

In one embodiment, a system and method are provided for dynamically swapping out components for SVG components. To explain further, from within an image editing software, an element can be named in a certain way so that when it is exported as an SVG element, a script can pass over it and when the script processes that element, the contents of that element can be replaced with contents from another location. For instance, an image can be named in a certain way such that instead of displaying that image, the system places an actual HTML/JS/CSS element in that spot.

Figure 12:
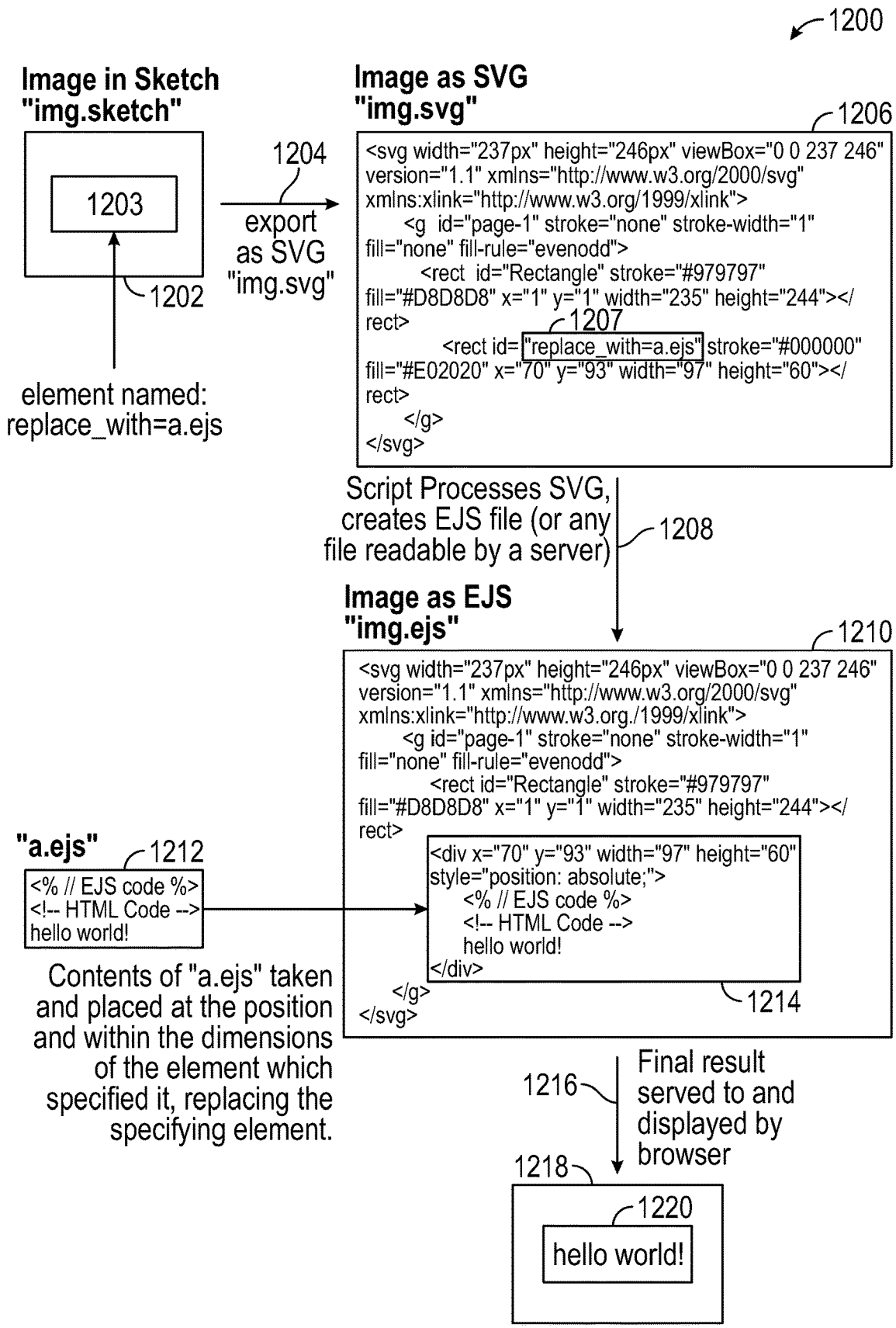
FIG. 12 is a flowchart that illustrates a method for dynamically swapping out components for SVG components in accordance with the disclosed embodiments.

FIG. 12 is a flowchart that illustrates a method 1200 for dynamically swapping out components for SVG components in accordance with the disclosed embodiments. At 1202, an element 1203 of an image created in image editing software, such as, Sketch®, is named. In this example, the name of an element 1203 of the IMG.sketch is replaced_with a.ejs (element named: replace_with=a.ejs). At 1204, the image is exported as an SVG file (img.svg) 1206. As shown at 1207, the image that was exported as SVG (img.svg) 1206 includes an element 1203 that has been replaced with a.ejs (element named: replace_with=a.ejs). At 1208, a script processes the SVG file, and creates a file that is readable by a server (e.g., an EJS file (a.ejs) 1206 in this non-limiting example). As shown at 1210, contents 1214 of the "a.ejs" 1212 are taken and placed at the position and within the dimensions of the element 1207 which specified it, replacing the specifying element 1207 in the EJS file (image.ejs) 1210. At 1216, a final result 1218 is served to and displayed by a browser 1218 where the element 1203 has been replaced with a new element 1220 having a different background and the text "hello world!" as specified by the contents 1214 of the "a.ejs" 1212.

Discrepancy Resolution Processor (DRP), System and Method for Programmatically Comparing, Fixing, and Flagging Discrepancies Between a First Exported Image File Having a Raster-Based Image Format and a Second Exported Image File Having a Vector-Based Image Format A system is provided that can execute one or more scripts to cause a discrepancy resolution processor to be executed on a first exported image file (having a raster-based image format such as PNG), and a second exported image file (having a vector-based image format such as SVG) to programmatically compare, fix, and flag discrepancies or differences between the first exported image file and the second exported image file.

In some embodiments, a DRP and associated methods are provided. The DRP can, for example, programmatically compare, fix, and/or flag discrepancies between two different image formats of exported visual representations of the same subject matter, such that each is appropriate for display in a web browser by comparing them for a "sufficient" threshold of visual similarity (e.g., that is configurable and acceptable similarity). For instance, in one non-limiting implementation, the DRP can, for example, programmatically compare, fix, and/or flag discrepancies between a raster image format (e.g., PNG) versus a vector image format (e.g., SVG) of exported visual representations of the same subject matter. In this example, discrepancies between the two different image formats are resolved so that each is appropriate for display in a web browser with acceptable similarity (e.g., are within a defined threshold of visual similarity that is acceptable or "sufficient.").

In one embodiment, a server system is provided that includes at least one first hardware-based processor and memory. The memory comprises processor-executable instructions encoded on a non-transient processor-readable media. The processor-executable instructions comprise one or more scripts. When executed by the first hardware-based processor, the processor-executable instructions are configurable to cause the discrepancy resolution processor to be executed on a first exported image file (having a raster-based image format such as PNG), and a second exported image file (having a vector-based image format such as SVG) to programmatically compare, fix, and flag discrepancies (e.g., differences) between the first exported image file and the second exported image file. The second exported image file has a format that is subsequently programmatically manipulatable including one or more of: interpreting the image data as a Document Object Model (DOM); and manipulating the image data via JavaScript or CSS.

In accordance with this method, the first exported image file can be resized so that dimensions of the resized version of the first exported image file are the same size dimensions as those of the second exported image file.

The second exported image file can be cleaned up to make the second exported image file appear visually similar enough to the first exported image file so as to fulfill the needs of the software demonstration being created. For example, cleaning up the second exported image file, can include one or more of: renaming identifiers of the second exported image file to ensure that each is unique and do not collide with other identifiers of other SVGs that on a webpage; cleaning identifiers of the second exported image file so they are valid for Hypertext Markup Language (HTML); and performing other manipulations with respect to the second exported image file to optimize use of the second exported image file in a web browser. The other manipulations of the second exported image file can include one or more of altering objects of the second exported image file so that they are positioned, sized, oriented, colored, and/or shaded, in a way that more closely matches their positioning, sizing, orientation, colorizing and shading in the first exported image file.

After cleaning up the second exported image file, the second exported image file can be loaded as a Document Object Model (DOM) so that a script can interact with the DOM as if the second exported image file were in a browser.

Problems (or problematic characteristics) with the second exported image file that resulted when the second exported image file was exported from image editing software can be identified, and any problematic characteristics of the second exported image file that are identified can be adjusted. Examples of problematic characteristics associated with the second exported image file can include one or more of: text sizing being incorrect; text spacing being incorrect; leading; word spacing; letter spacing; border width; and drop shadows missing; and component positioning on the page being placed incorrectly. For example, if an element has a line-spacing specified on it, the script mathematically calculates where the element ought to be (based on font-size and line-spacing) and places it there instead of where the image editing software put it. As another example, the script can adjust an element's font-size and letter-spacing based on a formula, and/or adjust an element's font-weight based on a formula, etc.

The second exported image file can be inserted within a Hypertext Markup Language (HTML) shell that mimics a final context that the second exported image file will be loaded into. The second exported image file can be rendered in the browser and a screenshot of the rendered second exported image file can be taken.

The resized version of the first exported image file and the screenshot of the second exported image file can be processed to determine the discrepancies between the resized version of the first exported image file and the screenshot of the second exported image file. For example, the resized version of the first exported image file and the screenshot of the second exported image file can be processed via a diff program that determines the discrepancies between the resized version of the first exported image file and the screenshot of the second exported image file to generate a difference file that records the discrepancies.

By comparing the discrepancies to a configurable threshold, it can be determined whether an image of the resized version of the first exported image file and an image of the screenshot of the second exported image file are similar enough, according to the configurable threshold, to be considered to match.

When the image of the resized version of the first exported image file and the image of the screenshot of the second exported image file are similar enough to be considered to match, the matching images are placed into a success folder (e.g., placing difference files of the matching images into the success folder). When the image of the resized version of the first exported image file and the image of the screenshot of the second exported image file are not similar enough to be considered to match, the non-matching images can be placed in a failure folder.

In some embodiments, the discrepancies between the resized version of the first exported image file and the screenshot of the second exported image file can be highlighted in any way that is visually detectable so that the discrepancies are clearly visible to a user. In addition, a visual representation of discrepancies that can be created that cycles back and forth between the resized version of the first exported image file and the screenshot of the second exported image file so that the discrepancies between the resized version of the first exported image file and the screenshot of the second exported image file are observable when viewed by a user. The visual representation could be any way to quickly communicate discrepancies or differences between the resized version of the first exported image file and the screenshot of the second exported image file so that the discrepancies are observable to a user (e.g., an animated GIF file).

One possible non-limiting embodiment will now be described with reference to FIGS. 13-15. In this embodiment, a system and method are provided for programmatically comparing, fixing, and flagging discrepancies between PNG and SVG export files; however, it should be appreciated that the discrepancy resolution processor and similar methodologies can be applied to other types of image files (e.g., exported image file having a raster-based image format and another exported image file having a vector-based image format) to programmatically compare, fix, and flag discrepancies (e.g., differences) between the exported image files. An SVG file is a graphics file that uses a two-dimensional vector graphic format created by the World Wide Web Consortium (W3C). It describes images using a text format that is based on XML. SVG files are developed as a standard format for displaying vector graphics on the web. As is also known in the art, a PNG is a raster-graphics file-format that supports lossless data compression. PNG was developed as an improvement for Graphics Interchange Format (GIF). PNG supports palette-based images, grayscale images, and full-color non-palette-based RGB or RGBA images.

Figure 13:
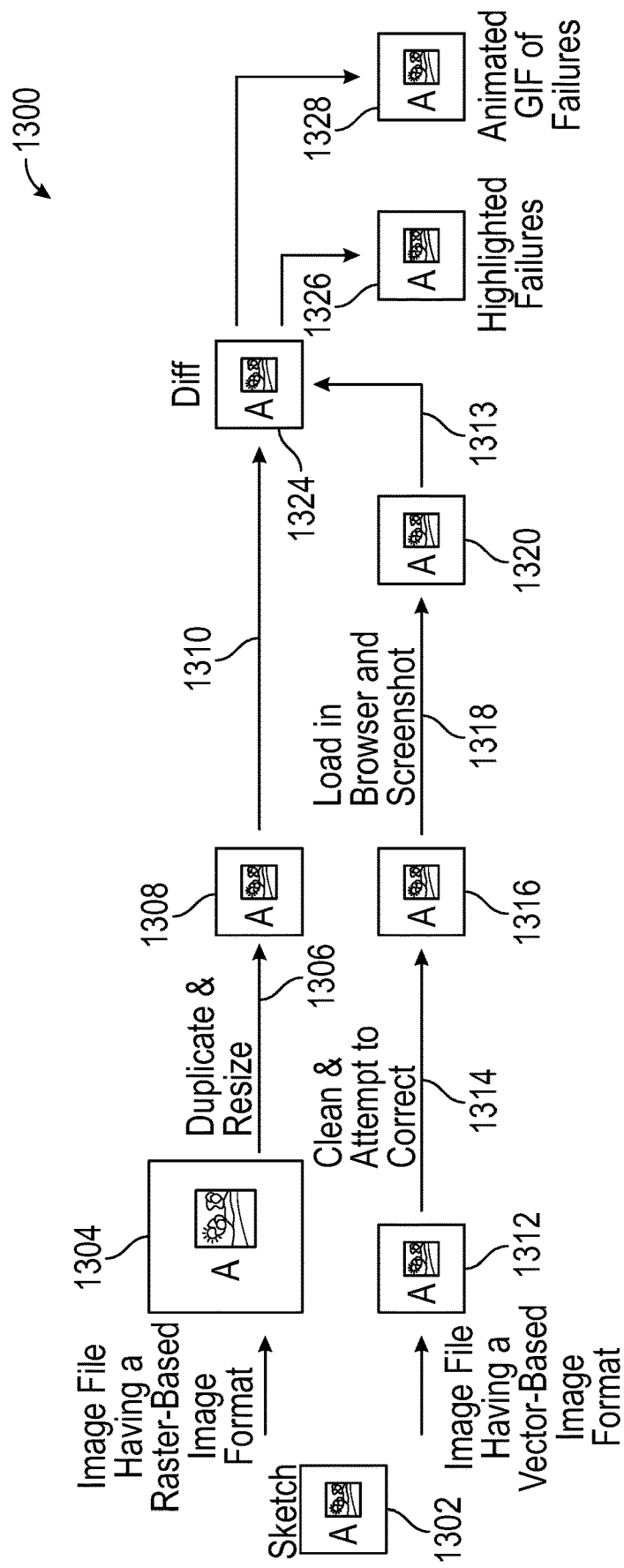
FIG. 13 is a flow diagram of a method for programmatically comparing, fixing, and flagging discrepancies between PNG and SVG exports in accordance with the disclosed embodiments.
Figure 14:
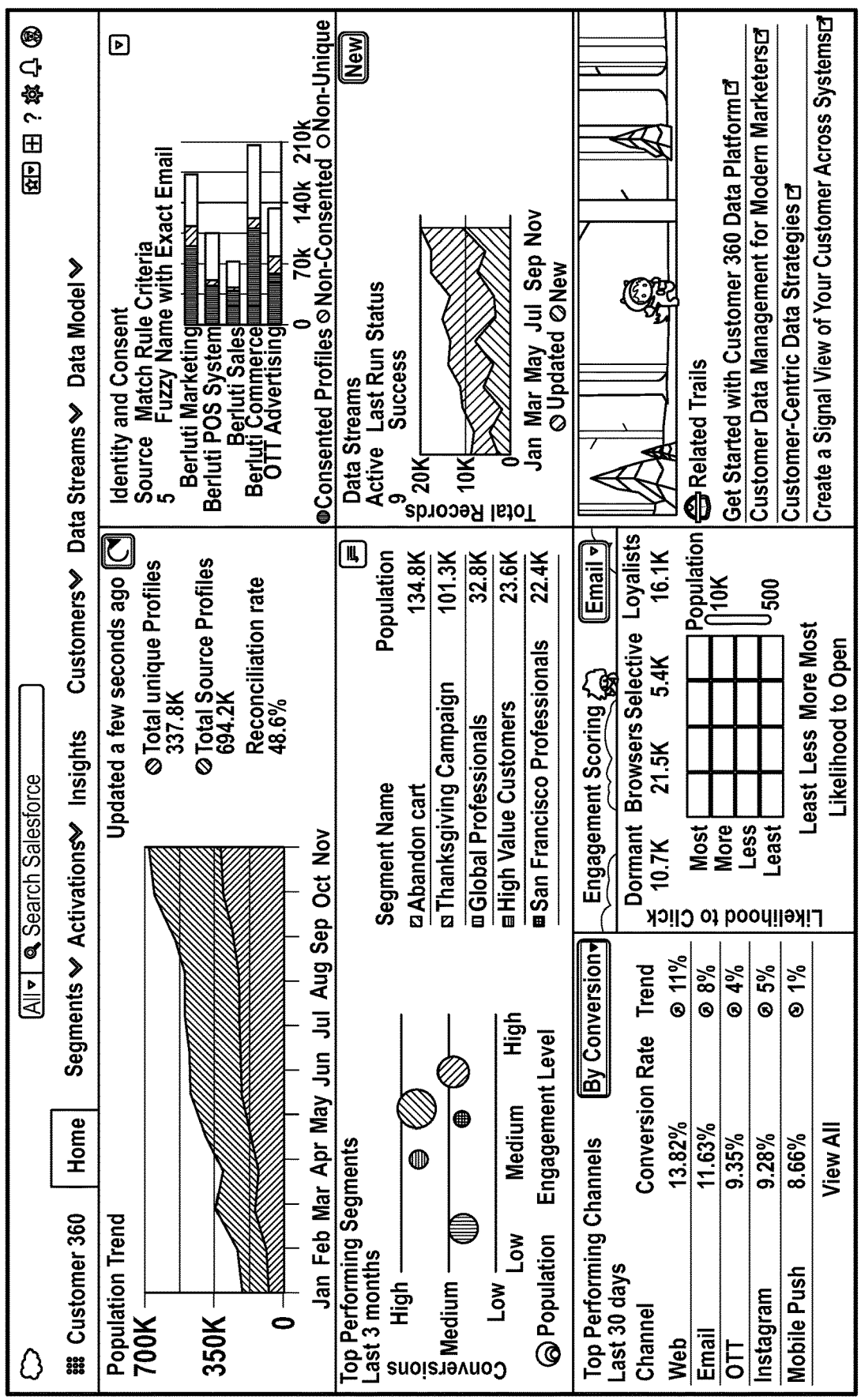
FIG. 14 is a screenshot of a graphical user interface in accordance with the disclosed embodiments.

FIG. 13 is a flow diagram of a method 1300 for programmatically comparing, fixing, and flagging discrepancies between PNG and SVG exports in accordance with the disclosed embodiments. The method 1300 begins when an image that was created in image editing software, such as Sketch®, is exported as a PNG file 1304 and an SVG file 1312. At 1306, a script duplicates and resizes the PNG file 1304 to be the same dimensions as the SVG file 1312 (e.g., in case they exported PNG file 1304 at 2×). This resized PNG file 1308 is the same size as the SVG file 1316.

At 1314, a script can use a tool for optimizing SVG images, such as SVGO, to clean up the SVG file 1312, which can include, renaming all IDs to ensure they are unique and do not collide with other SVG images that may be on page, cleaning IDs so they are valid for HTML, and performing other general SVG cleanup and optimizations by enabling or disabling its plugins for specific optimizations (e.g., removal of empty attributes from a SVG). SVGO is an example of a command-line interface (CLI) tool that runs on Node.js and enables compression of SVGs. At 1316, the script loads the SVG file 1312 as a Document Object Model (DOM) so that it can interact with it as if it were inside of a browser, and then looks for common problems with SVG exports from the image editing software (e.g., common problems with SVG exports from Sketch®). For example, if an element has a line-spacing specified on it, the script mathematically calculates where the element ought to be (based on font-size and line-spacing) and places it there instead of where the image editing software put it. As another example, the script can adjust an element's font-size and letter-spacing based on a formula, and/or adjust an element's font-weight based on a formula, etc. At 1316, the script also places the SVG file 1312 within an HTML shell that mimics the final context the SVG will be loaded into. At 1318, the script renders the SVG file 1320 in the browser and takes a screenshot.

At 1310, the script passes the PNG file 1304 to a diff program, and at 1322 the script passes the SVG file 1312 to the diff program. At 1324, the diff program determines all differences between the resized PNG file 1308 and the screenshot 1318 of the SVG file 1312 and generates a difference file (of diff). A difference file can refer to a file with a DIFF file extension that records all the ways that two files are different. At 1324, the script determines whether the images of the resized PNG file 1308 and the screenshot 1318 of the SVG file 1312 are similar enough to be considered to "match" and places diff files and GIFs of "matching" images into a "success" folder, and places all remaining (non-matching) images in a "failure" folder.

At 1326, the script highlights all differences (between the resized PNG file 1308 and the screenshot 1318 of the SVG file 1312) so that they are clearly visible to a user. For example, in one implementation, as illustrated in the screenshot shown in FIG. 14, the script highlights all differences between the resized PNG file 1308 and the screenshot 1318 of the SVG file 1312, for instance, in a different font that the font used on the rest of the page. In one implementation, shown in FIG. 14, the differences can be highlighted in a bold font, but it should be appreciated that the differences can be highlighted in any way that is visually detectable or clearly visible to a user (e.g., by highlighting in a different type of font from that used on the remainder of the page, by highlighting in a different colored font from that used on the remainder of the page, by highlighting in a different sized font from that used on the remainder of the page, etc.).

Figure 15:
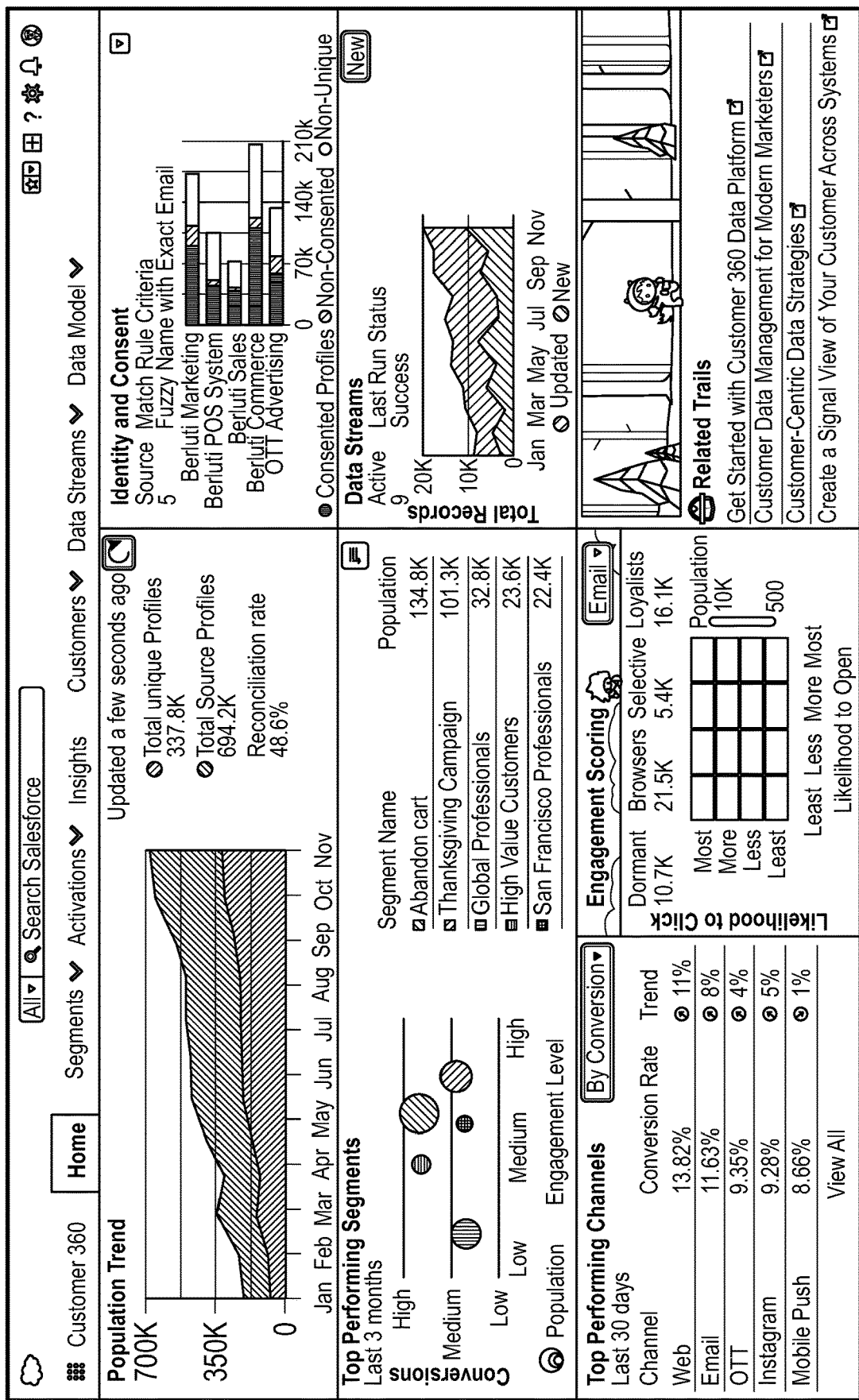
FIG. 15 is a screenshot of a graphical user interface in accordance with the disclosed embodiments.

At 1328, as illustrated in the screenshot shown in FIG. 15, the script creates a GIF that cycles back and forth between the screenshot 1318 of the SVG (FIG. 15) and the resized PNG 1308 (not shown) so that a human being can view the GIF and see the differences between the resized PNG file 1308 and the screenshot 1318 of the SVG file 1312. As is known in the art, the Graphics Interchange Format (GIF) is an image file having a bitmap image format. The GIF image format can be used to make still images, or to create animated images. Stated differently a GIF can refer to a lossless format for image files that supports both animated and static images. GIF files can hold multiple pictures at once that can be loaded sequentially if they're decoded a certain way. This way, the script can notify the user of failures and display them, for example, as an animated GIF of failures.

Programmatic Creation of a Software Product Demonstration Presentation Using Filenames as Configuration Information In one embodiment, a demonstration serving system is provided that allows for programmatic creation of a software product demonstration presentation using filenames as configuration information. The demonstration serving system can include computer hardware and computer-executable code that is configurable to programmatically create software product demonstration presentations when executed by the computer hardware. The software product demonstration presentation or "demo" can refer to a digital artifact that is presented, for example, on stage during a presentation, for instance, by a demonstration presenter (e.g., the person or people presenting the software product demonstration).

A demonstration serving system and associated methods are provided for creating an interactive demonstration presentation for an envisioned software product. The interactive demonstration presentation for the envisioned software product is a digital artifact that is presented during a presentation to present and demonstrate features of the envisioned software product and how the envisioned software product is to function and operate in response to user interaction with a graphical user interface (GUI) such that the interactive demonstration presentation mimics features, look, and feel of the envisioned software product once it is fully developed without creating custom-made Hypertext Markup Language (HTML), JavaScript and Cascading Style Sheets (CSS) of a real software product. The interactive demonstration presentation for the envisioned software product includes GUI layouts, graphics design, sketches and mockups that demonstrate various features of the envisioned software product.

In some embodiments, the demonstration serving system and associated methods can be implemented at a server system comprising at least one hardware-based processor and memory. The memory comprises processor-executable instructions encoded on a non-transient processor-readable media. The processor-executable instructions, when executed by the hardware-based processor, are configurable to cause creating the interactive demonstration presentation for the envisioned software product. A filename processor can process a filename for each image file of a plurality of image files to generate server configuration information specified by the filename of that image file. Each filename can include an identifier (ID) and instructions that indicate one or more other images that are to be overlaid on top of the corresponding image in order to create a visual representation during the interactive demonstration presentation for the envisioned software product.

A first subset of the configuration information can be stored as a data store of styling variable configuration information (e.g., created Cascading Style Sheets (CSS) or CSS preprocessor files that have config information stored in such a way that they can be used in a CSS build process). When a Sass compiler runs, it needs a physical file to @import its "default variables", and it cannot work from "in-memory" only. The subset of configuration information can be processed to generate CSS files (or other appropriate styling information) for the interactive demonstration presentation for the envisioned software product.

A different or second subset of the configuration information (e.g., the server-only data) can be stored as in-memory configuration information that is relevant to a configuration of a demonstration presentation to be created for an envisioned software product. The in-memory configuration information can be processed to select appropriate templates for the interactive demonstration presentation for the envisioned software product. For example, a JavaScript server has known sets of HTML templates that it uses or combines to generate the demonstration presentation.

Based on the in-memory configuration information, the templates, the CSS files and the image files, Hypertext Markup Language (HTML) for the interactive demonstration presentation for the envisioned software product can be programmatically created and rendered. An HTML response, when rendered in a browser of a user system causes sets of images (e.g., multimedia assets, audiovisual assets, and images that are programmatically created (on-the-fly) to be displayed in a certain order and timing, as appropriate to mimic features of the envisioned software product, when presented during the interactive demonstration presentation. The HTML response can include, for example, one or more of the Cascading Style Sheets (CSS) files and JavaScript code embedded in or attached to the HTML response.

In some embodiments, when processing the filenames, the filename processor can derive meaning from patterns of strings in each filename of each image file to determine certain configuration information specified by the filename. The configuration information can be used to determine which images should be selected and used by the demonstration serving system to create a final visual representation of the interactive demonstration presentation for the envisioned software product. For example, given a directory (or target directory) containing one or more images and, optionally, any existing information already discovered about the target directory and images it contains (configuration data), the filename processor can iterate through the images, and apply a filename processing algorithm to each. Discovered configuration data, new and existent, can be provided back into the algorithm for "introspection" purposes. A goal of this process is to end up with configuration information that can be utilized by a demonstration serving system to present an array of provided images, in the browser, in the right order, in such a way that, when prompted by the demonstration presenter, the currently shown image or set of related images is replaced with another in such a way so as to mimic the features, look, and, feel of an envisioned software product. In essence, meaning from the patterns of strings in the filename can be derived and used to make fake software.

In some embodiments, when processing the filenames, the filename processor can derive meaning from patterns of strings in each filename of each image file by analyzing each filename of each image file for patterns of strings by breaking the filename into parts to determine configuration information specified by that filename, each part providing a different type of configuration information about that image file. For instance, in one implementation, the filenames can be sorted to determine an order that images are to be presented in; a part of each filename that uniquely identifies each image file can be identified; groups of related image files can be determined; traits for each filename that allow corresponding image files to be presented and concealed in specific places at specific times can be determined; and parts of each filename that will allow the demonstration serving system to present information specific to the interactive demonstration presentation can be determined, etc. The different types of configuration information comprise: the order, the parts of each filename that uniquely identify each image file, the groups, the traits, and the parts of each filename that will allow the demonstration serving system to present information specific to the interactive demonstration presentation. One possible non-limiting embodiment will now be described with reference to FIGS. 16-20.

Figure 16:
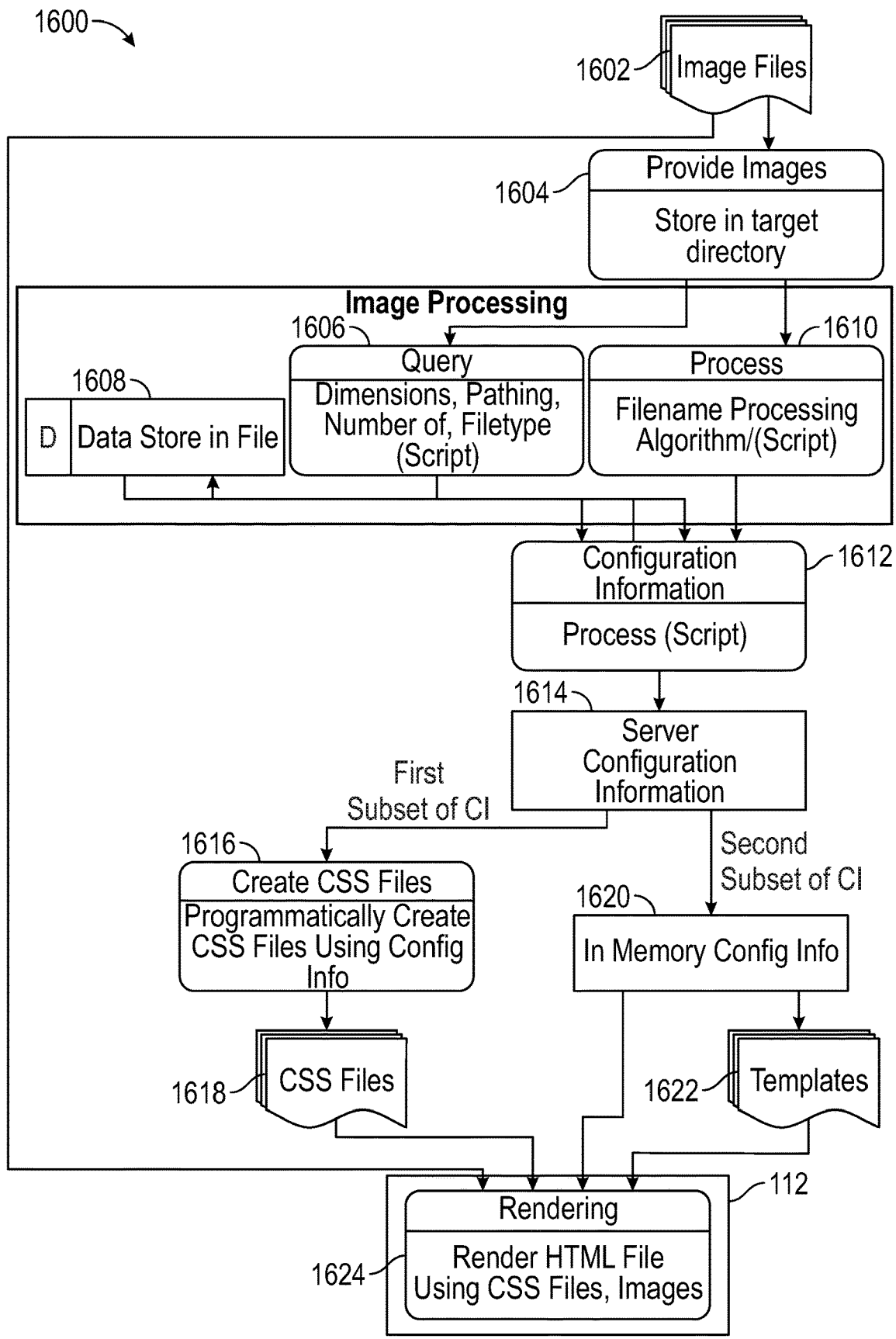
FIG. 16 is a flowchart of a method for programmatic creation of a software product demonstration presentation using filenames as configuration information in accordance with the disclosed embodiments.

FIG. 16 is a flowchart of a method 1600 for programmatic creation of a software product demonstration presentation using filenames as configuration information in accordance with the disclosed embodiments. The software product demonstration presentation that is produced can mimic the features, look, and feel of an envisioned software product, while avoiding the need to actually create the envisioned software product.

The method 1600 begins at 1602, where one or more image files are received, and named so that they are in compliance with a filename processing algorithm. At 1604, the image files are added to a prescribed location in the demonstration serving system and stored in a target directory. At 1606, the provided image files (from step 1604) are queried for dimensional and filesystem-related attributes (e.g., dimensions, pathing, number of, filetype, etc.) and the query results 1607 are stored at a data store or file at 1608, and also stored as configuration information 1612 at 1614. For raster images, the size of the file, in pixels, height and width can be used to determine the width and height of the demo to be created. Dimension information is passed both into server memory and written to file in SCSS files. The SCSS files are used in the CSS build process. The dimension information is used in the server memory to selectively apply styles and conditionally execute different functions, as appropriate for discrete aspect ratios and physical dimensions. Pathing can refer to the path information for images, which is used by the system to understand in which demo the images are to be included, and to populate the rendered HTML response with paths to the images so they may be served to the browser. The number of images to be in the demo being created is used to programmatically build the CSS and populate the rendered HTML correctly. The filetype (e.g., "png", "svg", "gif", "mp4", "mov", "jpg/jpeg", etc.) allows each type to use a different HTML boilerplate.

At 1610, the filename processing algorithm (described below) processes the image files (that were stored in the target directory at 1604) and the filename processing results are stored as configuration information 1612 at 1614. As such, the stored configuration information (at 1614) includes configuration information discovered during querying (step 1606) of the image files and other configuration information generated as a result of the filename processing algorithm (step 1610) of the image files. This configuration information specifies traits and behaviors that the demonstration overall or particular steps of the demonstration should have. For example, this configuration information could indicate that a particular step of the demonstration should have a portion which animates out from the left side of the browser window (aka a "drawer") when the step is displayed on the screen, or that the step should have a portion which remains visible at the top (aka a "sticky header") when the rest of that step of the demonstration is scrolled. This configuration information may be stored as a JSON object.

A first subset of the configuration information can be stored as a data store of styling variable configuration information (e.g., created Cascading Style Sheets (CSS) or CSS preprocessor files that have config information stored in such a way that they can be used in a CSS build process). The data store can vary depending on the implementation, and can be implemented, for example, as a database or a file such as a text file. The subset of configuration information can be processed to generate CSS files (or other appropriate styling information) for the interactive demonstration presentation for the envisioned software product. At 1616, a first subset of the stored configuration information (from 1614) is used to programmatically create Cascading Style Sheets (CSS) files 1618 specific to the needs of the software product demonstration.

At 1620, a second subset of the stored configuration information (from 1614) can be stored as in-memory configuration information 1620. This second subset of the configuration information (e.g., the server-only data that is different than the first subset) is relevant to the configuration of a demonstration presentation to be created for an envisioned software product (e.g., locally that is relevant to the configuration of the specific software product demonstration being created in the context of the demonstration serving system it is intended to occupy).

At 1622, the in-memory configuration information 1620 can be processed to select appropriate templates for the interactive demonstration presentation for the envisioned software product. For example, a JavaScript server has known sets of HTML boilerplates that it uses to generate the demonstration presentation, and each step has its own type. At 1624, the provided image files (from step 1604), the CSS files 1618, in-memory configuration information 1620 and/or templates 1622 can be utilized to programmatically create and render Hypertext Markup Language (HTML) for the interactive demonstration presentation for the envisioned software product. An HTML response, when rendered in a browser of a user system causes sets of images (e.g., multimedia assets, audiovisual assets, and images that are programmatically created (on-the-fly) to be displayed in a certain order and timing, as appropriate to mimic features of the envisioned software product, when presented during the interactive demonstration presentation. The HTML response can include, for example, one or more of the Cascading Style Sheets (CSS) files and JavaScript code embedded in or attached to the HTML response. When presented in the browser via the demonstration serving system, the interactive demonstration presentation sufficiently mimics the features, look, and feel of the envisioned software product, so as to be indistinguishable from said "real" product to an average observer, when presented by a practiced demonstration presenter. Notably, this method 1600 is performed automatically without requiring an engineer/developer to create custom-made HTML, JavaScript, or CSS.

Filename Processing Method for Creation of a Software Product Demonstration Presentation Using Filenames as Configuration Information and Naming Conventions In one embodiment, a system or architecture is provided that employs a filename processing methodology or algorithm. The filename processing method can be used to create a software product demonstration presentation using filenames as configuration information. The filename processing method allows for displaying certain "traits" that are specified by filenames. In addition, in one implementation, this system and method can employ a filenames convention that can be utilized in accordance with the disclosed embodiments. In one embodiment, the naming conventions, described in U.S. Provisional Application No. 62/937,658, can be used in one implementation of a filename processing method that will now be described with reference to FIGS. 17 through 20.

Figure 17:
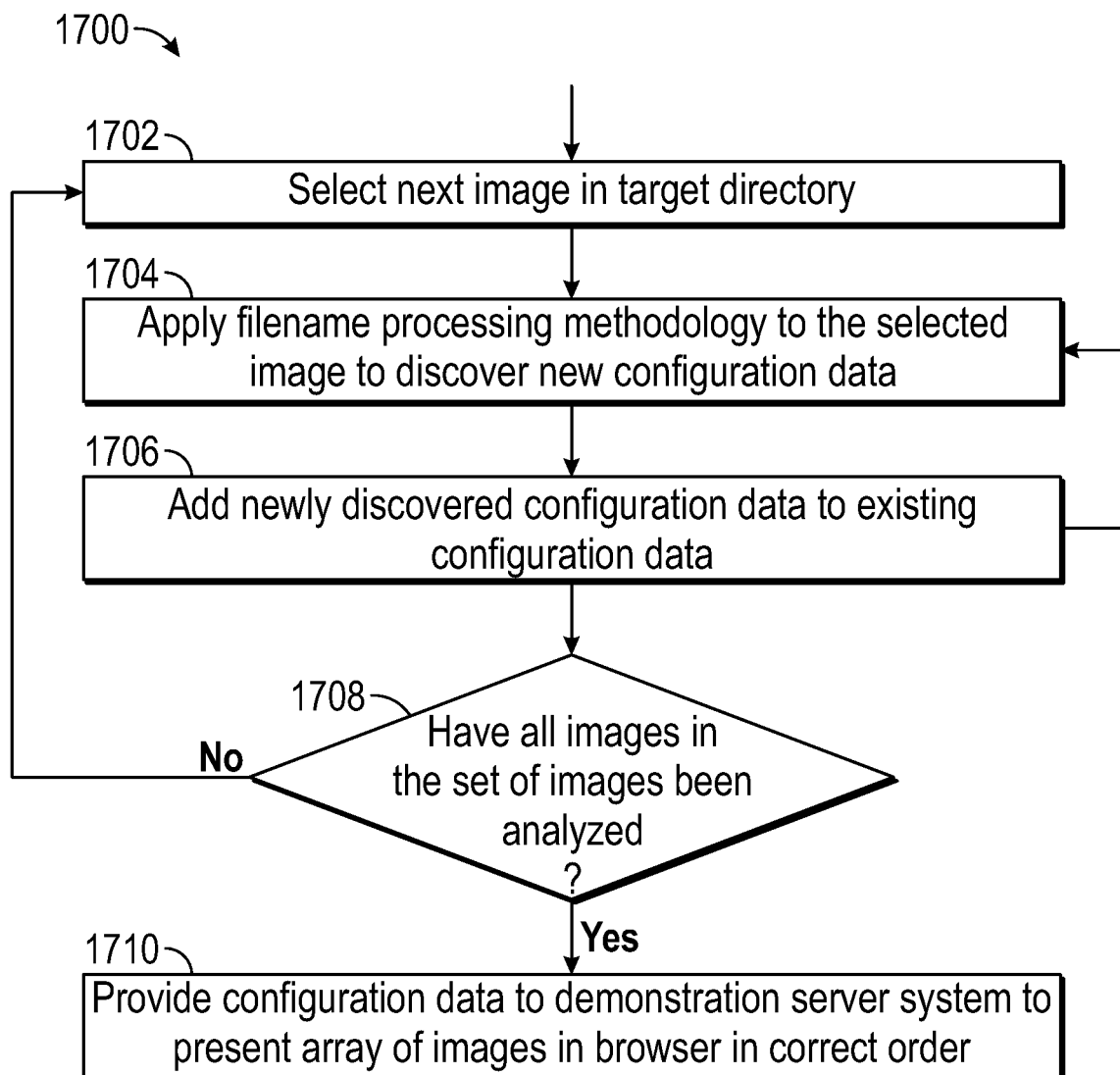
FIG. 17 is a flowchart that illustrates a filename processing method for creating a software product demonstration presentation using filenames as configuration information in accordance with the disclosed embodiments.

FIG. 17 is a flowchart that illustrates a filename processing method 1700 for creating a software product demonstration presentation using filenames as configuration information in accordance with the disclosed embodiments. One goal of the method 1700 is to derive meaning from the patterns of strings in the filename so that this derived meaning can be used to create a software product demonstration presentation that mimics software that has not yet been developed and created (e.g., make "fake" or "faux" software product demonstration presentation).

Given a target directory containing one or more images (and, optionally, any existing configuration information or data already discovered about the target directory and images it contains), at 1702 through 1706, the system can iterate through each of the images. At 1702, an image in the target directory is selected. At 1704, the system can apply a filename processing methodology or algorithm to the selected image to process its filename. After a filename for the selected image is processed, at 1706, any newly discovered configuration data can be added to any existing configuration data. All of this discovered configuration data, new and existent, can then also be provided back into the filename processing methodology or algorithm for "introspection" purposes as shown by the feedback loop from 1706 to 1704. At 1708, the method 1700 determines whether all of the images in the set of images have been analyzed. When it is determined (at 1708) that all of the images in the set of images have not yet been analyzed, the method 1700 loops to 1702. When it is determined (at 1708) that all of the images in the set of images have been analyzed, the method 1700 proceeds to 1710. At 1710, the method 1700 provides configuration information to a demonstration serving system. The configuration information can be utilized by a demonstration serving system to present an array of provided images, in the browser, in the right order, such that when prompted by the demonstration presenter, the currently shown image (or set of related images) is replaced with another image in such a way so as to mimic the features, look, and, feel of an envisioned software product.

Figure 18:
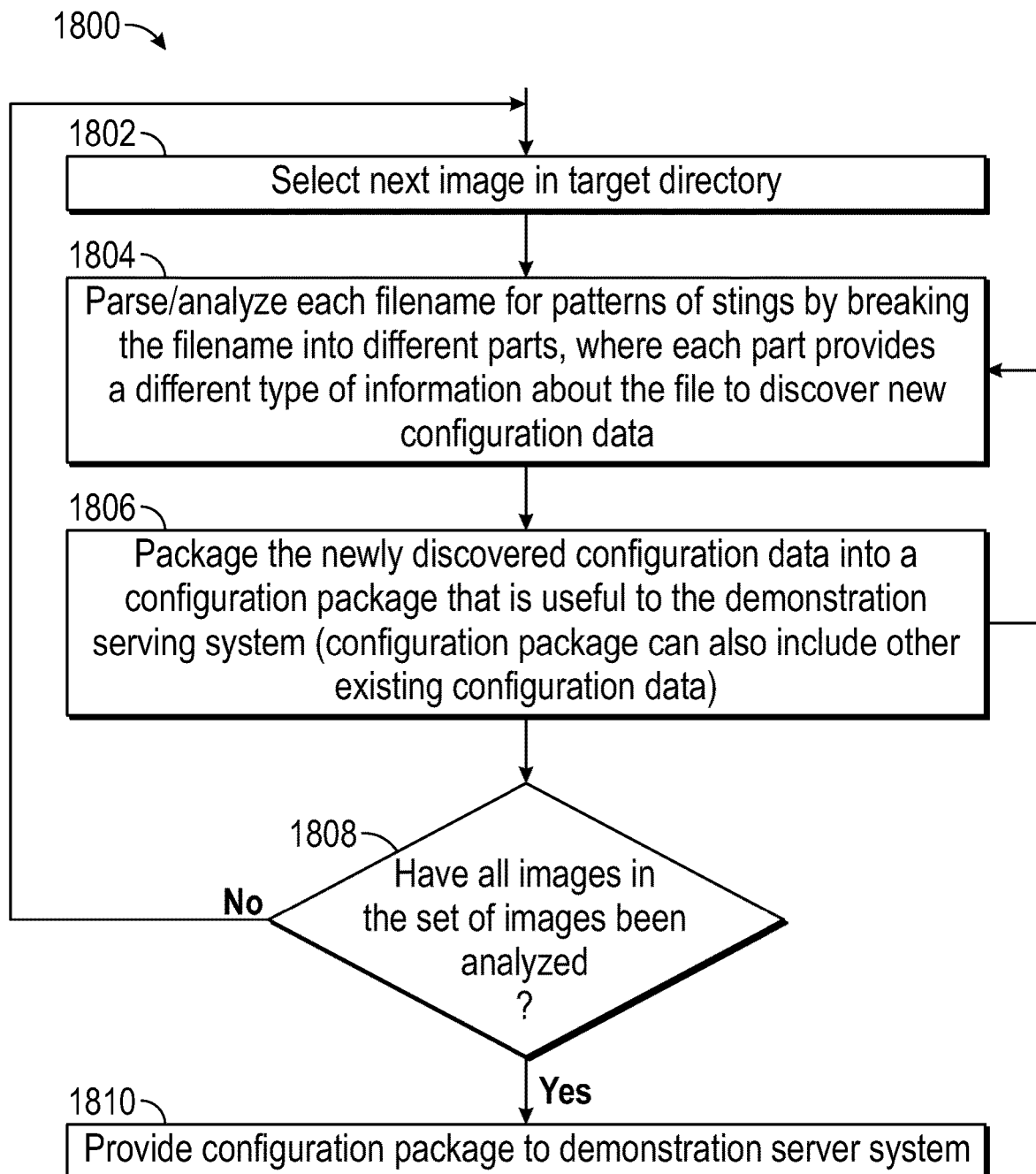
FIG. 18 is a flowchart that illustrates another filename processing method for processing filenames of a given set of images to create a software product demonstration presentation using the filenames as configuration information in accordance with the disclosed embodiments.

FIG. 18 is a flowchart that illustrates a filename processing method 1800 for processing the filenames of a given set of images to create a software product demonstration presentation using the filenames as configuration information in accordance with the disclosed embodiments. The method 1800 discovers configuration information about a software product demonstration that is meaningful to a demonstration serving system. At 1802, an image in the target directory is selected. At 1804, a parsing step is performed. For example, in one implementation, a filename of the image file is analyzed for patterns of strings by breaking the filename into parts, each part providing a different type of configuration information about the image file. In one implementation the types of configuration information are described with reference to FIG. 19 (below). At 1806, the newly discovered configuration information is packaged into a configuration package in such a way so as to be useful to a demonstration serving system. At 1808, the method 1800 determines whether all of the images in the set of images have been analyzed. When it is determined (at 1808) that all of the images in the set of images have not yet been analyzed, the method 1800 loops to 1802. When it is determined (at 1808) that all of the images in the set of images have been analyzed, the method 1800 proceeds to 1810. At 1810, the configuration information is made available (provided to) the demonstration serving system so that the demonstration serving system has access to the configuration information. The configuration information can be utilized by the demonstration serving system to present an array of provided images, in the browser, in the right order, such that when prompted by the demonstration presenter, the currently shown image (or set of related images) is replaced with another image in such a way so as to mimic the features, look, and, feel of an envisioned software product.

Figure 19:
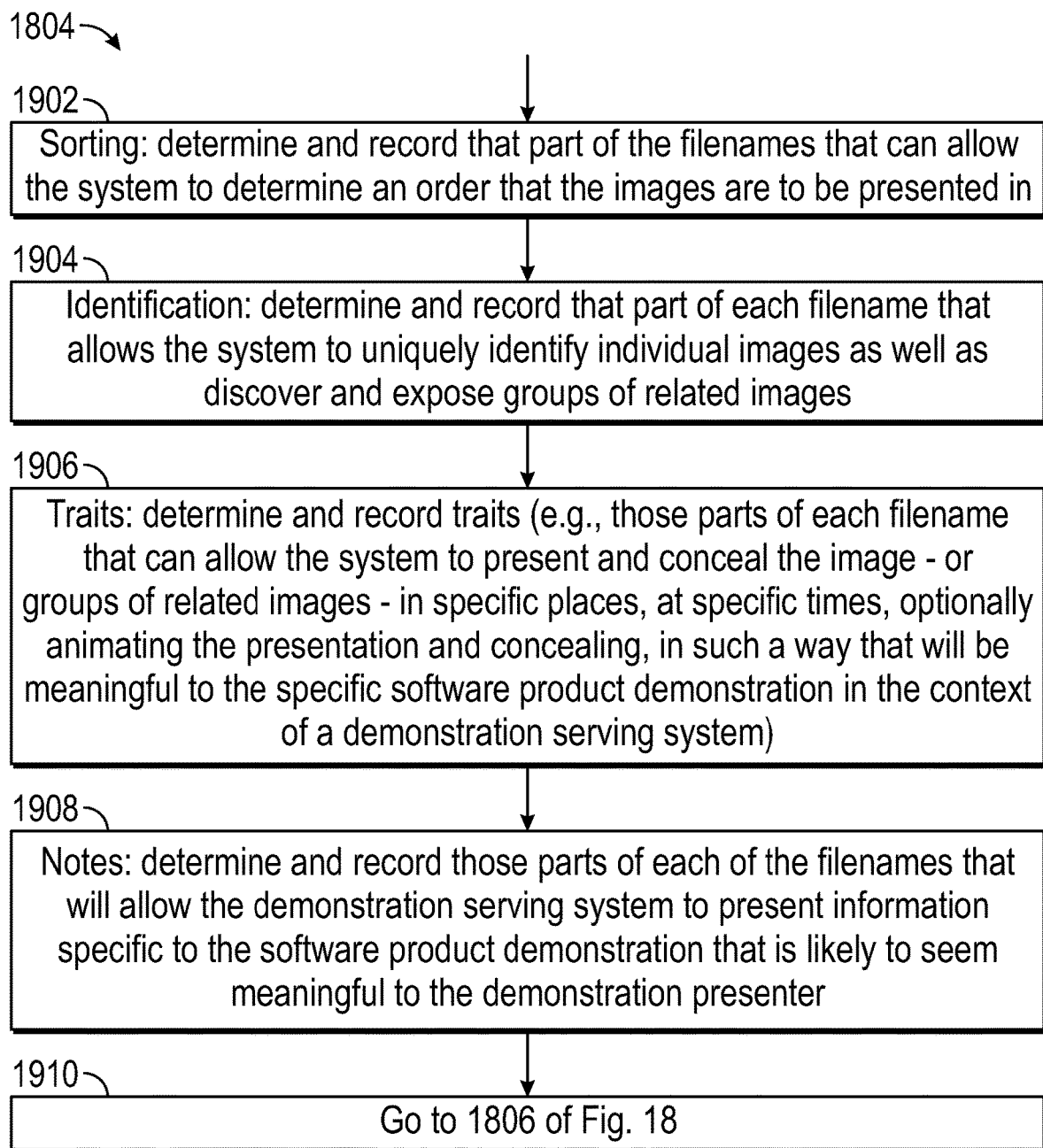
FIG. 19 is a flowchart that illustrates a filename processing method for analyzing filenames of a given set of images for patterns of strings by breaking each filename into different parts that each provide a different type of configuration information about each image file in accordance with the disclosed embodiments.

FIG. 19 is a flowchart that illustrates a filename processing method 1900 for analyzing filenames of a given set of images for patterns of strings by breaking each filename into different parts that each provide a different type of configuration information about each image file in accordance with the disclosed embodiments. The method 1900 begins at 1902, where a sorting step can be performed on at least some of the filenames. For example, a part of each of the filenames can be determined that can allow the system to determine an order that images are to be presented. That order can then be recorded. At 1904, an identification step can be performed on at least some of the filenames. For example, a part of each filename that can allow the system to uniquely identify individual images as well as discover and expose groups of related images can be determined and recorded. At 1906, traits can be determined and recorded for at least some of the filenames. For example, in one embodiment, those parts of each of the filenames that will allow the system to present and conceal the image (or groups of related images) in specific places, at specific times, optionally animating the presentation and concealing, in such a way that will be meaningful to the specific software product demonstration in the context of the demonstration serving system. At 1908, those parts of each of the filenames that will allow the demonstration serving system to present information specific to the software product demonstration, that is likely to seem meaningful to the demonstration presenter, can be determined and recorded. As a result of 1902-1908 each filename that is analyzed is broken into different parts that each provide a different type of configuration information about each image file, and these different types of configuration information/data about each image file is recorded and ready to be packaged into a configuration packages at 1910, where the method 1900 can proceed to 1806 of FIG. 18.

Figure 20:
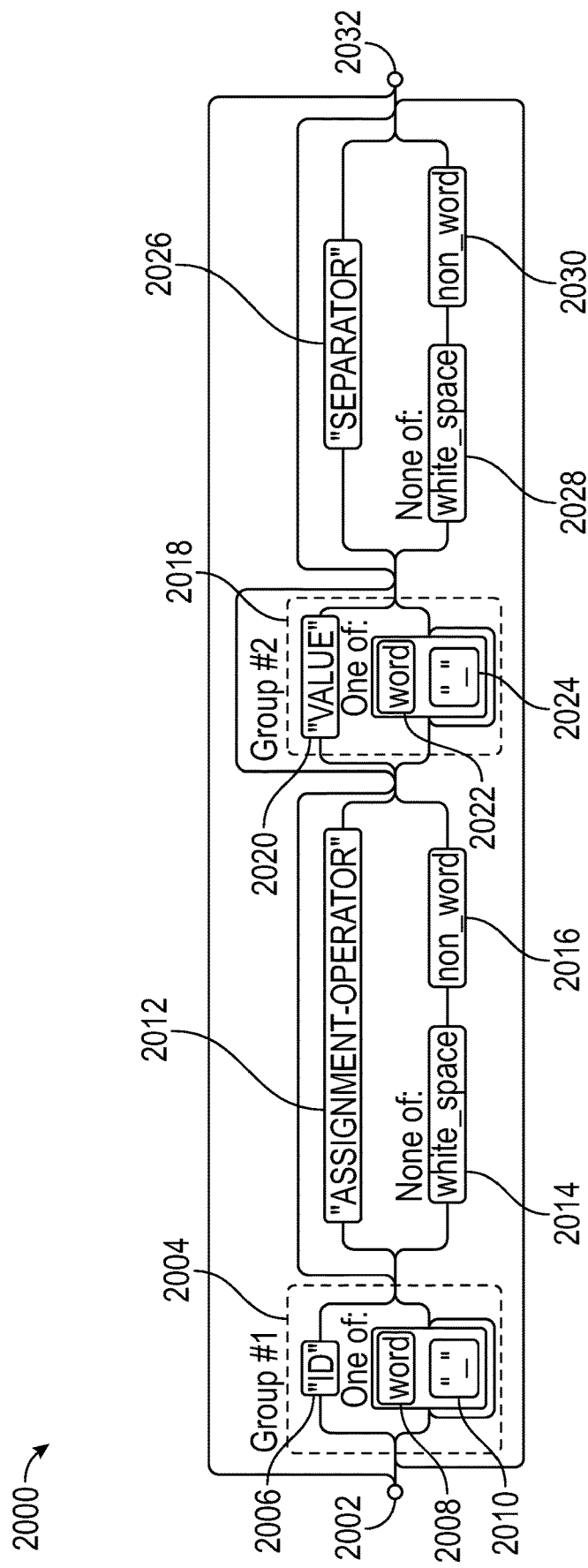
FIG. 20 is a block diagram of a filename processing method for creating a software product demonstration presentation using filenames as configuration information in accordance with the disclosed embodiments.

FIG. 20 is a block diagram of a filename processing system 2000 for reading through a filename to extract information from that filename in accordance with the disclosed embodiments. The file name processing system 2000 can process filenames to generate configuration information, which can then be used to create an interactive product demonstration presentation for an envisioned software product.

As a starting point for processing a filename, at 2002, a filename to be processed is input. The lines proceeding out of the point at 2002 represent valid "paths" that a filename being processed can take as part of the filename processing. At 2004, the file name processing system 2000 can "remember" or "capture" a portion of the filename for later use. This portion of the filename that is captured/remembered is considered to be an "ID" (as illustrated at 2006), which includes at least one or more of the following: ASCII "word" characters (as illustrated at 2008); and "-" characters (as illustrated at 2010).

At 2012, the file name processing system 2000 can "remember" or "capture" another portion of the filename for later use ("ASSIGNMENT-OPERATOR"), which is an indicator that what follows (at group 2018) should be considered as being "assigned" to the preceding "ID" that was captured at 2004. 2016 illustrates that this portion of the filename must be a single ascii "non-word" character (e.g., ":" or "="). To explain further, this portion of the filename that is captured/remembered at 2012 must not contain whitespace (as illustrated at 2014, no part of the filename may contain whitespace), but non-word (at 2016) could be taken to indicate that this portion may contain whitespace, so 2014 explicitly indicates that this portion of the filename (that is captured/remembered at 2012) must not contain whitespace.

At 2018, the file name processing system 2000 can "remember" or "capture" another portion of the filename for later use (different than the one remembered or captured at 2004). This portion of the filename that is captured/remembered is considered to be an "VALUE" (as illustrated at 2020), illustrates (at 2022) that this portion of the filename may be a single ascii "word" character (e.g., "a" or "b"), and also illustrates (at 2024) that this portion of the filename may be a "-" character (which is not considered an ascii "word" character).

At 2026, the file name processing system 2000 can "remember" or "capture" another portion of the filename for later use ("SEPARATOR"), which is an indicator that this part of the filename is considered a "SEPARATOR" (to distinguish what preceded from what proceeds). 2028 illustrates that this part of the filename must not contain whitespace (no part of the filename may contain whitespace, but 2030 could be taken to indicate that this part may contain whitespace), so here we indicate that it must not). 2030 illustrates that this portion of the filename must be a single ASCII "non-word" character (e.g., "_"). To explain further, this portion of the filename that is captured/remembered at 2026 must not contain whitespace (as illustrated at 2028, no part of the filename may contain whitespace), but non-word (at 2030) could be taken to indicate that this portion may contain whitespace, so 2028 explicitly indicates that this portion of the filename (that is captured/remembered at 2026) must not contain whitespace.

The endpoint at 2032 represents an output or the end of the data-storage part of the filename. Although not illustrated, following 2032 a file system indicator of a file type, such as ".png" or ".svg", can be present, provided, specified, selected, added. This portion of the filename is not accounted for since it is not relevant or necessary to a demo data storage portion of this filename.

Overrides Engine

In one embodiment, a system having an overrides engine is provided (e.g., a brand/product/demo overrides engine). The overrides engine provides a custom architecture for a node express application that allows for cascading/layered overrides of assets. The overrides engine can allow a server to understand a request being made, and serve up the right asset or "thing."

Figure 21:
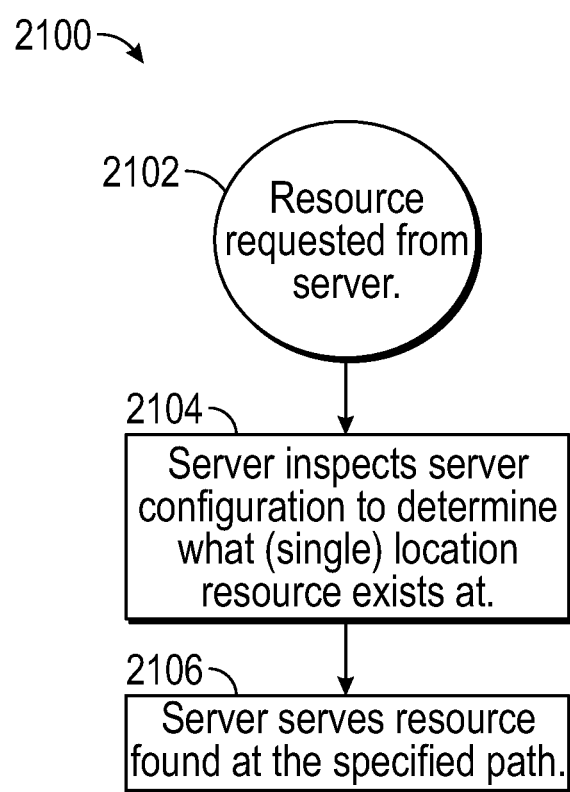
FIG. 21 is a flowchart that illustrates a method showing how a server normally functions in response to a request for a resource from a server.

FIG. 21 is a flowchart that illustrates a method 2100 showing how a server normally functions in response to a request for a resource from a server. At 2102, a resource is requested from the server. For example, the resource can be requested by either a browser or as directed by a resource found on the server itself. At 2104, the server inspects the server's configuration to determine what single location (i.e., a path) that the resource (that was requested at 2102) exists at. At 2106, once a location is determined where the resource exists at, the server serves the resource found at a specified path.

Figure 22:
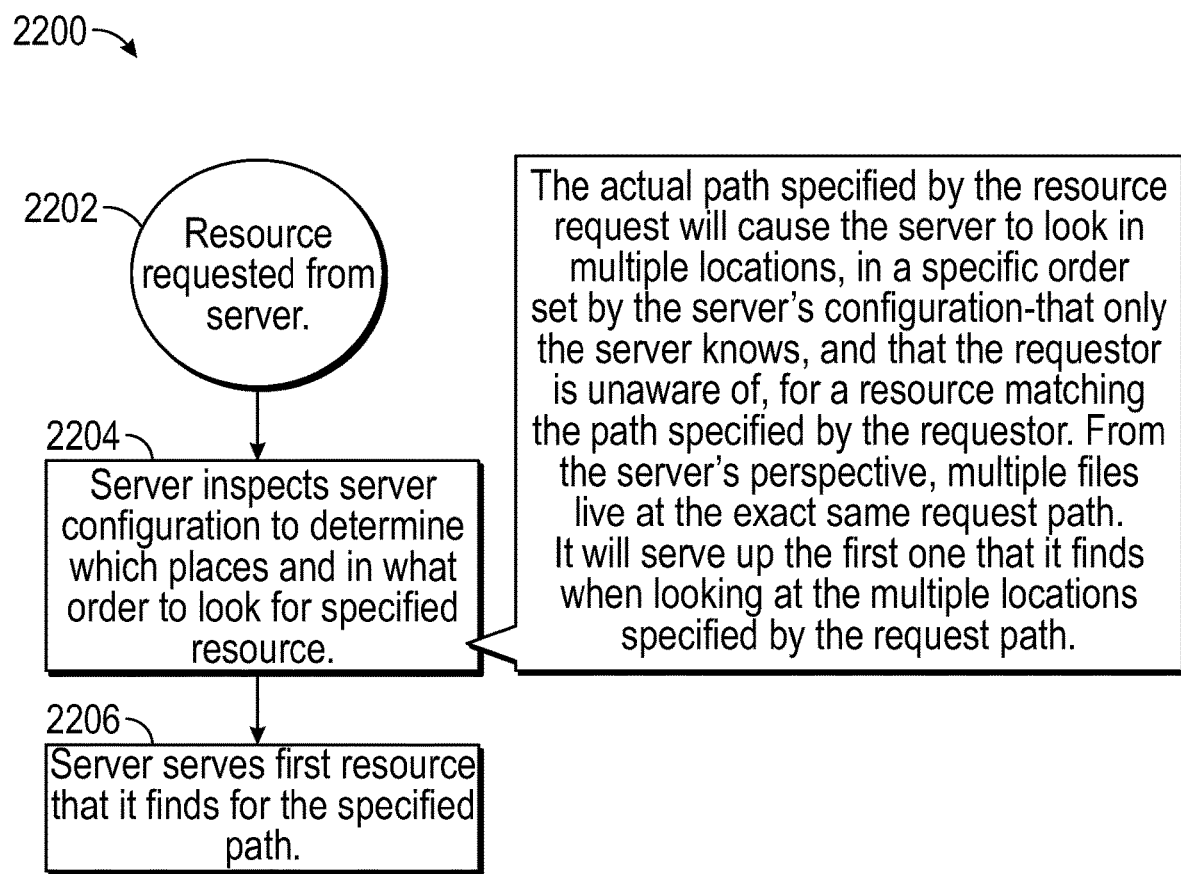
FIG. 22 is a flowchart that illustrates how an overrides engine functions in response to a request for a resource from a server in accordance with the disclosed embodiments.

FIG. 22 is a flowchart 2200 that illustrates how an overrides engine functions in response to a request for a resource from a server in accordance with the disclosed embodiments. At 2202, a specified resource is requested from the server. For example, the resource can be requested by either a browser or as directed by a resource found on the server itself. At 2204, the server inspects the server's configuration to determine which locations (i.e., a paths) that the specified resource (that was requested at 2202) exist at and in what order to look for the specified resource. The actual path specified by the resource request will cause the server to look in multiple locations, in accordance with a specified order set by the server configuration, that only the server knows, and that the requestor is unaware of, for a resource matching the path specified by the requestor. From the server's perspective, multiple files live at the exact same request path. The server will serve up the first resource that it finds when looking at the multiple locations specified by the request path. At 2206, once the server determines the first resource that it finds for a specified path (i.e., a location where the specified resource exists at), the server serves the first resource found at the specified path.

Figure 23:
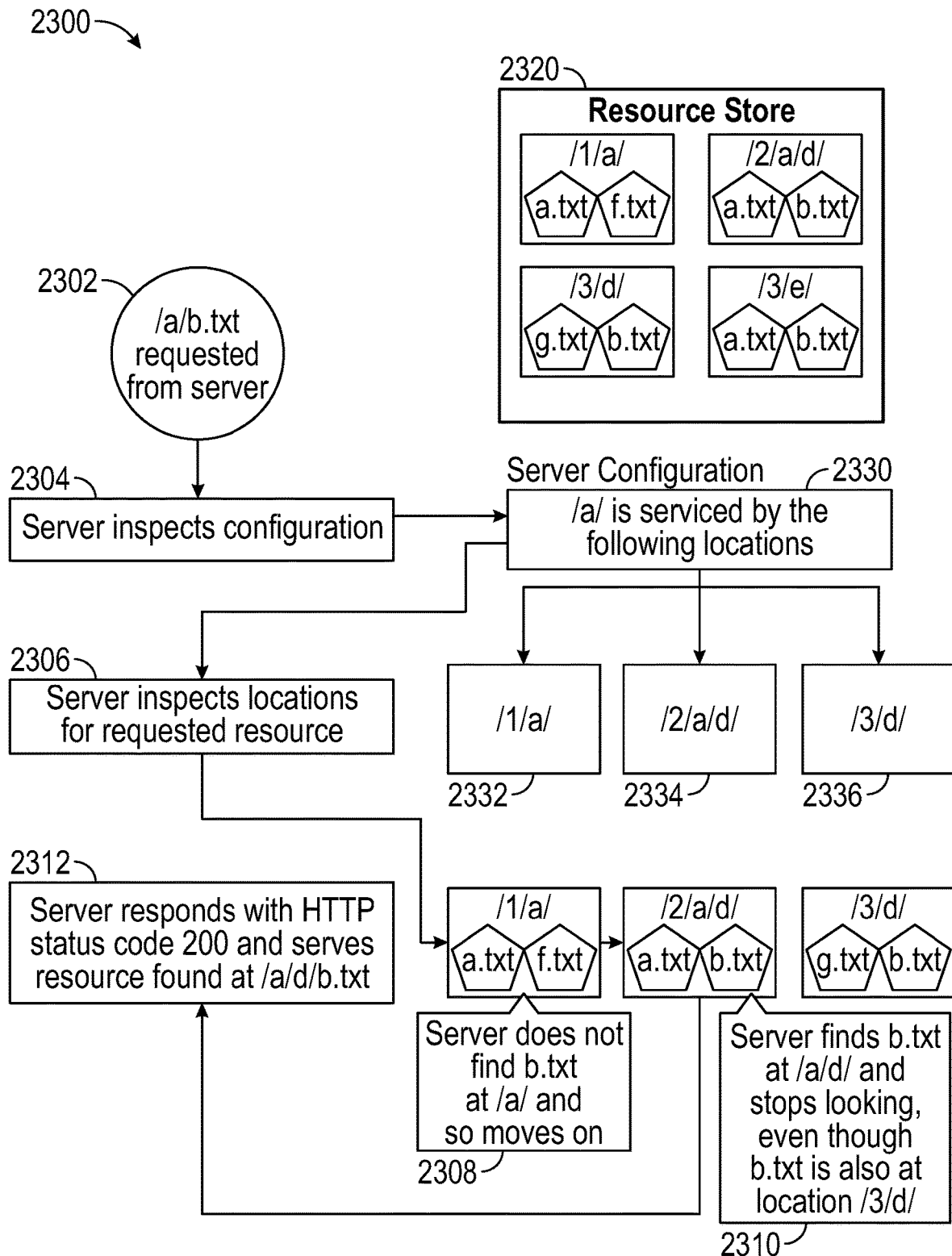
FIG. 23 is a flowchart that illustrates a first example of how an overrides engine functions in response to a request for a resource from a server in accordance with the disclosed embodiments.

FIG. 23 is a flowchart 2300 that illustrates a first example of how an overrides engine functions in response to a request for a resource from a server in accordance with the disclosed embodiments. In this example the overrides engine finds and serves a file in a way that a normal server would not. A resource store 2320 includes several locations where the requested resource can potentially exist. In this example, the resource store includes location /1/a/ having resources a.txt and f.txt; location /2/a/d/ having resources a.txt and b.txt; location /3/d/ having resources g.txt and b.txt; and location /3/e/ having resources a.txt and b.txt. At 2302, a specified resource (/a/b.txt) is requested from the server. For example, the resource (/a/b.txt) can be requested by either a browser or as directed by a resource found on the server itself. At 2304, the server inspects the server's configuration 2330 to determine which locations (i.e., paths) that the specified resource (/a/b.txt that was requested at 2302) exists at and in what order to look for the specified resource. In this non-limiting example, the path (/a/) is serviced at the following locations: /1/a/ 2332, /2/a/d/ 2334, /3/d/ 2336. The actual path specified by the resource request will cause the server to look in multiple locations, in accordance with the specified order set by the server configuration, that only the server knows, and that the requestor is unaware of, for a resource (/a/b.txt) matching the path specified by the requestor. From the server's perspective, multiple files live at the exact same request path. The server will serve up the first resource that it finds when looking at the multiple locations specified by the request path. At 2306, the server inspects each location that the specified resource (/a/b.txt that was requested at 2302) potentially exists in a particular order for the specified resource. In this non-limiting example, the location /1/a/ 2332 is inspected first, and the server does not find b.txt at /a/ and the server then inspects location /2/a/d/, where it finds b.txt at /a/d/. Once the server determines that the resource has been found for a specified path (i.e., a location where the specified resource exist at), the server stops and responds with a HTTP status code 200 and serves up the resource found at the specified path /a/d/b.text. There is no need to further inspect path /3/d/ 2336 even though b.txt is also at location /3/d/ 2336.

Figure 24:
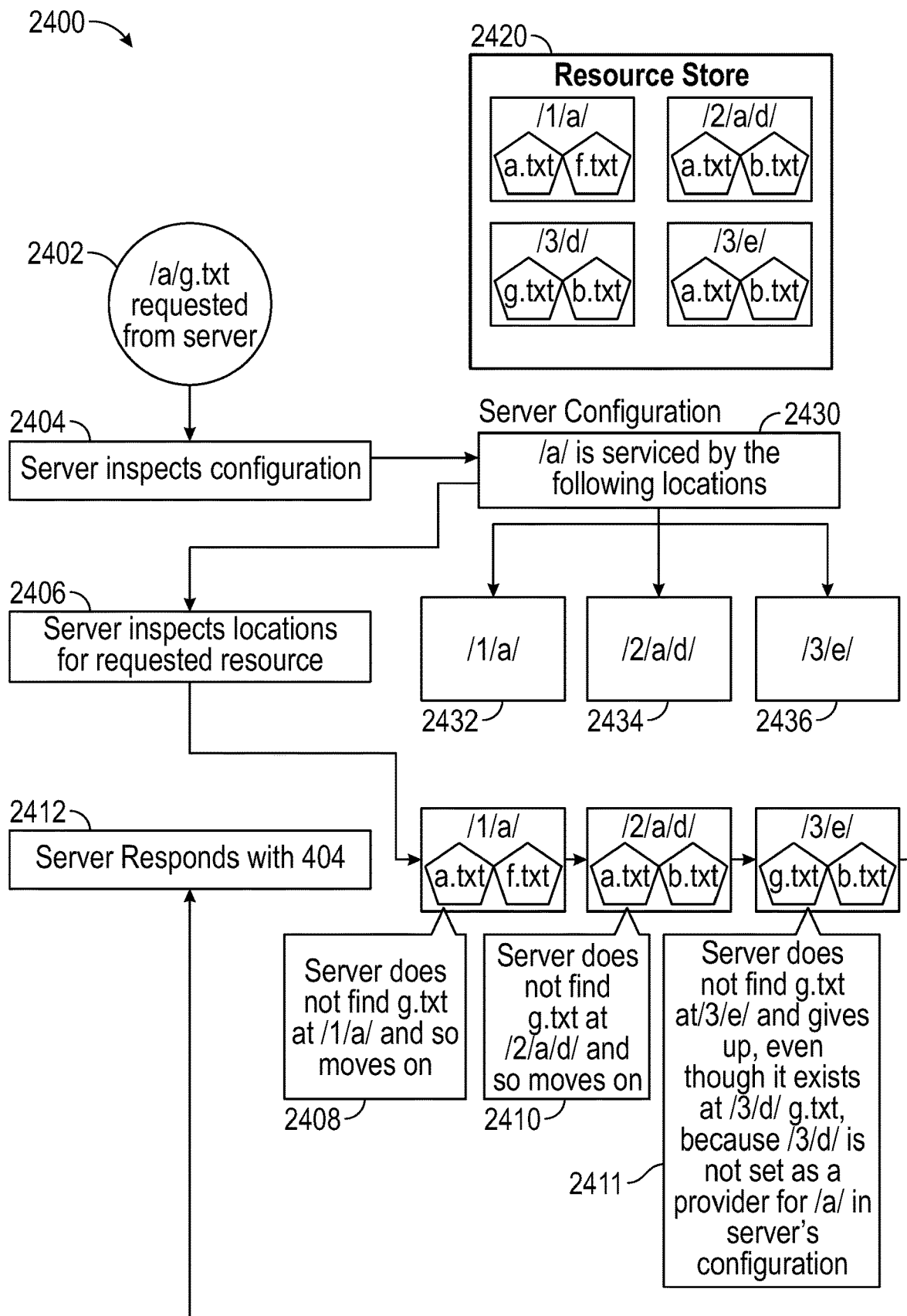
FIG. 24 is a flowchart that illustrates a second example of how the overrides engine functions in response to a request for a resource from a server in accordance with the disclosed embodiments.

FIG. 24 is a flowchart 2400 that illustrates a second example of how an overrides engine functions in response to a request for a resource from a server in accordance with the disclosed embodiments. In this example the overrides engine looks for but does not find a resource to serve (and instead serves a "file not found" error). In this example, a resource store 2420 includes several locations where the requested resource can potentially exist including: location /1/a/ having resources a.txt and f.txt; location /2/a/d/ having resources a.txt and b.txt; location /3/d/ having resources g.txt and b.txt; and location /3/e/ having resources a.txt and b.txt. At 2402, a specified resource (/a/g.txt) is requested from the server. For example, the resource (/a/g.txt) can be requested by either a browser or as directed by a resource found on the server itself. At 2404, the server inspects the server's configuration 2430 to determine which locations (i.e., a paths) that the specified resource (/a/g.txt that was requested at 2402) exists at and in what order to look for the specified resource. In this non-limiting example, the path (/a/) is serviced at the following locations: /1/a/ 2432, /2/a/d/ 2434, /3/e/ 2436. The actual path specified by the resource request will cause the server to look in multiple locations for the request resource, in accordance with the specified order set by the server configuration, that only the server knows, and that the requestor is unaware of, for a resource (/a/g.txt) matching the path specified by the requestor. From the server's perspective, multiple files can live at the exact same request path. If the server finds the resource at any of the locations, the server will serve up the first resource that it finds when looking at the multiple locations specified by the request path. At 2406, the server inspects each location that the specified resource (/a/g.txt that was requested at 2402) potentially exists in a particular order for the specified resource. In this non-limiting example, the location /1/a/ 2432 is inspected first, and the server does not find g.txt at /a/ and the server then inspects location /2/a/d/, where it again does not find g.txt at /a/d/. The location /3/e/ 2436 is then inspected first, and the server does not find g.txt at /e/ and the server stops searching even though g.txt exists at /3/d/g.txt because /3/d/ is not set as a provider for /a/ in the server's configuration. Once the server determines that the resource has not been found for a specified path (i.e., a location where the specified resource exist at), the server stops and responds with a HTTP status code 404.

System and Method for Creating Graphic Representations of Connections Between Two or More Points The purpose of this patent is to cover the idea of two or more related points which should be displayed as having a connection or path between them can be stored in a way that excludes the instructions for the creation of the path or connection itself, and that an algorithm can be used during the display process to create a representation of that path in a consistent repeatable manner. The points may specify the exact proportions and dimensions of any single path which would override the algorithmic generation of the remaining paths. The point information and the path information both have unique and succinct data structures that are readily human readable and writeable but also efficient for machine interpretation.

Figure 25:
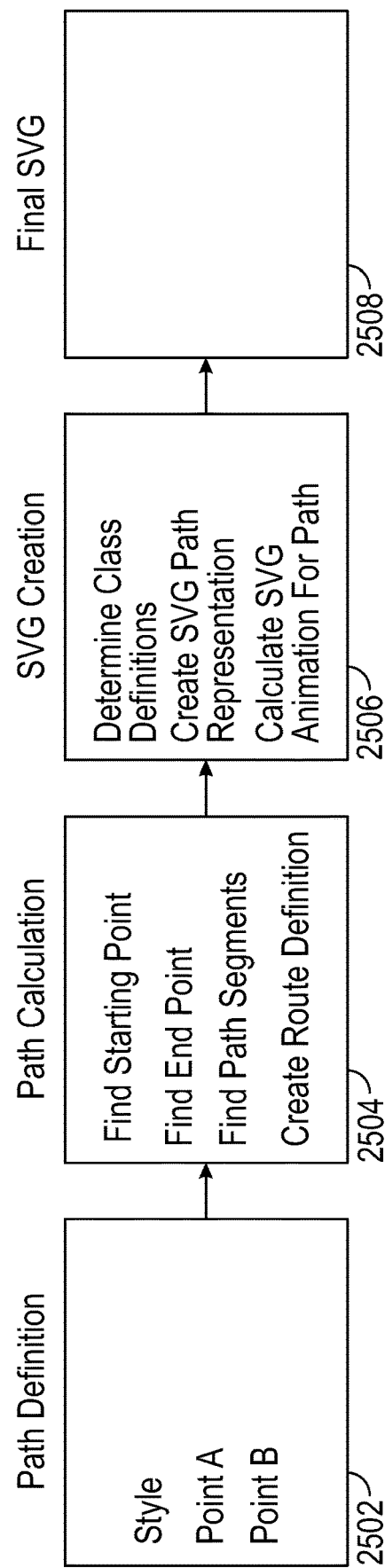
FIG. 25 is a block diagram of a system for creating SVG paths in accordance with the disclosed embodiments.
Figure 26:
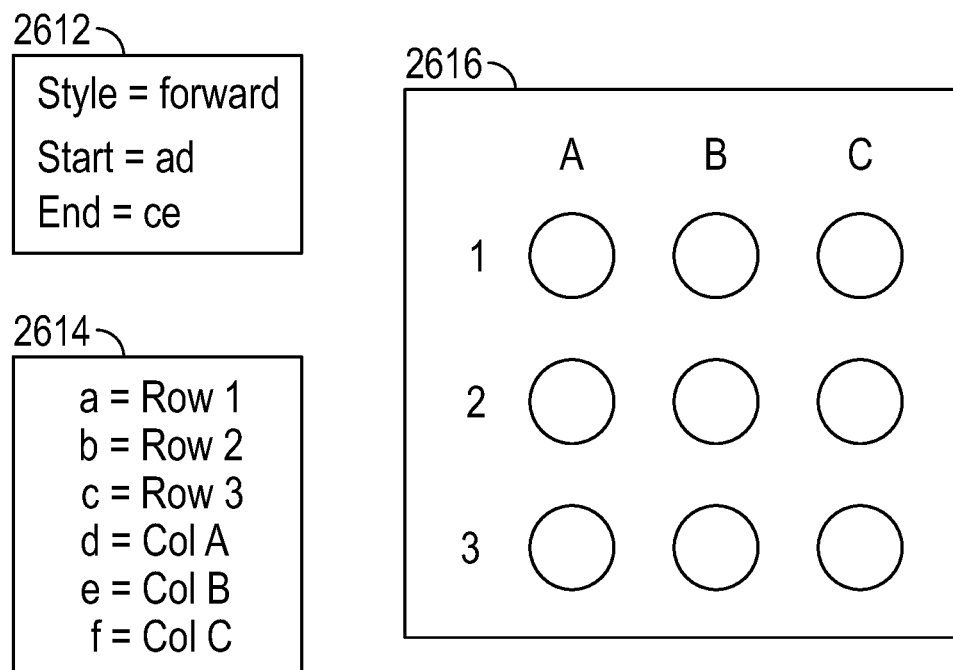
FIG. 26 is a block diagram that shows information that is input by a user (programmer) during a configuration step to define a grid in accordance with the disclosed embodiments.

In one embodiment, a system and method are provided for creating SVG paths. The system can be used, for example, create a grid of 2-dimensional points, including column labels and row labels, and to find and create paths in a 2-dimensional grid from multiple points to other points. FIG. 25 is a block diagram of a system 2500 for creating SVG paths in accordance with the disclosed embodiments. FIG. 26 is a block diagram that shows information 2612, 2614, 2616 that is input by a user (programmer) during a configuration step to define a grid in accordance with the disclosed embodiments. At block 2612, the user defines paths, specifying only path style (forward in this example), start (ad in this example), and end (ce in this example). In addition, at block 2614, the user can define column and row label aliases. The information 2616 that is input can include, for example, how many columns the grid will have, how many rows the grid will have, the distance between columns of the grid, the distance between rows of the grid, and the location of column and row labels.

Referring again to FIG. 25, block 2502 shows a path definition that includes a style, Point A and Point B. Based on the path definition, a path calculation block 2504 of the system can calculate a route by determining where a starting point (point A) and an endpoint (point B) are on the grid; finding path segments that will lead from Point A to Point B by following a formula dictated by specified style; and creating and storing route definitions for the route that was calculated for the path. It is important to note that this calculation contains no specific dimensions, but instead only records the direction to move and the number of rows/columns to move by.

Figure 27:
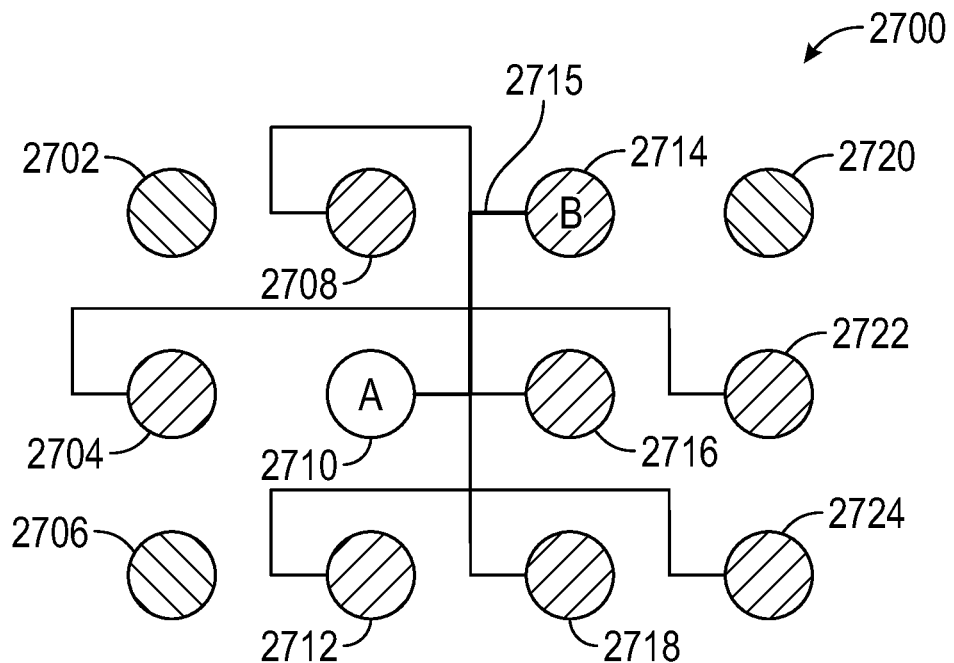
FIG. 27 is a block diagram that shows a grid of 2-dimensional points and various paths between different points in accordance with the disclosed embodiments.

FIG. 27 is a block diagram that shows a grid of 2-dimensional points 2702, 2704, 2706, 2708, 2710, 2712, 2714, 2716, 2718, 2720, 2722, 2724 (represented by different circles), and various paths (represented by lines) between different points in accordance with the disclosed embodiments. For example, one path 2715 is defined between starting point A 2710 and end point B 2714; other paths (not labeled) are also defined between starting point 2710 and other endpoints 2704, 2708, 2712, 2714, 2716, 2718, 2722, 2724. For instance, in FIG. 27, the path 2715 from Point A 2710 to Point B 2714 would be represented as something like "East 1/2, North 1, East 1/2."

Figure 28:
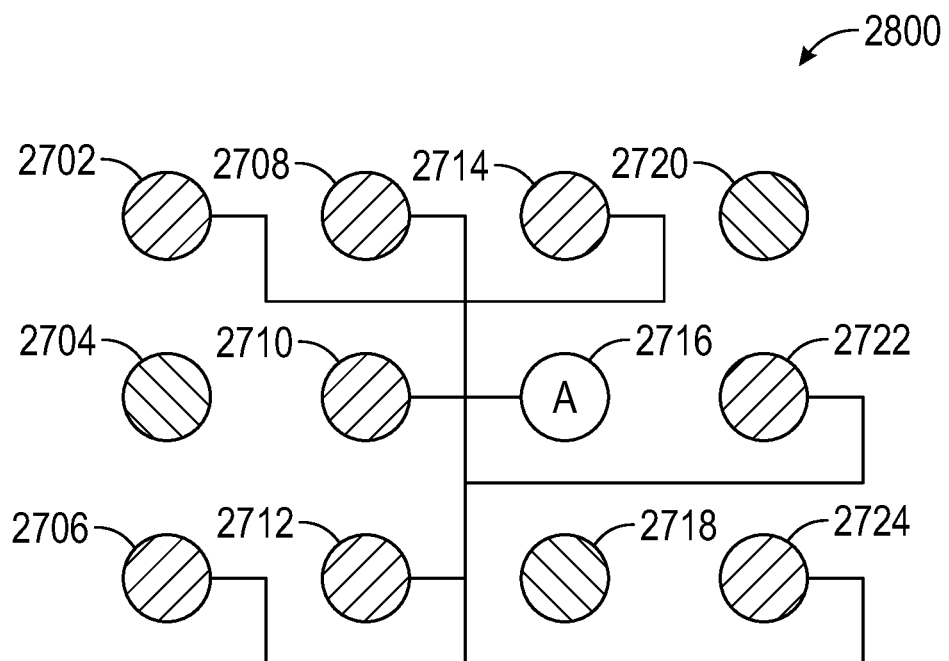
FIG. 28 is another block diagram that shows another grid of 2-dimensional points and various paths between different points in accordance with the disclosed embodiments.

FIG. 28 is another block diagram that shows a grid of 2-dimensional points 2702, 2704, 2706, 2708, 2710, 2712, 2714, 2716, 2718, 2720, 2722, 2724 (represented by different circles), and various paths (represented by lines) between different points in accordance with the disclosed embodiments. For example, various paths are defined between end point 2716 and various starting points 2702, 2706, 2708, 2710, 2712, 2714, 2722, 2724.

How the path calculation block 2504 of the system (FIG. 25) can find the path segments that will lead from Point A 2710 to any of the other points as Point B, for instance 2714 or 2722, is different depending on whether the specified style is forward or backward. For example, FIG. 27 illustrates unique path calculations from Point A 2716 if the style is "forward." In this case, leave Point A 2716 heading East, pass target rows going North, and enter Point B 2714 from the West. In other words, the path calculation block 1504 of the system can find the path segments that will lead from Point A 2710 to Point B 2714 by: starting leave Point A 2716 heading East; if Point B 2714 is in the column directly East of Point A 2716, turning and moving North or South until you are in the same row as Point B 2714; turning East to facing Point B 2714; moving onto Point B 2714 and stopping; if Point B is for instance 2722, turning and facing North or South and moving North or South until you are North of the Row Point B 2722 is located halfway between two rows; turning and facing East or West and move East or West until you are West of the Column Point B 2722 is located halfway between two columns; turning and facing South and move onto the Row Point B 2722 is located on; and turning and facing East and move onto Point B 2722 and then stopping.

By contrast, FIG. 28 illustrates unique path calculations from 2716 if the style is "backward." In this case, leave Point A 2716 heading West, pass target Rows on the S, and enter any of the other points as Point B from the East, for instance 2722 or 2708. In other words, the path calculation block 2504 of the system can find the path segments that will lead from Point A 2716 to Point B 2708 by: starting at Point A 2716 heading West; if Point B 2708 is in the column directly West of Point A 2716, turning and move North or South until you are in the same row as Point B 2708, turning West to facing Point B 2708. Move onto Point B 2708 and STOP; turning and facing North or South and move North or South until you are South of the Row Point B 2722 is located, halfway between two rows; turning and facing East or West and move East or West until you are East of the Column Point B 2722 is located, halfway between two columns; turning and facing North and move onto the Row Point B 2722 is located on; and turning and facing West and move onto Point B 2722 and stop.

Referring again to FIG. 25, based on information provided from the path calculation block 2504, an SVG creation block 2506 can create an SVG path object 2508 based on recorded route representations. In general terms, the SVG creation block 2506 can do this by determining class definitions, creating SVG path representations, and calculating SVG animations for each path to generate a final SVG path object 2508. To explain further, in one embodiment, the SVG creation block 2506 can create an SVG path object 2508 by: creating SVG elements that represent grid points and labels as defined by information 2614, 2616; and creating SVG elements to represent each path to place on the grid. For instance, in one implementation, the SVG creation block 2506 can create SVG elements to represent each path to place on grid by: determining where path should be placed on screen; determining CSS class definitions, which define color, animation appearance, and hover/interaction behaviors; calculating the length of path by examining how many steps there are in the path and how far must be traveled during steps and between them based on a formula; calculating animation properties (delay, length of line to draw the animation is done using an SVG path with stroke-dasharray and stroke-dashoffset, and duration) based on length of path; and creating an SVG path object based on passing recorded route representations through a formula, translating instructions like "East 1/2, South 1, East 1/2" into machine-readable values m0,0 q 0,0 0,0 v0.001 h50 q20,0 20,20 v68 90,20 20,20 h50 stepping through each instruction and translating that into a machine readable value (e.g. "East 1/2" is translated to h50) and determining how to connect each point to the next point (e.g. "East connects to South by q20,0 20,20").

Figure 29:
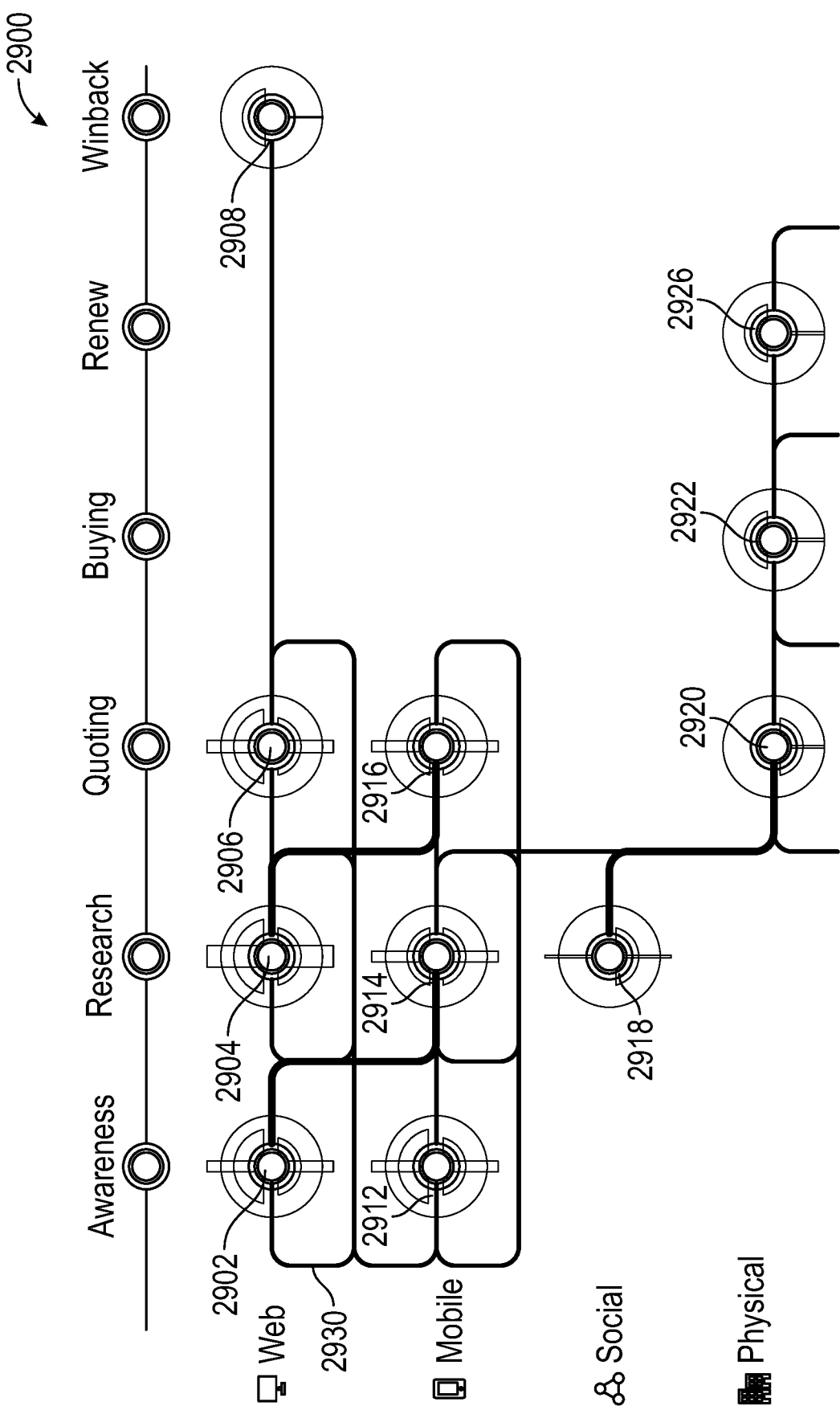
FIG. 29 is a block diagram that illustrates one non-limiting example of an SVG graph having SVG paths in accordance with the disclosed embodiments.

FIG. 29 is a block diagram that illustrates one non-limiting example of an SVG graph 2900 having SVG paths in accordance with the disclosed embodiments. Similar to FIGS. 27 and 28, FIG. 29 shows a grid of 2-dimensional points 2902-2926 (represented by different circles), and various paths (represented by lines) between different points 2902-2926 in accordance with the disclosed embodiments. A data structure used to generate the paths in this SVG graph and code used to generate SVG paths are shown in U.S. Provisional Application No. 62/937,658, which is incorporated herein by reference in its entirety. In FIG. 29, the paths of the SVG graph are represented in a data structure in code chunk "touchpoints" shown in U.S. Provisional Application No. 62/937,658. The portion of the code: "path: [[W, 0.5], [S, 0.5], [E, 2], [N, .5], [W, .5]]" dictates to the code as if a marker were drawing the line a cardinal direction (N, S, E, W) for it to move, and how far (0.5 space, 1 space, 2 spaces, etc.) for the marker to move drawing the line. In this code snippet "path: [[W, 0.5], [S, 0.5], [E, 2], [N, 0.5], [W, 0.5]]", it would start at a circle which the marker was assigned to start at, move West 1/2 the distance of the space between two circles (east to west), then move South half the distance of the space between to circles (north to south), then move east the distance between two circles (east to west), then move north half the distance between two circles (north to south), and then move West half the distance between two circles (east to west). This code "path: [[W, 0.5], [S, 0.5], [E, 2], [N, 0.5], [W, 0.5]]" describes the line 2930 that exits the top left point 2902, moves down halfway between the first and second row, moves right until it passes the third point 2906 in the top row, then moves up and connects back to the third point 2906 in the top row. This code is processed by server-side JavaScript code in the code chunk "EJS Touchpoints," which generates a final SVG (shown in U.S. Provisional Application No. 62/937,658) along with code in a "Final SVG" code chunk.

Translating Captured Input Images into Interactive Demonstration Presentations Using Machine Learning Machine learning refers to an artificial intelligence discipline geared toward the technological development of human knowledge. Machine learning facilitates a continuous advancement of computing through exposure to new scenarios, testing and adaptation, while employing pattern and trend detection for improved decisions and subsequent, though not identical, situations. Machine learning (ML) algorithms and statistical models can be used by computer systems to effectively perform a specific task without using explicit instructions, relying on patterns and inference instead. Machine learning algorithms build a mathematical model based on sample data, known as "training data," in order to make predictions or decisions without being explicitly programmed to perform the task. Machine learning algorithms can be used when it is infeasible to develop an algorithm of specific instructions for performing the task.

In one embodiment, a machine learning system and associated methods are provided for creating interactive demonstration presentations for an envisioned software product from at least one input image captured from a source. Artificial intelligence (AI) technologies can be used to create interactive demonstration presentations from things such as hand-drawn sketches, screenshots (e.g., of a website or a user interface of an existing product application), video files of a user using an existing application, still images from video files, photos of a whiteboard, high-fidelity mockups generated by designers, etc.

In one implementation, the machine learning system can be implemented at a server system comprising at least one hardware-based processor and memory. The memory comprises processor-executable instructions encoded on a non-transient processor-readable media. When executed by the hardware-based processor, the processor-executable instructions are configurable to cause a machine learning processor comprising at least one neural network to process the captured input image to translate the captured input image into the interactive demonstration presentation.

In some embodiments, prior to processing, the neural network of the machine learning processor is trained using machine learning to translate features extracted from captured input images into the interactive demonstration presentation. For example, in one embodiment, the training comprises: receiving training inputs from various sources comprising one or more of: training images, drawings, training sketches, photographs, video files, screen recordings, images and existing GUIs; learning, via a deep learning network of the machine learning processor that comprises the at least one neural network, to automatically recognize features within images that correspond to training inputs provided from the various sources; and associating, via at least one other neural network trained via the machine learning, each recognized feature with a corresponding component or file for inclusion within a library comprising corresponding files or components. In one embodiment, the deep learning network of the machine learning processor executes one or more supervised learning algorithms to generate a mathematical model, based on the training inputs, to predict desired outputs that are part of the library.

In one embodiment, the processing can include: automatically recognizing features within the captured input image; extracting the recognized features from the captured input image at an image component extractor of the machine learning processor; processing each of the extracted features to determine a corresponding element (e.g., file or component) in a library trained via a machine learning algorithm; and automatically replacing the extracted features from the captured input image with the one or more corresponding files or components to transform the captured input image into the interactive demonstration presentation for the envisioned software product. The captured input image can include, for example, at least one of a hand-drawn sketch, a screenshot of a website, a screenshot of a user interface of an existing product application, a video file of a user using an existing application, a still image from a video file, a photo of a whiteboard, a high-fidelity mockup generated by a designer, etc. As used herein, a file refers to collection of data stored in one unit on a computer that stores data, information, settings, or commands used with a computer program. Examples of files can include, but are not limited to, an image file or a Hypertext Markup Language (HTML) file. As used herein, a component refers to a portion of code which describes part or a whole of an artifact which is displayed on a webpage. Examples of components can include, but are not limited to, a JavaScript component or a Cascading Style Sheets (CSS) component.

In some embodiments, features within the captured input image can be marked as DO NOT MODIFY/REPLACE, ensuring original portions of or the whole image make it into the final output these portions should be processed as normal and information as to what the processing would have done with them had they not been marked DO NOT MODIFY/REPLACE should be captured, but the replacement should not be made.

In some embodiments, features within the captured input image can be automatically recognized by: automatically digitizing features within the captured input image; filtering out noise from the digitized-version of the features within the captured input image to produce a digitized image file; and automatically recognizing features within digitized image file of the captured input image via image and pattern recognition processing. In some embodiments, the recognized features can be extracted from the captured input image, by extracting, from the digitized image file, one or more features (or components) from the captured input image by comparing each of the features versus the library.

In some embodiments, processing the extracted features includes one or more of: matching each of the extracted features to a corresponding element from the library that represents that extracted feature. The corresponding element can include at least one of: an image file, a Hypertext Markup Language (HTML) file, a JavaScript component or a Cascading Style Sheets (CSS) component that represents or corresponds to that extracted feature. Each extracted feature translates (and can be converted) to a corresponding element when automatically replaced.

In some embodiments, automatically replacing can include transforming each of features that were extracted from the captured input image into an output that represents or corresponds to that feature, wherein each output comprises one or more of: an image file, a Hypertext Markup Language (HTML) file, a JavaScript component and a Cascading Style Sheets (CSS) component; and incorporating the each of the outputs into the interactive demonstration presentation for the envisioned software product.

Figure 30A:
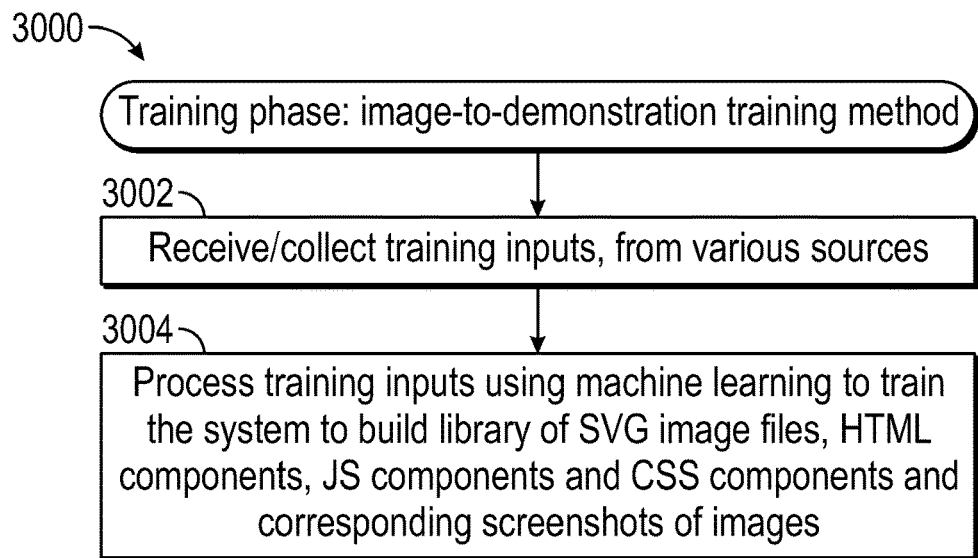
FIG. 30A is a flowchart that illustrates a training method for training an image-to-demonstration ML system using machine learning in accordance with the disclosed embodiments.
Figure 30B:
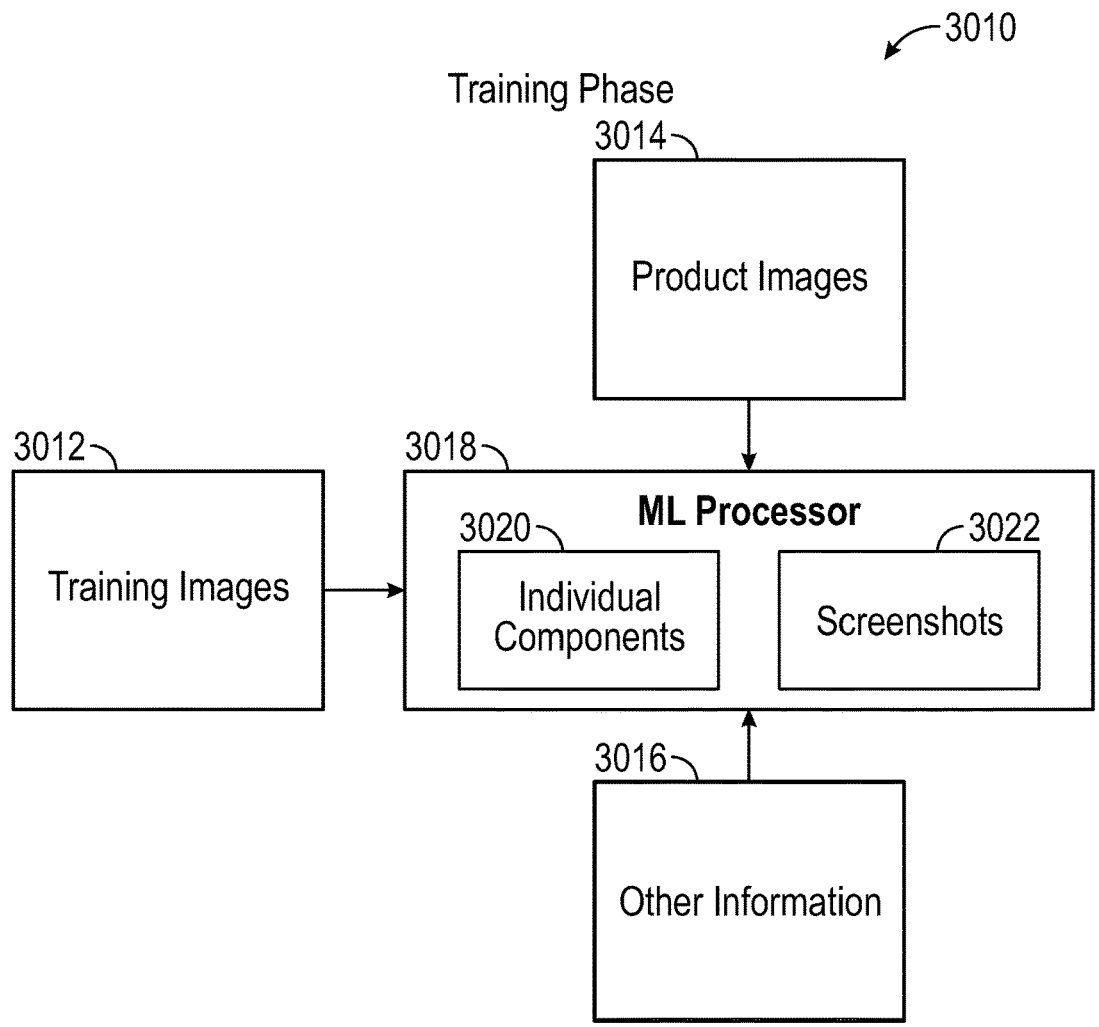
FIG. 30B is a block diagram of an image-to-demonstration ML system during a training phase when the image-to-demonstration ML system is trained to create a library that includes components and screenshots using a machine learning processor in accordance with the disclosed embodiments.

One possible non-limiting embodiment will now be described with reference to FIGS. FIGS. 30A through 30D. FIG. 30A is a flowchart that illustrates a training method 3000 for training an image-to-demonstration ML system 3010 using machine learning in accordance with the disclosed embodiments. FIG. 30B is a block diagram of an image-to-demonstration ML system 3010 during a training phase when the image-to-demonstration ML system 3010 is trained to create a library that includes components 3020 (also referred to herein as features) and screenshots 3022 using a machine learning processor 3018 in accordance with the disclosed embodiments. FIG. 30A will be described with reference to FIG. 30B. In one embodiment, the image-to-demonstration ML system 3010 can be trained (using machine learning) to automatically recognize features within hand-drawn images (e.g., whiteboard sketches).

In some embodiments, prior to processing, the neural network of the machine learning processor is trained using machine learning to translate features extracted from captured input images into the interactive demonstration presentation. For example, in one embodiment, the training comprises: receiving training inputs from various sources comprising one or more of: training images, drawings, training sketches, photographs, video files, screen recordings, images and existing GUIs; learning, via a deep learning network of the machine learning processor that comprises the at least one neural network, to automatically recognize features within images that correspond to training inputs provided from the various sources; and associating, via at least one other neural network trained via the machine learning, each recognized feature with a corresponding component or file for inclusion within a library comprising corresponding files or components. Examples of components can include, but are not limited to, a JavaScript component or a Cascading Style Sheets (CSS) component. In one embodiment, the deep learning network of the machine learning processor executes one or more supervised learning algorithms to generate a mathematical model, based on the training inputs, to predict desired outputs that are part of the library.

An example is shown in FIG. 30B, where during the training phase 3000, the machine learning processor 3018 of the image-to-demonstration ML system 3010 can collect or receive training inputs from various sources (at 3002 of FIG. 30A). These training inputs can include, but not limited to: receiving training inputs from various sources comprising one or more of: training sketches 3012, training images 3014, and other information 3016 such as drawings, photographs, video files, screen recordings, images of existing GUIs, etc. The number of training input samples and types of training input samples that are input can vary depending on the implementation. In one non-limiting implementation, training inputs could include, for example, several thousands of training input samples from different types of sketches and drawings captured from paper, whiteboards, napkins, sidewalk chalk, etc. Images 1414 could include current product features or components or features (including SLDS components), as well as current product GUIs, features, screen shots and components or features that those GUIs and screen shots are comprised of (including SLDS components).

In addition, during the training phase 3000 at step 3002, other training information (not illustrated) can be input to the machine learning processor 3018 that indicates which GUIs are represented and which components or features are included in each GUI to provide a baseline to be used by the machine learning processor 3018 for classifying the various images 3012, 3016 and images 3014 (e.g., product images), and training the machine learning processor 3018 to recognize how a human draws product components or features and how a human puts them all together on a paper and how that translates onto a screen so that it can learn gutters, margins, padding, graph representations, component representations, dynamic data (dates, brands, etc.).

At 3004, the machine learning processor 3018 processes at least some of the training inputs 3012, 3014, 3016 to generate a library that includes, but is not limited to: components 3020 and screenshots 3022. In accordance with one non-limiting embodiment, the he components 3020 can include, for example, a library of SVG images, and/or HTML, JS and CSS components that represent components that are used in products and product demonstrations. The screenshots 3022 can include, for example, screenshots that include images of product pages. The screenshots 3022 may include one or more of the components or features from the library or components or features extracted from the training inputs. Features of the machine learning processor 3018 that are utilized at step 3004 can be implemented using any number of ML technologies that will be described in greater detail below.

Figure 30C:
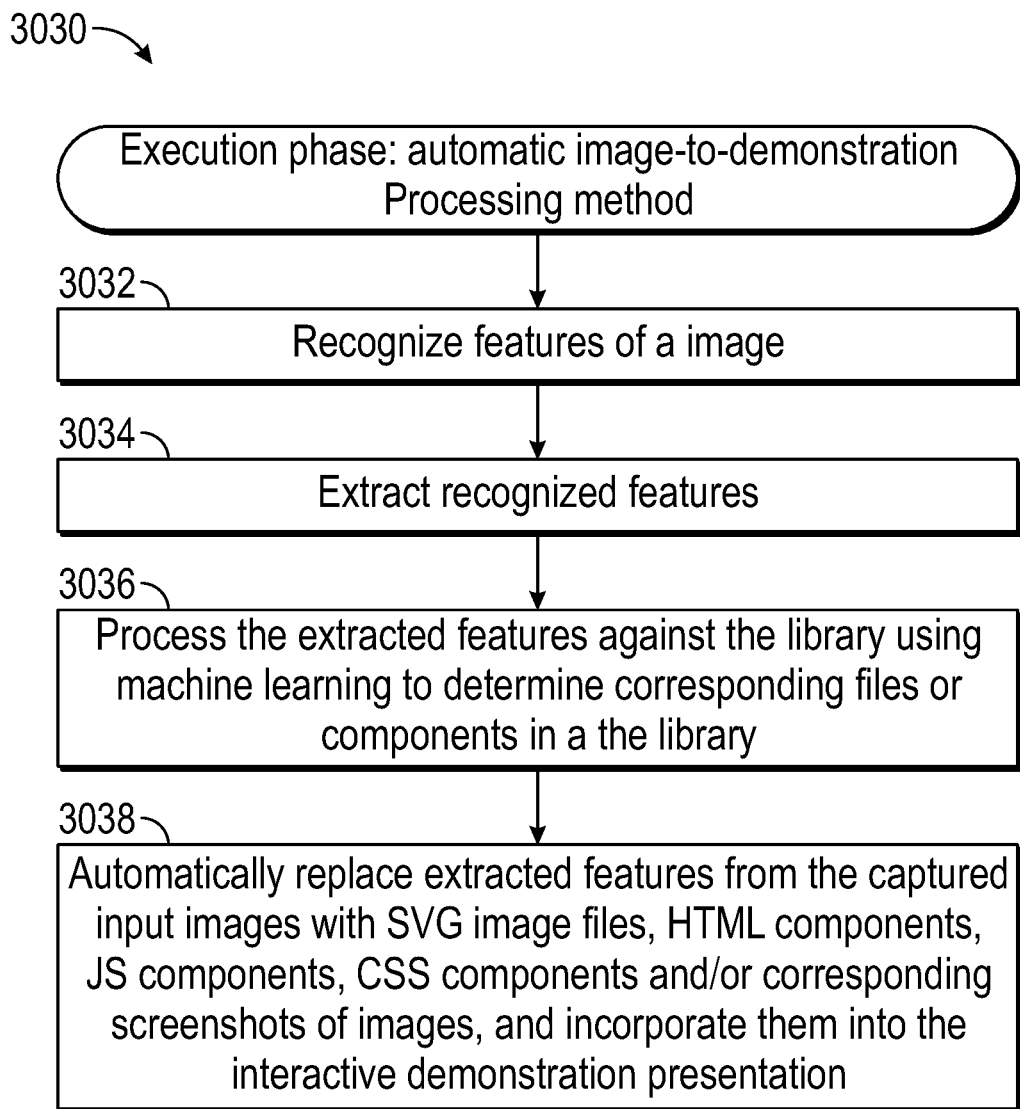
FIG. 30C is a flowchart that illustrates a method for translating input images into an interactive demonstration presentation using the image-to-demonstration ML system in accordance with the disclosed embodiments.
Figure 30D:
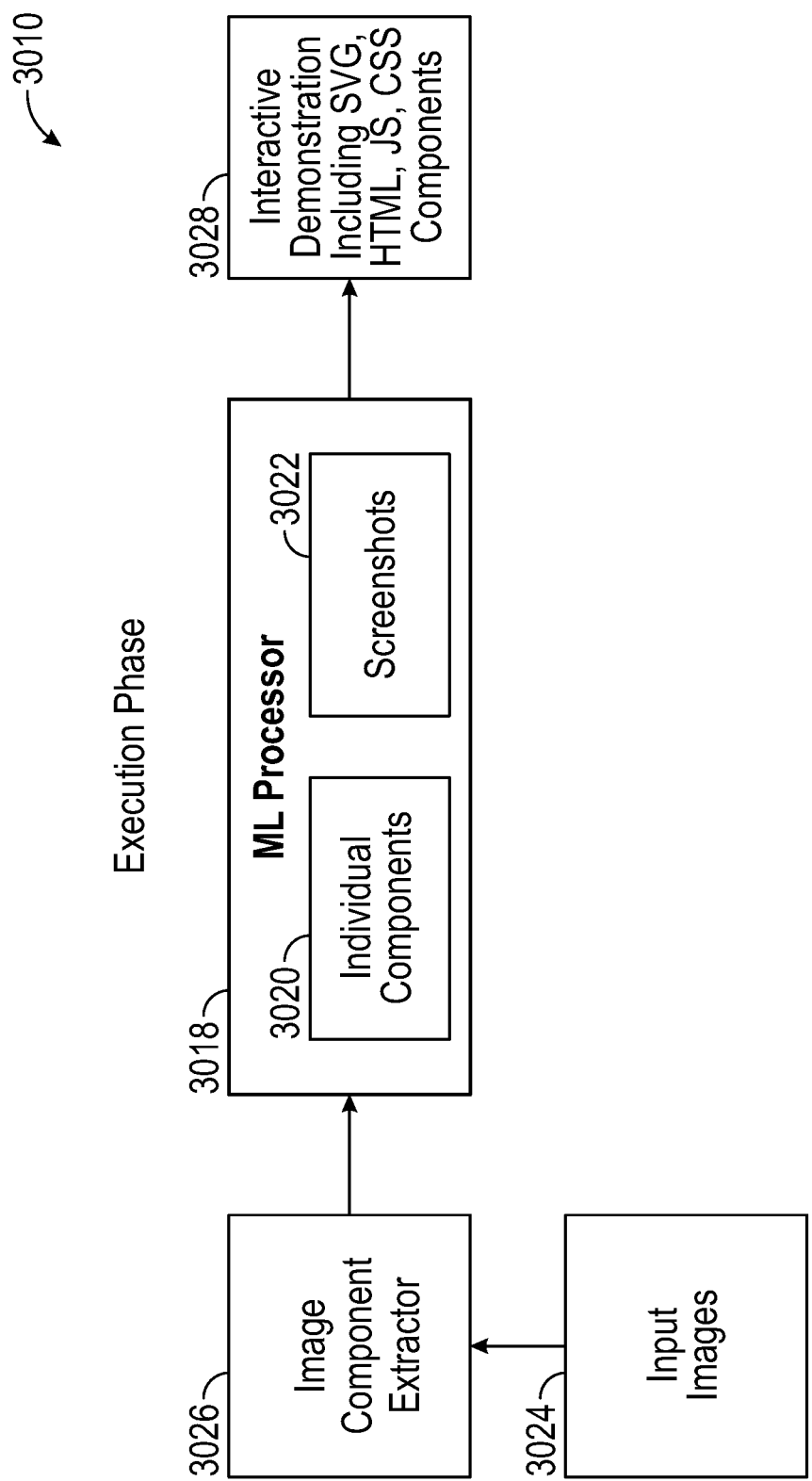
FIG. 30D is a block diagram of the image-to-demonstration ML system during an execution phase (after training) when the image-to-demonstration ML system uses the library to translate components extracted from input images into the interactive demonstration presentation using machine learning in accordance with the disclosed embodiments.

FIG. 30C is a flowchart that illustrates a method 3030 for translating input sketches 3024 into an interactive demonstration presentation 3028 using the image-to-demonstration ML system 3010 in accordance with the disclosed embodiments. FIG. 30D is a block diagram of the image-to-demonstration ML system 3010 during an execution phase (after training) when the image-to-demonstration ML system 3010 uses the library to translate components or features extracted from input images 3024 into the interactive demonstration presentation 3028 using machine learning in accordance with the disclosed embodiments. FIG. 30C will be described with reference to FIG. 30D. The input images 3024 can be in various different forms and can come from various different sources. For instance, the captured input image can include, for example, at least one of a hand-drawn sketch, a screenshot of a website, a screenshot of a user interface of an existing product application, a video file of a user using an existing application, a still image from a video file, a photo of a whiteboard, a high-fidelity mockup generated by a designer, etc. Examples of files can include, but are not limited to, an image file or a Hypertext Markup Language (HTML) file.

As shown in FIG. 30D, during the execution phase, the image component extractor 3026, which can be part of the machine learning processor 3018 in some implementations, can receive the one or more input images 3024, and extract features from the input images 3024. In some embodiments, features within the captured input image can be automatically recognized by automatically digitizing features within the captured input image. For example, in one embodiment, shown in FIG. 3C, at 3032, the image component extractor 3026 can automatically recognize features within an image (like a hand-drawn sketch), and then at 3034, extract the recognized features from the image. For instance, in one implementation, the image component extractor 3026 can automatically digitize the input images 3024 and filter out any noise from the digitized-version of the input images 3024 to produce a digitized image file that can be processed to group and extract one or more components or features from the digitized image file. In some embodiments, noise from the digitized-version of the features within the captured input image can be filtered out to produce a digitized image file. In some embodiments, the recognized features can be extracted from the captured input image, by extracting, from the digitized image file, one or more features (or components) from the captured input image by comparing each of the features versus the library. The extracted features can then be provided to the machine learning processor 3018 for further processing.

At 3036 of FIG. 30C, the machine learning processor 3018 can process the extracted features to determine corresponding files or components or features in the library that was trained via machine learning, for example, via method 3000 of FIG. 3A, and then, at 3038, can automatically replace the extracted features from the image with the one or more corresponding files or components or features to transform the image into the interactive demonstration presentation for the envisioned software product. In some embodiments, processing the extracted features includes one or more of: matching each of the extracted features to a corresponding element from the library that represents that extracted feature. The corresponding element can include at least one of: an image file, a Hypertext Markup Language (HTML) file, a JavaScript component or a Cascading Style Sheets (CSS) component that represents or corresponds to that extracted feature. Each extracted feature translates (and can be converted) to a corresponding element when automatically replaced. In this way, the machine learning processor 3018 can implement various ML technologies to translate, convert and/or match features that were extracted from the image (at 3034) to appropriate SVG images and/or appropriate HTML/JS/CSS components or features that represent or correspond to components or features from the input images 3024. The machine learning processor 3018 can then incorporate the appropriate SVG images and/or appropriate HTML/JS/CSS components within the interactive demonstration presentation 3028.

For example, in one non-limiting implementation, the machine learning processor 3018 can process the extracted features against the library (including the components 3020) using machine learning technologies to automatically replace features that are extracted from the input images 3024, for example, with SVG images and/or HTML/JS/CSS components 3020 to transform the extracted features (that are extracted from input images 3024) and incorporate them into the interactive demonstration presentation 3028 without the user having to write any code. In other words, automatically replacing can include transforming each of features that were extracted from the captured input image into an output that represents or corresponds to that feature, where each output comprises one or more of: an image file, a Hypertext Markup Language (HTML) file, a JavaScript component and a Cascading Style Sheets (CSS) component; and each of the outputs can be incorporated into the interactive demonstration presentation for the envisioned software product. For instance, the interactive demonstration presentation 3028 can include SVG images and/or HTML/JS/CSS components that represent or correspond to the components from the input images 3024. The interactive demonstration presentation 3028 can include any number of embedded image files (e.g., SVG image files with PNG image files) that are appropriately named so that when loaded in a browser, the browser renders an output that appears as if it had been created by a human.

In one implementation, if the machine learning processor 3018 is unable to build all of the interactive demonstration presentation 3028 by automatically replacing features that are extracted from the input images 3024, the machine learning processor 3018 can incorporate screenshots 3022 of images (as needed) into the interactive demonstration presentation 3028.

For example, if the machine learning processor 3018 is unable to build all of the interactive demonstration presentation 3028 by automatically replacing features and/or incorporating screenshots 3022 of images (e.g., product pages) as needed into the interactive demonstration presentation 3028, then the machine learning processor 3018 can take extracted components from the input images 3024 it is having trouble with and simply incorporate those extracted components of the input images 3024 into the interactive demonstration presentation 3028.

As noted above, features of the machine learning processor 3018 that are utilized at steps 3004, 3032, 3034, 3036, 3038 can be implemented using any number of machine learning technologies. For example, in one non-limiting implementation, the machine learning processor 3018 can be implemented using intelligent image and pattern recognition technology available as part of the Einstein® Platform provided by Salesforce.com®.

In accordance with one non-limiting implementation, the machine learning processor 3018 can implement one or more supervised learning algorithms. For example, supervised learning algorithms build a mathematical model of a set of data that contains both the inputs and the desired outputs. The data is known as training data, and consists of a set of training examples. Each training example has one or more inputs and a desired output, also known as a supervisory signal. In the case of semi-supervised learning algorithms, some of the training examples are missing the desired output. In the mathematical model, each training example is represented by an array or vector, and the training data by a matrix. Through iterative optimization of an objective function, supervised learning algorithms learn a function that can be used to predict the output associated with new inputs. An optimal function will allow the algorithm to correctly determine the output for inputs that were not a part of the training data. An algorithm that improves the accuracy of its outputs or predictions over time is said to have learned to perform that task. Supervised learning algorithms include classification and regression. Classification algorithms are used when the outputs are restricted to a limited set of values, and regression algorithms are used when the outputs may have any numerical value within a range. Similarity learning is an area of supervised machine learning closely related to regression and classification, but the goal is to learn from examples using a similarity function that measures how similar or related two objects are.

It should be noted that any number of different machine learning techniques may also be utilized. In accordance with one non-limiting implementation, the machine learning processor 3018 can implement an ensemble model that includes two or more related, but different analytical models that are run or executed at the same time, where the results generated by each can then be synthesized into a single score or spread in order to improve the accuracy of predictive analytics. An ensemble is a supervised learning algorithm because it can be trained and then used to make predictions. The trained ensemble, therefore, represents a single hypothesis that is not necessarily contained within the hypothesis space of the models from which it is built. Thus, ensembles can be shown to have more flexibility in the functions they can represent. An ensemble model can include a set of individually trained classifiers (such as neural networks or decision trees) whose predictions are combined. To explain further, in predictive modeling and other types of data analytics, a single model based on one data sample can have biases, high variability or outright inaccuracies that can affect the reliability of its analytical findings. By combining different models or analyzing multiple samples, the effects of those limitations can be reduced to provide better information. As such, ensemble methods can use multiple machine learning algorithms to obtain better predictive performance than could be obtained from any of the constituent learning algorithms alone.

For instance, one common example of ensemble modeling is a random forest model which is a type of analytical model that leverages multiple decision trees and is designed to predict outcomes based on different variables and rules. A random forest model blends decision trees that may analyze different sample data, evaluate different factors or weight common variables differently. The results of the various decision trees are then either converted into a simple average or aggregated through further weighting. The emergence of Hadoop and other big data technologies has allowed greater volumes of data to be stored and analyzed, which can allow analytical models to be run on different data samples.

Depending on the implementation, any number of machine learning models can be combined to optimize an ensemble model. Examples of machine learning algorithms or models that can be implemented at the machine learning processor 3018 can include, but are not limited to: regression models such as linear regression, logistic regression, and K—means clustering; one or more decision tree models (e.g., a random forest model); one or more support vector machines; one or more artificial neural networks; one or more deep learning networks (e.g., at least one recurrent neural network); fuzzy logic based models; genetic programming models; Bayesian networks or other Bayesian techniques, probabilistic machine learning models; Gaussian processing models; Hidden Markov models; and heuristically derived combinations of any of the above, etc. The types of machine learning algorithms differ in their approach, the type of data they input and output, and the type of task or problem that they are intended to solve.

A Hidden Markov model (HMM) is a statistical Markov model in which the system being modeled is assumed to be a Markov process with unobserved (hidden) states. An HMM can be considered as the simplest dynamic Bayesian network. A Bayesian network, belief network or directed acyclic graphical model is a probabilistic graphical model that represents a set of random variables and their conditional independence with a directed acyclic graph (DAG). Bayesian networks that model sequences of variables are called dynamic Bayesian networks. Generalizations of Bayesian networks that can represent and solve decision problems under uncertainty are called influence diagrams.

Support vector machines (SVMs), also known as support vector networks, are a set of related supervised learning methods used for classification and regression. Given a set of training examples, each marked as belonging to one of two categories, an SVM training algorithm builds a model that predicts whether a new example falls into one category or the other. An SVM training algorithm is a non-probabilistic, binary, linear classifier. In addition to performing linear classification, SVMs can efficiently perform a non-linear classification using what is called the kernel trick, implicitly mapping their inputs into high-dimensional feature spaces.

Decision tree learning uses a decision tree as a predictive model to go from observations about an item (represented in the branches) to conclusions about the item's target value (represented in the leaves). Tree models where the target variable can take a discrete set of values are called classification trees; in these tree structures, leaves represent class labels and branches represent conjunctions of features that lead to those class labels. Decision trees where the target variable can take continuous values (typically real numbers) are called regression trees. In decision analysis, a decision tree can be used to visually and explicitly represent decisions and decision making.

Deep learning algorithms can refer to a collection of algorithms used in machine learning, that are used to model high-level abstractions and data through the use of model architectures, which are composed of multiple nonlinear transformations. Deep learning is a specific approach used for building and training neural networks. Deep learning consists of multiple hidden layers in an artificial neural network.

Examples of deep learning algorithms can include, for example, Siamese networks, transfer learning, recurrent neural networks (RNNs), long short-term memory (LSTM) networks, convolutional neural networks (CNNs), transformers, etc. For instance, deep learning approaches can make use of autoregressive Recurrent Neural Networks (RNN), such as the long short-term memory (LSTM) and the Gated Recurrent Unit (GRU). One neural network architecture for time series forecasting using RNNs (and variants) is an autoregressive seq2seq neural network architecture, which acts as an autoencoder. In some embodiments, when the machine learning processor 3018 implements one or more algorithms as an ensemble model, the ensemble model can include one or more deep learning algorithms.

The following description is of one example of a system in which the features described above may be implemented. The components of the system described above are merely one example and should not be construed as limiting. The features described above may be implemented in any other type of computing environment, such as one with multiple servers, one with a single server, a multi-tenant server environment, a single-tenant server environment, or some combination of the above.

Figure 31:
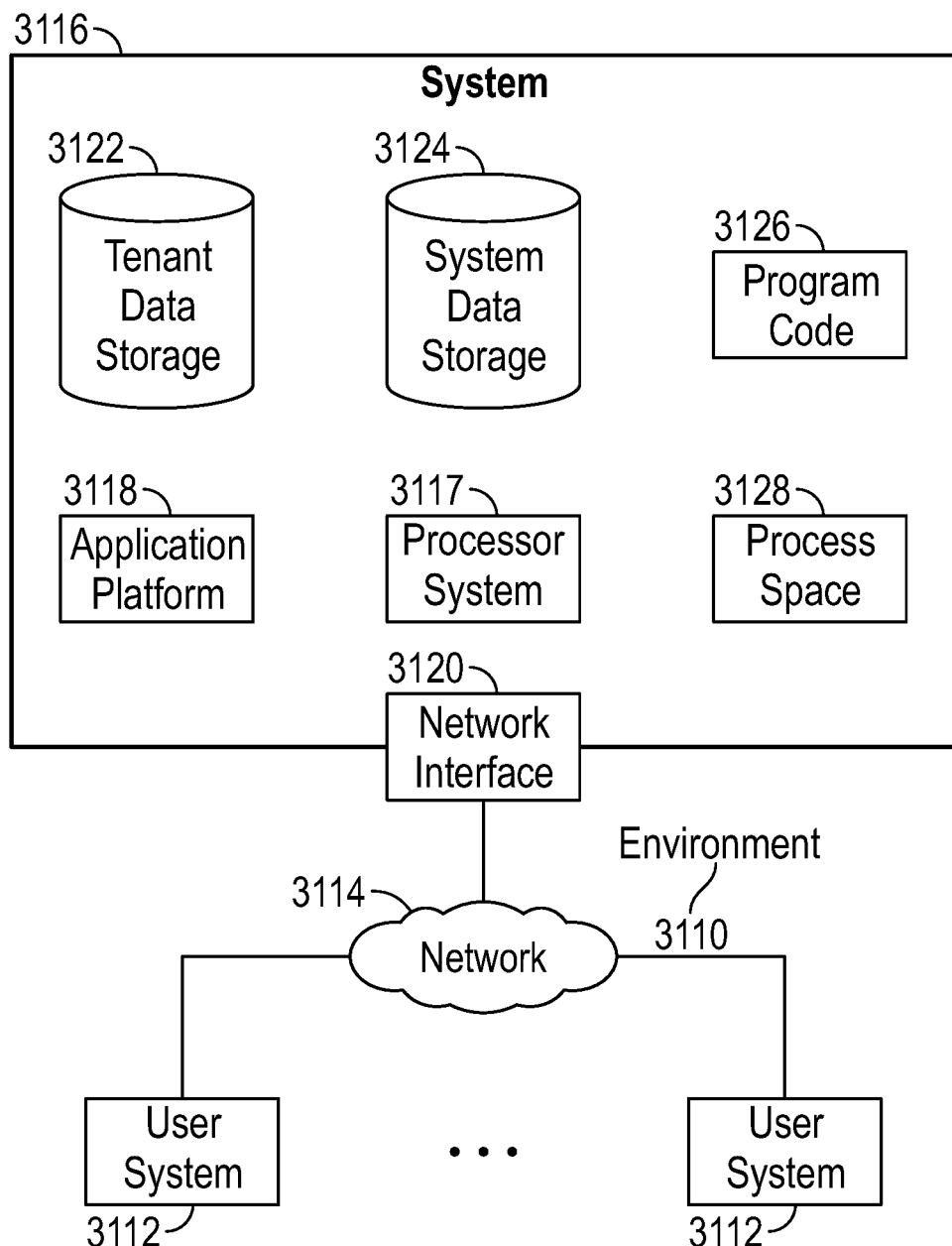
FIG. 31 shows a block diagram of an example of an environment in which an on-demand database service can be used in accordance with some implementations.

FIG. 31 shows a block diagram of an example of an environment 3110 in which an on-demand database service can be used in accordance with some implementations. The environment 3110 includes user systems 3112, a network 3114, a database system 3116 (also referred to herein as a "cloud-based system"), a processor system 3117, an application platform 3118, a network interface 3120, tenant database 3122 for storing tenant data 3123, system database 3124 for storing system data 3125, program code 3126 for implementing various functions of the system 3116, and process space 3128 for executing database system processes and tenant-specific processes, such as running applications as part of an application hosting service. In some other implementations, environment 3110 may not have all of these components or systems, or may have other components or systems instead of, or in addition to, those listed above.

In some implementations, the environment 3110 is an environment in which an on-demand database service exists. An on-demand database service, such as that which can be implemented using the system 3116, is a service that is made available to users outside of the enterprise(s) that own, maintain or provide access to the system 3116. As described above, such users generally do not need to be concerned with building or maintaining the system 3116. Instead, resources provided by the system 3116 may be available for such users' use when the users need services provided by the system 3116; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 3118 can be a framework that allows the applications of system 3116 to execute, such as the hardware or software infrastructure of the system 3116. In some implementations, the application platform 3118 enables the creation, management and execution of one or more applications developed by the provider of the on-demand database service, users accessing the on-demand database service via user systems 3112, or third-party application developers accessing the on-demand database service via user systems 3112.

In some implementations, the system 3116 implements a web-based customer relationship management (CRM) system. For example, in some such implementations, the system 3116 includes application servers configured to implement and execute CRM software applications as well as provide related data, code, forms, renderable webpages and documents and other information to and from user systems 3112 and to store to, and retrieve from, a database system related data, objects, and Webpage content. In some MTS implementations, data for multiple tenants may be stored in the same physical database object in tenant database 3122. In some such implementations, tenant data is arranged in the storage medium(s) of tenant database 3122 so that data of one tenant is kept logically separate from that of other tenants so that one tenant does not have access to another tenant's data, unless such data is expressly shared. The system 3116 also implements applications other than, or in addition to, a CRM application. For example, the system 3116 can provide tenant access to multiple hosted (standard and custom) applications, including a CRM application. User (or third-party developer) applications, which may or may not include CRM, may be supported by the application platform 3118. The application platform 3118 manages the creation and storage of the applications into one or more database objects and the execution of the applications in one or more virtual machines in the process space of the system 3116.

According to some implementations, each system 3116 is configured to provide webpages, forms, applications, data and media content to user (client) systems 3112 to support the access by user systems 3112 as tenants of system 3116. As such, system 3116 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 3114 can be or include any network or combination of networks of systems or devices that communicate with one another. For example, the network 3114 can be or include any one or any combination of a LAN (local area network), WAN (wide area network), telephone network, wireless network, cellular network, point-to-point network, star network, token ring network, hub network, or other appropriate configuration. The network 3114 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 3112 can communicate with system 3116 using TCP/IP and, at a higher network level, other common Internet protocols to communicate, such as HTTP, FTP, AFS, WAP, etc. In an example where HTTP is used, each user system 3112 can include an HTTP client commonly referred to as a "web browser" or simply a "browser" for sending and receiving HTTP signals to and from an HTTP server of the system 3116. Such an HTTP server can be implemented as the sole network interface 3120 between the system 3116 and the network 3114, but other techniques can be used in addition to or instead of these techniques. In some implementations, the network interface 3120 between the system 3116 and the network 3114 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 3112 can be implemented as any computing device(s) or other data processing apparatus or systems usable by users to access the database system 3116. For example, any of user systems 3112 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 3112 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 3116) of the user system 3112 to access, process and view information, pages and applications available to it from the system 3116 over the network 3114.

Each user system 3112 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 3112 in conjunction with pages, forms, applications and other information provided by the system 3116 or other systems or servers. For example, the user interface device can be used to access data and applications hosted by system 3116, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 3112 may differ in their respective capacities, and the capacity of a particular user system 3112 can be entirely determined by permissions (permission levels) for the current user of such user system. For example, where a salesperson is using a particular user system 3112 to interact with the system 3116, that user system can have the capacities allotted to the salesperson. However, while an administrator is using that user system 3112 to interact with the system 3116, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 3112 and some or all of its components are operator-configurable using applications, such as a browser, including computer code executed using a central processing unit (CPU) such as an Intel Pentium® processor or the like. Similarly, the system 3116 (and additional instances of an MTS, where more than one is present) and all of its components can be operator-configurable using application(s) including computer code to run using the processor system 3117, which may be implemented to include a CPU, which may include an Intel Pentium® processor or the like, or multiple CPUs.

The system 3116 includes tangible computer-readable media having non-transitory instructions stored thereon/in that are executable by or used to program a server or other computing system (or collection of such servers or computing systems) to perform some of the implementation of processes described herein. For example, computer program code 3126 can implement instructions for operating and configuring the system 3116 to intercommunicate and to process webpages, applications and other data and media content as described herein. In some implementations, the computer code 3126 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, JAVA®, JAVASCRIPT, ActiveX®, any other scripting language, such as VBScript®, and many other programming languages as are well known may be used. (JAVA™ is a trademark of Sun Microsystems, Inc.).

Figure 32:
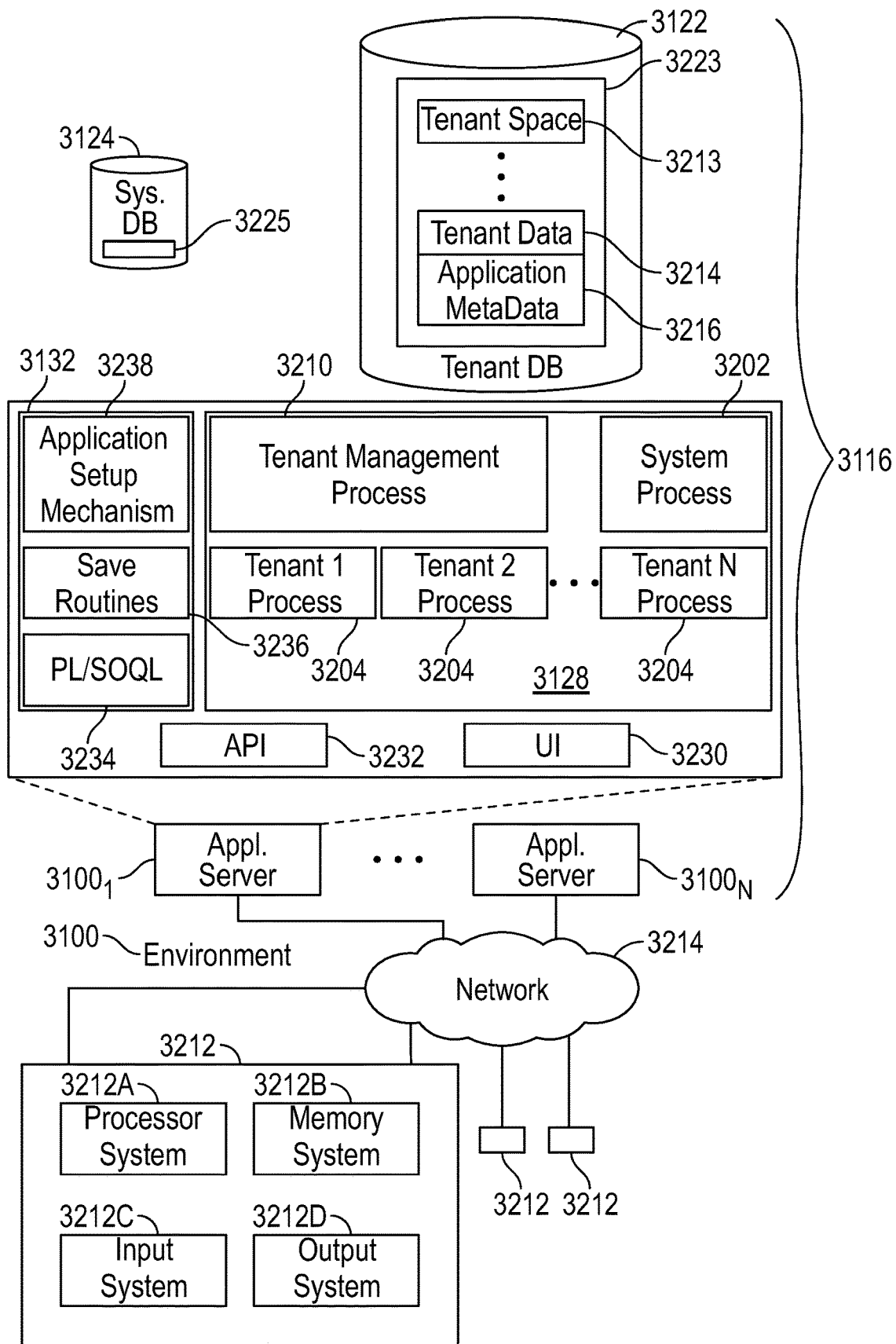
FIG. 32 shows a block diagram of example implementations of elements of FIG. 31 and example interconnections between these elements according to some implementations.

FIG. 32 shows a block diagram of example implementations of elements of FIG. 31 and example interconnections between these elements according to some implementations. That is, FIG. 32 also illustrates environment 3110, but FIG. 32, various elements of the system 3116 and various interconnections between such elements are shown with more specificity according to some more specific implementations. Elements from FIG. 31 that are also shown in FIG. 32 will use the same reference numbers in FIG. 32 as were used in FIG. 31. Additionally, in FIG. 32, the user system 3112 includes a processor system 3212A, a memory system 3212B, an input system 3212C, and an output system 3212D. The processor system 3212A can include any suitable combination of one or more processors. The memory system 3212B can include any suitable combination of one or more memory devices. The input system 3212C can include any suitable combination of input devices, such as one or more touchscreen interfaces, keyboards, mice, trackballs, scanners, cameras, or interfaces to networks. The output system 3212D can include any suitable combination of output devices, such as one or more display devices, printers, or interfaces to networks.

In FIG. 32, the network interface 3120 of FIG. 31 is implemented as a set of HTTP application servers $3100_1$-$3100_N$. Each application server 3100, also referred to herein as an "app server," is configured to communicate with tenant database 3122 and the tenant data 3223 therein, as well as system database 3124 and the system data 3225 therein, to serve requests received from the user systems 3212. The tenant data 3223 can be divided into individual tenant storage spaces 3213, which can be physically or logically arranged or divided. Within each tenant storage space 3213, tenant data 3214 and application metadata 3216 can similarly be allocated for each user. For example, a copy of a user's most recently used (MRU) items can be stored to tenant data 3214. Similarly, a copy of MRU items for an entire organization that is a tenant can be stored to tenant storage space 3213.

The process space 3128 includes system process space 3202, individual tenant process spaces 3204 and a tenant management process space 3210. The application platform 3118 includes an application setup mechanism 3238 that supports application developers' creation and management of applications. Such applications and others can be saved as metadata into tenant database 3122 by save routines 3236 for execution by subscribers as one or more tenant process spaces 3204 managed by tenant management process 3210, for example. Invocations to such applications can be coded using PL/SOQL 3234, which provides a programming language style interface extension to API 3232. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 3216 for the subscriber making the invocation and executing the metadata as an application in a virtual machine.

The system 3116 of FIG. 32 also includes a user interface (UI) 3230 and an application programming interface (API) 3232 to system 3116 resident processes to users or developers at user systems 3212. In some other implementations, the environment 3110 may not have the same elements as those listed above or may have other elements instead of, or in addition to, those listed above.

Each application server 3100 can be communicably coupled with tenant database 3122 and system database 3124, for example, having access to tenant data 3223 and system data 3225, respectively, via a different network connection. For example, one application server $3100_1$ can be coupled via the network 3114 (for example, the Internet), another application server $3100_N$ can be coupled via a direct network link, and another application server (not illustrated) can be coupled by yet a different network connection. Transfer Control Protocol and Internet Protocol (TCP/IP) are examples of typical protocols that can be used for communicating between application servers 3100 and the system 3116. However, it will be apparent to one skilled in the art that other transport protocols can be used to optimize the system 3116 depending on the network interconnections used.

In some implementations, each application server 3100 is configured to handle requests for any user associated with any organization that is a tenant of the system 3116. Because it can be desirable to be able to add and remove application servers 3100 from the server pool at any time and for various reasons, in some implementations there is no server affinity for a user or organization to a specific application server 3100. In some such implementations, an interface system implementing a load balancing function (for example, an F5 Big-IP load balancer) is communicably coupled between the application servers 3100 and the user systems 3212 to distribute requests to the application servers 3100. In one implementation, the load balancer uses a least-connections algorithm to route user requests to the application servers 3100. Other examples of load balancing algorithms, such as round robin and observed-response-time, also can be used. For example, in some instances, three consecutive requests from the same user could hit three different application servers 3100, and three requests from different users could hit the same application server 3100. In this manner, by way of example, system 3116 can be a multi-tenant system in which system 3116 handles storage of, and access to, different objects, data and applications across disparate users and organizations.

In one example storage use case, one tenant can be a company that employs a sales force where each salesperson uses system 3116 to manage aspects of their sales. A user can maintain contact data, leads data, customer follow-up data, performance data, goals and progress data, etc., all applicable to that user's personal sales process (for example, in tenant database 3122). In an example of an MTS arrangement, because all of the data and the applications to access, view, modify, report, transmit, calculate, etc., can be maintained and accessed by a user system 3212 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 3116 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 3116 also can maintain system level data usable by multiple tenants or other data. Such system level data can include industry reports, news, postings, and the like that are sharable among tenants.

In some implementations, the user systems 3212 (which also can be client systems) communicate with the application servers 3100 to request and update system-level and tenant-level data from the system 3116. Such requests and updates can involve sending one or more queries to tenant database 3122 or system database 3124. The system 3116 (for example, an application server 3100 in the system 3116) can automatically generate one or more SQL statements (for example, one or more SQL queries) designed to access the desired information. System database 3124 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 31, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 33:
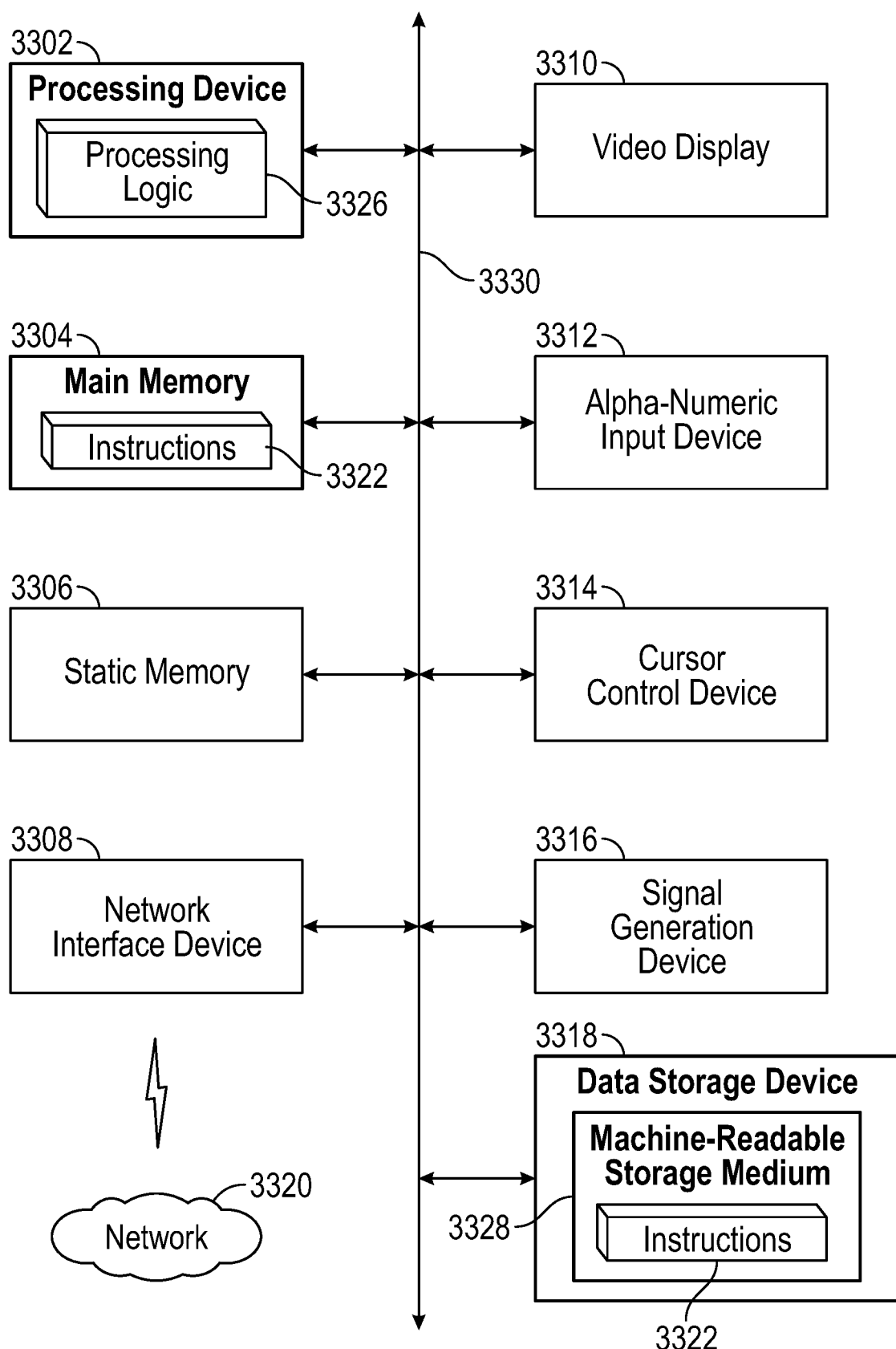
FIG. 33 illustrates a diagrammatic representation of a machine in the exemplary form of a computer system within which a set of instructions, for causing the machine to perform any one or more of the methodologies discussed herein, may be executed.

FIG. 33 illustrates a diagrammatic representation of a machine in the exemplary form of a computer system 1900 within which a set of instructions, for causing the machine to perform any one or more of the methodologies discussed herein, may be executed. The system 1900 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a user system, a client device, or a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 1900 may represent, for example, elements of a user system 112 (including a Rapid Pictorial Demonstration (RPD) Controller/Editor 120, a dynamic Scalable Vector Graphics (SVG) system 150, and an automatic SVG animation system 160), a server system 116 (including a data store 145, a configuration processor 130, a dynamic component swapout processor 136, a discrepancy resolution processor 138, a filename processor 140, an overrides engine 185, and an SVG path creation system 190), a machine learning system 195, etc.

The exemplary computer system 1900 includes a processing device (processor) 1902, a main memory 1904 (e.g., read-only memory (ROM), flash memory, dynamic random access memory (DRAM) such as synchronous DRAM (SDRAM)), a static memory 1906 (e.g., flash memory, static random access memory (SRAM)), and a data storage device 1918, which communicate with each other via a bus 1930.

Processing device 1902 represents one or more general-purpose processing devices such as a microprocessor, central processing unit, or the like. More particularly, the processing device 1902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1902 may also be one or more special-purpose processing devices such as an application specific integrated circuit (ASIC), a field programmable gate array (FPGA), a digital signal processor (DSP), network processor, or the like.

The computer system 1900 may further include a network interface device 1908. The computer system 1900 also may include a video display unit 1910 (e.g., a liquid crystal display (LCD) or a cathode ray tube (CRT)), an alphanumeric input device 1912 (e.g., a keyboard), a cursor control device 1914 (e.g., a mouse), and a signal generation device 1916 (e.g., a speaker).

The data storage device 1918 may include a computer-readable medium 1928 on which is stored one or more sets of instructions 1922 (e.g., instructions of in-memory buffer service 194) embodying any one or more of the methodologies or functions described herein. The instructions 1922 may also reside, completely or at least partially, within the main memory 1904 and/or within processing logic 1926 of the processing device 1902 during execution thereof by the computer system 1900, the main memory 1904 and the processing device 1902 also constituting computer-readable media. The instructions may further be transmitted or received over a network 1920 via the network interface device 1908.

While the computer-readable storage medium 1928 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Particular embodiments may be implemented in a computer-readable storage medium (also referred to as a machine-readable storage medium) for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor," "processor system," or "processing system" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing," "determining," "analyzing," "identifying," "adding," "displaying," "generating," "querying," "creating," "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Any suitable programming language can be used to implement the routines of particular embodiments including C, C++, JAVA®, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for programmatically comparing, fixing, and flagging discrepancies, the method comprising:

resizing a first exported image file having a raster-based image format so that dimensions of the resized version of the first exported image file are the same size dimensions as those of a second exported image file having a vector-based image format;

cleaning up the second exported image file to make the second exported image file appear visually similar enough to the first exported image file so as to fulfill the needs of a software demonstration presentation being created, wherein the software demonstration presentation comprises an interactive software-product demonstration presentation for an envisioned software product that is a digital artifact presented to demonstrate features of the envisioned software product and how the envisioned software product is to function and operate in response to user interaction with a user interface;

loading the second exported image file as a Document Object Model (DOM) so that a script can interact with the DOM as if the second exported image file were in a browser;

identifying problematic characteristics with the second exported image file that were caused when the second exported image file was exported from image editing software, and adjusting the problematic characteristics of the second exported image file that were identified;

inserting the second exported image file within a Hypertext Markup Language (HTML) shell that mimics a final context that the second exported image file will be loaded into;

rendering the second exported image file in the browser and taking a screenshot of the rendered second exported image file;

processing the resized version of the first exported image file and the screenshot of the second exported image file to determine discrepancies between the resized version of the first exported image file and the screenshot of the second exported image file; and determining, by comparing the discrepancies to a configurable threshold, whether an image of the resized version of the first exported image file and an image of the screenshot of the second exported image file are similar enough, according to the configurable threshold, to be considered to match.

2. The method of claim 1, further comprising:
highlighting the discrepancies between the resized version of the first exported image file and the screenshot of the second exported image file in any way that is visually detectable so that the discrepancies are clearly visible to a user.

3. The method of claim 1, further comprising:
creating a visual representation of discrepancies that cycles back and forth between the resized version of the first exported image file and the screenshot of the second exported image file so that the discrepancies between the resized version of the first exported image file and the screenshot of the second exported image file are observable when viewed by a user.

4. The method of claim 1, wherein cleaning up the second exported image file, comprises:
renaming identifiers of the second exported image file to ensure that each is unique and do not collide with other identifiers of other SVGs that on a webpage;
cleaning identifiers of the second exported image file so they are valid for Hypertext Markup Language (HTML); and
performing other manipulations with respect to the second exported image file to optimize use of the second exported image file in the browser.

5. The method of claim 4, wherein the other manipulations comprise one or more of:
altering objects of the second exported image file so that they are positioned, sized, oriented, colored, and shaded, in a way that more closely matches their positioning, sizing, orientation, colorizing and shading in the first exported image file.

6. The method of claim 1, wherein the problematic characteristics with the second exported image file that were identified comprise one or more of: text sizing being incorrect; text spacing being incorrect; leading; word spacing; letter spacing; border width; and drop shadows missing; and component positioning on a web page being placed incorrectly.

7. The method of claim 1, wherein processing the resized version of the first exported image file and the screenshot of the second exported image file to determine the discrepancies between the resized version of the first exported image file and the screenshot of the second exported image file, comprises:
processing the resized version of the first exported image file and the screenshot of the second exported image file via a diff program that determines the discrepancies between the resized version of the first exported image file and the screenshot of the second exported image file to generate a difference file that records the discrepancies.

8. The method of claim 1, wherein the second exported image file has a format that is subsequently programmatically manipulatable including one or more of:
interpreting the image data as a Document Object Model (DOM); and
manipulating the image data via JavaScript or CSS.

9. A system, comprising:
a server system comprising at least one first hardware-based processor and memory, wherein the memory comprises processor-executable instructions encoded on a non-transient processor-readable media, wherein the processor-executable instructions comprise one or more scripts, when executed by the first hardware-based processor, are configurable to cause:
executing, at a discrepancy resolution processor, on a first exported image file, having a raster-based image format, and a second exported image file, having a vector-based image format, to programmatically compare, fix, and flag discrepancies between the first exported image file and the second exported image file by:
resizing the first exported image file so that dimensions of the resized version of the first exported image file are the same size dimensions as those of the second exported image file;
cleaning up the second exported image file to make the second exported image file appear visually similar enough to the first exported image file so as to fulfill the needs of a software demonstration presentation being created, wherein the software demonstration presentation comprises an interactive software-product demonstration presentation for an envisioned software product that is a digital artifact presented to demonstrate features of the envisioned software product and how the envisioned software product is to function and operate in response to user interaction with a user interface;
loading the second exported image file as a Document Object Model (DOM) so that a script can interact with the DOM as if the second exported image file were in a browser;
identifying problematic characteristics with the second exported image file that were caused when the second exported image file was exported from image editing software, and adjusting the problematic characteristics of the second exported image file that were identified;
inserting the second exported image file within a Hypertext Markup Language (HTML) shell that mimics a final context that the second exported image file will be loaded into;

rendering the second exported image file in the browser and taking a screenshot of the rendered second exported image file;

processing the resized version of the first exported image file and the screenshot of the second exported image file to determine discrepancies between the resized version of the first exported image file and the screenshot of the second exported image file; and determining, by comparing the discrepancies to a configurable threshold, whether an image of the resized version of the first exported image file and an image of the screenshot of the second exported image file are similar enough, according to the configurable threshold, to be considered to match.

10. The system of claim 9, wherein the processor-executable instructions, when executed by the first hardware-based processor, are further configurable to cause:

highlighting the discrepancies between the resized version of the first exported image file and the screenshot of the second exported image file in any way that is visually detectable so that the discrepancies are clearly visible to a user.

11. The system of claim 9, wherein the processor-executable instructions, when executed by the first hardware-based processor, are further configurable to cause:

creating a visual representation of discrepancies that cycles back and forth between the resized version of the first exported image file and the screenshot of the second exported image file so that the discrepancies between the resized version of the first exported image file and the screenshot of the second exported image file are observable when viewed by a user.

12. The system of claim 9, wherein cleaning up the second exported image file, comprises:

renaming identifiers of the second exported image file to ensure that each is unique and do not collide with other identifiers of other SVGs that on a webpage;

cleaning identifiers of the second exported image file so they are valid for Hypertext Markup Language (HTML); and performing other manipulations with respect to the second exported image file to optimize use of the second exported image file in the browser.

13. The system of claim 12, wherein the other manipulations comprise one or more of:

altering objects of the second exported image file so that they are positioned, sized, oriented, colored, and shaded, in a way that more closely matches their positioning, sizing, orientation, colorizing and shading in the first exported image file.

14. The system of claim 9, wherein the problematic characteristics with the second exported image file that were identified comprise one or more of: text sizing being incorrect; text spacing being incorrect; leading; word spacing; letter spacing; border width; and drop shadows missing; and component positioning on a web page being placed incorrectly.

15. The system of claim 9, wherein processing the resized version of the first exported image file and the screenshot of the second exported image file to determine the discrepancies between the resized version of the first exported image file and the screenshot of the second exported image file, comprises:

processing the resized version of the first exported image file and the screenshot of the second exported image file via a diff program that determines the discrepancies between the resized version of the first exported image file and the screenshot of the second exported image file to generate a difference file that records the discrepancies.

16. The system of claim 9, wherein the second exported image file has a format that is subsequently programmatically manipulatable including one or more of:

interpreting the image data as a Document Object Model (DOM); and manipulating the image data via JavaScript or CSS.

17. A system comprising at least one hardware-based processor and memory, wherein the memory comprises processor-executable instructions encoded on a non-transient processor-readable media for programmatically comparing, fixing, and flagging discrepancies, wherein the processor-executable instructions, when executed by the processor, are configurable to cause:

resizing a first exported image file having a raster-based image format so that dimensions of the resized version of the first exported image file are the same size dimensions as those of a second exported image file having a vector-based image format;

cleaning up the second exported image file to make the second exported image file appear visually similar enough to the first exported image file so as to fulfill the needs of a software demonstration presentation being created, wherein the software demonstration presentation comprises an interactive software-product demonstration presentation for an envisioned software product that is a digital artifact presented to demonstrate features of the envisioned software product and how the envisioned software product is to function and operate in response to user interaction with a user interface;

loading the second exported image file as a Document Object Model (DOM) so that a script can interact with the DOM as if the second exported image file were in a browser;

identifying problematic characteristics with the second exported image file that were caused when the second exported image file was exported from image editing software, and adjusting the problematic characteristics of the second exported image file that were identified;

inserting the second exported image file within a Hypertext Markup Language (HTML) shell that mimics a final context that the second exported image file will be loaded into;

rendering the second exported image file in the browser and taking a screenshot of the rendered second exported image file;

processing the resized version of the first exported image file and the screenshot of the second exported image file to determine discrepancies between the resized version of the first exported image file and the screenshot of the second exported image file; and determining, by comparing the discrepancies to a configurable threshold, whether an image of the resized version of the first exported image file and an image of the screenshot of the second exported image file are similar enough, according to the configurable threshold, to be considered to match.

18. The system of claim 17, wherein the processor-executable instructions, when executed by the processor, are configurable to cause:

highlighting the discrepancies between the resized version of the first exported image file and the screenshot of the second exported image file in any way that is visually detectable so that the discrepancies are clearly visible to a user; and creating a visual representation of discrepancies that cycles back and forth between the resized version of the first exported image file and the screenshot of the second exported image file so that the discrepancies between the resized version of the first exported image file and the screenshot of the second exported image file are observable when viewed by a user.

19. The system of claim 17, wherein cleaning up the second exported image file, comprises:

renaming identifiers of the second exported image file to ensure that each is unique and do not collide with other identifiers of other SVGs that on a webpage;

cleaning identifiers of the second exported image file so they are valid for Hypertext Markup Language (HTML); and performing other manipulations with respect to the second exported image file to optimize use of the second exported image file in the browser, wherein the other manipulations comprise one or more of: altering objects of the second exported image file so that they are positioned, sized, oriented, colored, and shaded, in a way that more closely matches their positioning, sizing, orientation, colorizing and shading in the first exported image file.

20. The system of claim 17, wherein the problematic characteristics with the second exported image file that were identified comprise one or more of: text sizing being incorrect; text spacing being incorrect; leading; word spacing; letter spacing; border width; and drop shadows missing; and component positioning on a web page being placed incorrectly.

* * * * *